US010577259B2

(12) United States Patent
Psaras et al.

(10) Patent No.: US 10,577,259 B2
(45) Date of Patent: Mar. 3, 2020

(54) REMOVAL OF ARSENIC FROM AQUEOUS STREAMS WITH CERIUM (IV) OXIDE COMPOSITIONS

(71) Applicant: Secure Natural Resources LLC, Chicago, IL (US)

(72) Inventors: Dimitrios Psaras, Bound Brook, NJ (US); Yuan Gao, Broomfield, CO (US); Mason Haneline, Henderson, NV (US); Joseph Lupo, Henderson, NV (US); Carol Landi, Devon, PA (US)

(73) Assignee: Secure Natural Resources LLC, Chicago, IL (US)

( * ) Notice: Subject to any disclaimer, the term of this patent is extended or adjusted under 35 U.S.C. 154(b) by 38 days.

(21) Appl. No.: 15/948,558

(22) Filed: Apr. 9, 2018

(65) Prior Publication Data

US 2018/0222772 A1    Aug. 9, 2018

Related U.S. Application Data

(62) Division of application No. 14/642,446, filed on Mar. 9, 2015, now Pat. No. 9,975,787.

(60) Provisional application No. 61/949,799, filed on Mar. 7, 2014.

(51) Int. Cl.
*B01J 20/06* (2006.01)
*C02F 1/28* (2006.01)
*B01J 20/28* (2006.01)
*C02F 101/10* (2006.01)

(52) U.S. Cl.
CPC .............. *C02F 1/281* (2013.01); *B01J 20/06* (2013.01); *B01J 20/28016* (2013.01); *C02F 2101/103* (2013.01); *Y10T 428/2982* (2015.01)

(58) Field of Classification Search
None
See application file for complete search history.

(56) References Cited

U.S. PATENT DOCUMENTS

| 646,931 | A | 4/1900 | Greer |
|---|---|---|---|
| 1,739,840 | A | 12/1929 | Kendall |
| 2,511,507 | A | 6/1950 | Koster |
| 2,564,241 | A | 8/1951 | Warf |
| 2,567,661 | A | 9/1951 | Ayres |
| 2,647,858 | A | 8/1953 | Weisz |
| 2,835,558 | A | 5/1958 | Vaaler |
| 2,847,332 | A | 8/1958 | Ramadanoff |
| 2,872,286 | A | 2/1959 | Finzel |
| 3,024,199 | A | 3/1962 | Pasfield |
| 3,038,844 | A | 6/1962 | Webb et al. |
| 3,194,629 | A | 7/1965 | Dreibelbis et al. |
| 3,259,568 | A | 7/1966 | Jordan et al. |
| 3,337,452 | A | 8/1967 | Teske et al. |
| 3,347,786 | A | 10/1967 | Baer et al. |
| 3,377,274 | A | 4/1968 | Burke |
| 3,385,915 | A | 5/1968 | Hamling |
| 3,575,853 | A | 4/1971 | Gaughan et al. |
| 3,617,568 | A | 11/1971 | Ries, Jr. |
| 3,617,569 | A | 11/1971 | Daniels et al. |
| 3,635,797 | A | 1/1972 | Battistoni et al. |
| 3,658,724 | A | 4/1972 | Stiles |
| 3,692,671 | A | 9/1972 | Recht et al. |
| 3,725,293 | A | 4/1973 | Haas |
| 3,736,255 | A | 5/1973 | Ghassemi et al. |
| 3,753,686 | A | 8/1973 | Wilder et al. |
| 3,758,418 | A | 9/1973 | Leonard, Jr. et al. |
| 3,761,571 | A | 9/1973 | Woodhead |
| 3,768,989 | A | 10/1973 | Goetzinger et al. |
| 3,773,265 | A | 11/1973 | Kent |
| 3,838,759 | A | 10/1974 | Schmoelz et al. |
| 3,849,537 | A | 11/1974 | Allgulin |
| 3,850,835 | A | 11/1974 | Marantz et al. |
| 3,865,728 | A | 2/1975 | Abbott et al. |
| 3,916,585 | A | 11/1975 | Barks |
| 3,926,807 | A | 12/1975 | Evers et al. |
| 3,956,118 | A | 5/1976 | Kleber et al. |
| 3,965,118 | A | 6/1976 | Van Rheenen |
| 4,001,375 | A | 1/1977 | Longo |
| 4,018,678 | A | 4/1977 | Peniston |
| 4,046,687 | A | 9/1977 | Schulze |
| 4,054,516 | A | 10/1977 | Izumi et al. |
| 4,059,520 | A | 11/1977 | Roller |
| 4,078,058 | A | 3/1978 | Fox |
| 4,080,290 | A | 3/1978 | Klantschi et al. |
| 4,088,754 | A | 5/1978 | Monafo |
| 4,094,777 | A | 6/1978 | Sugier et al. |
| 4,096,064 | A | 6/1978 | Du Fresne |
| 4,101,631 | A | 7/1978 | Ambrosini et al. |
| 4,127,644 | A | 11/1978 | Norman et al. |
| 4,145,282 | A | 3/1979 | Bruckenstein |
| 4,200,609 | A | 4/1980 | Byrd |
| 4,213,859 | A | 7/1980 | Smakman et al. |
| 4,218,431 | A | 8/1980 | Spevack |
| 4,230,682 | A | 10/1980 | Bamberger |
| 4,231,893 | A | 11/1980 | Woodhead |
| 4,233,444 | A | 11/1980 | Doonan |

(Continued)

FOREIGN PATENT DOCUMENTS

| CA | 2396510 | 2/2003 |
|---|---|---|
| CA | 2481961 | 10/2003 |

(Continued)

OTHER PUBLICATIONS

Feng Q. et al. Adsorption and Desorption Characteristics of Arsenic Onto Ceria Nanoparticles. Nanoscale Research Letters 7(1)1-8, 2012. (Year: 2012).*

(Continued)

*Primary Examiner* — Ralph J Gitomer
(74) *Attorney, Agent, or Firm* — Sheridan Ross P.C.

(57) ABSTRACT

A cerium (IV) oxide composition having unexpectedly greater arsenic loading capacities than oxides of cerium (IV) of the prior art are disclosed. The arsenic loading capacities are greater at low level equilibrium levels of arsenic. The cerium (IV) oxide composition is more effective at removing arsenite and arsenate. Moreover, the cerium (IV) oxide composition has a greater capacity for the previously more difficult to remove arsenite.

16 Claims, 12 Drawing Sheets

(56) References Cited

U.S. PATENT DOCUMENTS

| | | |
|---|---|---|
| 4,251,496 A | 2/1981 | Longo et al. |
| 4,313,925 A | 2/1982 | Bamberger |
| 4,346,063 A | 8/1982 | Cahn et al. |
| 4,386,063 A | 5/1983 | Boden |
| 4,404,197 A | 9/1983 | Fox et al. |
| 4,432,959 A | 2/1984 | Shimamura |
| 4,433,196 A | 2/1984 | Yang et al. |
| 4,436,655 A | 3/1984 | Masotti et al. |
| 4,474,580 A | 10/1984 | Mackenzie et al. |
| 4,474,896 A | 10/1984 | Chao |
| 4,477,315 A | 10/1984 | Tomaszewski |
| 4,498,706 A | 2/1985 | Ilardi et al. |
| 4,507,206 A | 3/1985 | Hughes |
| 4,566,975 A | 1/1986 | Allgulin |
| 4,581,229 A | 4/1986 | Petrow |
| 4,585,583 A | 4/1986 | Roberson et al. |
| 4,588,088 A | 5/1986 | Allen |
| 4,596,659 A | 6/1986 | Nomura et al. |
| 4,622,149 A | 11/1986 | Devuyst et al. |
| 4,636,289 A | 1/1987 | Mani et al. |
| 4,652,054 A | 3/1987 | Copenhafer et al. |
| 4,661,330 A | 4/1987 | Chane-ching et al. |
| 4,665,050 A | 5/1987 | Degen et al. |
| 4,701,261 A | 10/1987 | Gibbs et al. |
| 4,714,694 A | 12/1987 | Wan et al. |
| 4,717,554 A | 1/1988 | Nomura et al. |
| 4,738,799 A | 4/1988 | Troy |
| 4,746,457 A | 5/1988 | Hassick et al. |
| 4,753,728 A | 6/1988 | VanderBilt et al. |
| 4,781,944 A | 11/1988 | Jones |
| 4,786,483 A | 11/1988 | Audeh |
| 4,793,935 A | 12/1988 | Stillman |
| 4,814,152 A | 3/1989 | Yan |
| 4,818,483 A | 4/1989 | Culling |
| 4,828,832 A | 5/1989 | De Cuellar et al. |
| 4,831,519 A | 5/1989 | Morton |
| 4,842,898 A | 6/1989 | Gradeff |
| 4,843,102 A | 6/1989 | Horton |
| 4,849,223 A | 7/1989 | Pratt |
| 4,857,280 A | 8/1989 | Kay et al. |
| 4,859,432 A | 8/1989 | David et al. |
| 4,861,519 A | 8/1989 | Tusa et al. |
| 4,881,176 A | 11/1989 | Kononov |
| 4,881,976 A | 11/1989 | Gradeff |
| 4,889,771 A | 12/1989 | Gradeff et al. |
| 4,891,067 A | 1/1990 | Rappas et al. |
| 4,902,426 A | 2/1990 | Macedo et al. |
| 4,917,875 A | 4/1990 | Moore et al. |
| 4,920,195 A | 4/1990 | Kankare et al. |
| 4,935,146 A | 6/1990 | O'Neill et al. |
| 4,946,592 A | 8/1990 | Galaj et al. |
| 4,968,322 A | 11/1990 | Miyawaki et al. |
| 4,973,501 A | 11/1990 | Gradeff |
| 4,997,425 A | 3/1991 | Shioya et al. |
| 4,999,174 A | 3/1991 | Wilson et al. |
| 5,002,747 A | 3/1991 | Le Loarer |
| 5,004,711 A | 4/1991 | Grodek |
| 5,013,534 A | 5/1991 | Dissaux et al. |
| 5,017,532 A | 5/1991 | Sonnenberg et al. |
| 5,024,769 A | 6/1991 | Gallup |
| 5,028,736 A | 7/1991 | Girrbach et al. |
| 5,043,072 A | 8/1991 | Hitotsuyanagi et al. |
| 5,053,139 A | 10/1991 | Dodwell et al. |
| 5,061,560 A | 10/1991 | Tajima et al. |
| 5,064,628 A | 11/1991 | Chane-ching et al. |
| 5,066,408 A | 11/1991 | Powell |
| 5,066,758 A | 11/1991 | Honel et al. |
| 5,071,587 A | 12/1991 | Perman |
| 5,080,926 A | 1/1992 | Porter et al. |
| 5,082,570 A | 1/1992 | Higgins et al. |
| 5,104,660 A | 4/1992 | Chvapil et al. |
| 5,116,418 A | 5/1992 | Kaliski |
| 5,116,620 A | 5/1992 | Chvapil et al. |
| 5,124,044 A | 6/1992 | Cassidy et al. |
| 5,126,116 A | 6/1992 | Krause et al. |
| 5,130,052 A | 7/1992 | Kreh et al. |
| 5,133,948 A | 7/1992 | King et al. |
| 5,145,587 A | 9/1992 | Ishii et al. |
| 5,152,936 A | 10/1992 | Tajima et al. |
| 5,161,385 A | 11/1992 | Schumacher |
| 5,178,768 A | 1/1993 | White, Jr. et al. |
| 5,183,750 A | 2/1993 | Nishide et al. |
| 5,192,452 A | 3/1993 | Mitsui et al. |
| 5,204,452 A | 4/1993 | Dingilian |
| 5,207,877 A | 5/1993 | Weinberg et al. |
| 5,207,995 A | 5/1993 | Bosserman |
| 5,213,779 A | 5/1993 | Kay et al. |
| 5,227,168 A | 7/1993 | Chvapil et al. |
| 5,236,595 A | 8/1993 | Wang et al. |
| 5,238,488 A | 8/1993 | Wilhelm |
| 5,248,398 A | 9/1993 | Cordani |
| 5,260,066 A | 11/1993 | Wood et al. |
| 5,262,063 A | 11/1993 | Yen |
| 5,281,253 A | 1/1994 | Thompson |
| 5,326,737 A | 7/1994 | Kay et al. |
| 5,328,669 A | 7/1994 | Han et al. |
| 5,330,770 A | 7/1994 | Kuno |
| 5,336,415 A | 8/1994 | Deans |
| 5,338,460 A | 8/1994 | Yen |
| 5,342,540 A | 8/1994 | Perez |
| 5,344,479 A | 9/1994 | Kerfoot et al. |
| 5,348,662 A | 9/1994 | Yen et al. |
| 5,352,365 A | 10/1994 | Fuller |
| 5,356,437 A | 10/1994 | Pedersen et al. |
| 5,358,643 A | 10/1994 | Mcclintock |
| 5,362,717 A | 11/1994 | Dingilian |
| 5,368,703 A | 11/1994 | Brewster |
| 5,389,352 A | 2/1995 | Wang |
| 5,393,435 A | 2/1995 | Deans |
| 5,403,495 A | 4/1995 | Kust et al. |
| 5,409,522 A | 4/1995 | Durham et al. |
| 5,422,489 A | 6/1995 | Bhargava |
| 5,422,907 A | 6/1995 | Bhargava |
| 5,433,855 A | 7/1995 | Campbell et al. |
| 5,433,865 A | 7/1995 | Laurent |
| 5,433,931 A | 7/1995 | Bosserman |
| 5,446,286 A | 8/1995 | Bhargava |
| 5,455,489 A | 10/1995 | Bhargava |
| 5,482,534 A | 1/1996 | Leonard et al. |
| 5,500,131 A | 3/1996 | Metz |
| 5,500,198 A | 3/1996 | Liu et al. |
| 5,503,766 A | 4/1996 | Kulperger |
| 5,505,766 A | 4/1996 | Chang |
| 5,520,811 A | 5/1996 | Dick et al. |
| 5,529,811 A | 6/1996 | Sinko |
| 5,543,056 A | 8/1996 | Murcott |
| 5,543,058 A | 8/1996 | Miller |
| 5,543,126 A | 8/1996 | Ota et al. |
| 5,545,604 A | 8/1996 | Demmel |
| 5,551,976 A | 9/1996 | Allen |
| 5,556,545 A | 9/1996 | Volcheck et al. |
| 5,573,673 A | 11/1996 | Hayashi et al. |
| 5,575,915 A | 11/1996 | Nakamura et al. |
| 5,575,919 A | 11/1996 | Santina |
| 5,580,535 A | 12/1996 | Hoke et al. |
| 5,603,838 A | 2/1997 | Misra et al. |
| 5,611,934 A | 3/1997 | Shepperd, III et al. |
| 5,618,406 A | 4/1997 | Demmel |
| 5,637,258 A | 6/1997 | Goldburt et al. |
| 5,649,894 A | 7/1997 | White et al. |
| 5,660,802 A | 8/1997 | Archer et al. |
| 5,681,475 A | 10/1997 | Lamensdorf |
| 5,683,953 A | 11/1997 | Mills |
| 5,688,378 A | 11/1997 | Khoe et al. |
| 5,689,038 A | 11/1997 | Bartram et al. |
| 5,698,212 A | 12/1997 | Hagiwara |
| 5,702,592 A | 12/1997 | Suri et al. |
| 5,705,705 A | 1/1998 | Brown et al. |
| 5,707,508 A | 1/1998 | Surma et al. |
| 5,711,930 A | 1/1998 | Albers et al. |
| 5,712,218 A | 1/1998 | Chopin et al. |
| 5,712,219 A | 1/1998 | Klabunde et al. |
| 5,728,404 A | 3/1998 | Von Rheinbaben et al. |
| 5,730,995 A | 3/1998 | Shirono et al. |

(56) References Cited

U.S. PATENT DOCUMENTS

| | | | |
|---|---|---|---|
| 5,759,855 | A | 6/1998 | Pierschbacher et al. |
| 5,759,939 | A | 6/1998 | Klabunde et al. |
| 5,762,891 | A | 6/1998 | Downey et al. |
| 5,783,057 | A | 7/1998 | Tomita et al. |
| 5,795,836 | A | 8/1998 | Jin et al. |
| 5,820,966 | A | 10/1998 | Krause et al. |
| 5,833,841 | A | 11/1998 | Koslowsky |
| 5,859,064 | A | 1/1999 | Cronce |
| 5,876,610 | A | 3/1999 | Clack et al. |
| 5,897,675 | A | 4/1999 | Mangold et al. |
| 5,897,781 | A | 4/1999 | Dourdeville |
| 5,897,784 | A | 4/1999 | Mills |
| 5,910,253 | A | 6/1999 | Fuerstenau et al. |
| 5,914,287 | A | 6/1999 | Saito |
| 5,914,436 | A | 6/1999 | Klabunde et al. |
| 5,918,555 | A | 7/1999 | Winegar |
| 5,922,926 | A | 7/1999 | Back et al. |
| 5,928,504 | A | 7/1999 | Hembre et al. |
| 5,938,837 | A | 8/1999 | Hanawa et al. |
| 5,939,087 | A | 8/1999 | Hagiwara |
| 5,952,665 | A | 9/1999 | Bhargava |
| 5,976,383 | A | 11/1999 | Guess et al. |
| 5,990,373 | A | 11/1999 | Klabunde |
| 5,994,260 | A | 11/1999 | Bonneau |
| 6,001,152 | A | 12/1999 | Sinha |
| 6,001,157 | A | 12/1999 | Nogami |
| 6,017,553 | A | 1/2000 | Burrell et al. |
| 6,030,537 | A | 2/2000 | Shaniuk et al. |
| 6,036,886 | A | 3/2000 | Chhabra et al. |
| 6,045,925 | A | 4/2000 | Klabunde et al. |
| 6,048,821 | A | 4/2000 | Demmel et al. |
| 6,057,488 | A | 5/2000 | Koper et al. |
| 6,059,978 | A | 5/2000 | Pacifi et al. |
| 6,063,266 | A | 5/2000 | Grande |
| 6,087,294 | A | 7/2000 | Klabunde et al. |
| 6,093,236 | A | 7/2000 | Klabunde et al. |
| 6,093,325 | A | 7/2000 | Stone |
| 6,093,328 | A | 7/2000 | Santina |
| 6,099,819 | A | 8/2000 | Srinivas et al. |
| 6,114,038 | A | 9/2000 | Castro et al. |
| 6,123,323 | A | 9/2000 | Yoneda et al. |
| 6,132,623 | A | 10/2000 | Nikolaidis et al. |
| 6,136,749 | A | 10/2000 | Gadkaree et al. |
| 6,143,318 | A | 11/2000 | Gilchrist et al. |
| 6,146,539 | A | 11/2000 | Mills |
| 6,177,015 | B1 | 1/2001 | Blakey et al. |
| 6,180,016 | B1 | 1/2001 | Johnston et al. |
| 6,187,192 | B1 | 2/2001 | Johnston et al. |
| 6,187,205 | B1 | 2/2001 | Martin et al. |
| 6,197,201 | B1 | 3/2001 | Misra et al. |
| 6,197,204 | B1 | 3/2001 | Heskett |
| 6,200,482 | B1 | 3/2001 | Winchester et al. |
| 6,203,709 | B1 | 3/2001 | Min et al. |
| 6,207,177 | B1 | 3/2001 | Jany |
| 6,210,460 | B1 | 4/2001 | Zuliani |
| 6,214,238 | B1 | 4/2001 | Gallup |
| 6,221,118 | B1 | 4/2001 | Yoshida et al. |
| 6,221,602 | B1 | 4/2001 | Barbera-Guillem et al. |
| 6,221,903 | B1 | 4/2001 | Courchesne |
| 6,224,898 | B1 | 5/2001 | Balogh et al. |
| 6,238,566 | B1 | 5/2001 | Yoshida et al. |
| 6,238,686 | B1 | 5/2001 | Burrell et al. |
| 6,248,369 | B1 | 6/2001 | Nier |
| 6,248,605 | B1 | 6/2001 | Harkonen et al. |
| 6,258,334 | B1 | 7/2001 | Gadkaree et al. |
| 6,264,841 | B1 | 7/2001 | Tudor |
| 6,294,006 | B1 | 9/2001 | Andou |
| 6,299,851 | B1 | 10/2001 | Li et al. |
| 6,300,640 | B1 | 10/2001 | Bhargava et al. |
| 6,309,533 | B1 | 10/2001 | Shelp et al. |
| 6,312,604 | B1 | 11/2001 | Denkewicz et al. |
| 6,319,108 | B1 | 11/2001 | Adefris et al. |
| 6,326,326 | B1 | 12/2001 | Feng et al. |
| 6,328,779 | B1 | 12/2001 | He et al. |
| 6,338,800 | B1 | 1/2002 | Kulperger et al. |
| 6,341,567 | B1 | 1/2002 | Robertson et al. |
| 6,342,163 | B1 | 1/2002 | DeLonge et al. |
| 6,350,383 | B1 | 2/2002 | Douglas |
| 6,351,932 | B1 | 3/2002 | Hummel |
| 6,361,824 | B1 | 3/2002 | Yekimov et al. |
| 6,368,510 | B2 | 4/2002 | Friot |
| 6,372,003 | B1 | 4/2002 | Kasai et al. |
| 6,375,834 | B1 | 4/2002 | Guess et al. |
| 6,383,273 | B1 | 5/2002 | Kepner et al. |
| 6,383,395 | B1 | 5/2002 | Clarke et al. |
| 6,391,207 | B1 | 5/2002 | Cluyse |
| 6,391,869 | B1 | 5/2002 | Parks et al. |
| 6,395,659 | B2 | 5/2002 | Seto et al. |
| 6,395,736 | B1 | 5/2002 | Parks et al. |
| 6,403,563 | B1 | 6/2002 | Geroni et al. |
| 6,403,653 | B1 | 6/2002 | Hobson et al. |
| 6,406,676 | B1 | 6/2002 | Sundkvist |
| 6,409,926 | B1 | 6/2002 | Martin |
| 6,410,603 | B1 | 6/2002 | Hobson et al. |
| 6,417,423 | B1 | 7/2002 | Koper et al. |
| 6,420,434 | B1 | 7/2002 | Braue et al. |
| 6,428,705 | B1 | 8/2002 | Allen et al. |
| 6,440,300 | B1 | 8/2002 | Randall et al. |
| 6,444,143 | B2 | 9/2002 | Bawendi et al. |
| 6,452,184 | B1 | 9/2002 | Taskar et al. |
| 6,460,535 | B1 | 10/2002 | Nisewander et al. |
| 6,461,535 | B1 | 10/2002 | de Esparza |
| 6,468,499 | B1 | 10/2002 | Balachandran et al. |
| 6,475,451 | B1 | 11/2002 | Leppin et al. |
| 6,524,487 | B2 | 2/2003 | Kulperger et al. |
| 6,524,540 | B1 | 2/2003 | Heinig |
| 6,528,451 | B2 | 3/2003 | Brezny et al. |
| 6,536,672 | B1 | 3/2003 | Outwater |
| 6,537,382 | B1 | 3/2003 | Bartram et al. |
| 6,542,487 | B1 | 4/2003 | Ishii et al. |
| 6,542,540 | B1 | 4/2003 | Leung et al. |
| 6,551,514 | B1 | 4/2003 | Misra et al. |
| 6,562,092 | B1 | 5/2003 | Ito et al. |
| 6,562,403 | B2 | 5/2003 | Klabunde et al. |
| 6,569,224 | B2 | 5/2003 | Kerfoot et al. |
| 6,569,393 | B1 | 5/2003 | Hoke et al. |
| 6,569,490 | B2 | 5/2003 | Yadav et al. |
| 6,572,672 | B2 | 6/2003 | Yadav et al. |
| 6,576,092 | B2 | 6/2003 | Granite et al. |
| 6,576,156 | B1 | 6/2003 | Ratna et al. |
| 6,585,787 | B2 | 7/2003 | Yamasaki et al. |
| 6,589,496 | B1 | 7/2003 | Yabe et al. |
| 6,599,428 | B1 | 7/2003 | Douglas |
| 6,599,429 | B1 | 7/2003 | Azizian |
| 6,602,111 | B1 | 8/2003 | Fujie et al. |
| 6,602,671 | B1 | 8/2003 | Bawendi et al. |
| 6,602,994 | B1 | 8/2003 | Cash |
| 6,610,264 | B1 | 8/2003 | Buchanan et al. |
| 6,613,230 | B2 | 9/2003 | Krulik et al. |
| 6,623,642 | B2 | 9/2003 | Robertson |
| 6,627,632 | B2 | 9/2003 | Parks et al. |
| 6,653,519 | B2 | 11/2003 | Koper et al. |
| 6,666,903 | B1 | 12/2003 | Green |
| 6,680,211 | B2 | 1/2004 | Barbera-Guillem et al. |
| 6,689,178 | B2 | 2/2004 | Ito et al. |
| 6,706,082 | B2 | 3/2004 | Ota et al. |
| 6,706,195 | B2 | 3/2004 | Jensen et al. |
| 6,716,895 | B1 | 4/2004 | Terry |
| 6,719,828 | B1 | 4/2004 | Lovell et al. |
| 6,723,349 | B1 | 4/2004 | Hill et al. |
| 6,740,141 | B2 | 5/2004 | Espin et al. |
| 6,749,746 | B2 | 6/2004 | Mokrzycki |
| 6,749,748 | B1 | 6/2004 | Mapherson et al. |
| 6,770,483 | B2 | 8/2004 | Lyon |
| 6,774,361 | B2 | 8/2004 | Bawendi et al. |
| 6,780,332 | B2 | 8/2004 | Shiau et al. |
| 6,790,363 | B2 | 9/2004 | Vempati |
| 6,790,420 | B2 | 9/2004 | Breen et al. |
| 6,790,521 | B1 | 9/2004 | Taketomi et al. |
| 6,800,204 | B2 | 10/2004 | Harck et al. |
| 6,808,692 | B2 | 10/2004 | Oehr |
| 6,821,414 | B1 | 11/2004 | Johnson et al. |
| 6,821,427 | B2 | 11/2004 | Macpherson et al. |
| 6,821,434 | B1 | 11/2004 | Moore et al. |

(56) References Cited

U.S. PATENT DOCUMENTS

| | | |
|---|---|---|
| 6,824,690 B1 | 11/2004 | Zhao et al. |
| 6,827,766 B2 | 12/2004 | Carnes et al. |
| 6,827,874 B2 | 12/2004 | Souter |
| 6,833,123 B2 | 12/2004 | Huang et al. |
| 6,843,617 B2 | 1/2005 | Chowdhury et al. |
| 6,843,919 B2 | 1/2005 | Klabunde et al. |
| 6,843,923 B2 | 1/2005 | Morton |
| 6,846,432 B2 | 1/2005 | Mills |
| 6,849,187 B2 | 2/2005 | Shaniuk |
| 6,852,903 B1 | 2/2005 | Brown et al. |
| 6,855,665 B1 | 2/2005 | Blake et al. |
| 6,858,147 B2 | 2/2005 | Dukhin et al. |
| 6,860,924 B2 | 3/2005 | Rajagopalan et al. |
| 6,861,002 B2 | 3/2005 | Hughes |
| 6,862,825 B1 | 3/2005 | Lowndes |
| 6,863,825 B2 | 3/2005 | Witham et al. |
| 6,864,213 B2 | 3/2005 | Labarge et al. |
| 6,881,424 B1 | 4/2005 | Kemp et al. |
| 6,881,766 B2 | 4/2005 | Hain |
| 6,887,302 B2 | 5/2005 | Rajagopalan et al. |
| 6,887,566 B1 | 5/2005 | Hung et al. |
| 6,896,809 B2 | 5/2005 | Qian et al. |
| 6,901,684 B2 | 6/2005 | Ito et al. |
| 6,905,527 B2 | 6/2005 | Ito et al. |
| 6,905,698 B1 | 6/2005 | Aldcroft et al. |
| 6,908,560 B2 | 6/2005 | Guter |
| 6,908,570 B2 | 6/2005 | Green |
| 6,908,628 B2 | 6/2005 | Herruzo Cabrera |
| 6,914,033 B2 | 7/2005 | Gislason et al. |
| 6,914,034 B2 | 7/2005 | Vo |
| 6,916,756 B2 | 7/2005 | Schindler et al. |
| 6,919,029 B2 | 7/2005 | Meng et al. |
| 6,921,739 B2 | 7/2005 | Smith et al. |
| 6,927,501 B2 | 8/2005 | Baarman et al. |
| 6,942,840 B1 | 9/2005 | Broderick |
| 6,946,076 B2 | 9/2005 | Mills |
| 6,946,578 B2 | 9/2005 | Nakano et al. |
| 6,957,743 B2 | 10/2005 | Johnston et al. |
| 6,960,329 B2 | 11/2005 | Sellakumar |
| 6,974,564 B2 | 12/2005 | Biermann et al. |
| 6,977,039 B2 | 12/2005 | Knoll et al. |
| 6,986,798 B2 | 1/2006 | Bessho et al. |
| 6,987,129 B2 | 1/2006 | Mak et al. |
| 6,998,080 B2 | 2/2006 | Stadermann et al. |
| 7,008,559 B2 | 3/2006 | Chen |
| 7,014,782 B2 | 3/2006 | D'Emidio et al. |
| 7,025,800 B2 | 4/2006 | Campbell et al. |
| 7,025,943 B2 | 4/2006 | Zhou et al. |
| 7,029,516 B2 | 4/2006 | Campbell et al. |
| 7,030,163 B2 | 4/2006 | Duneas |
| 7,033,419 B1 | 4/2006 | Granite et al. |
| RE39,098 E | 5/2006 | Klabunde et al. |
| 7,037,480 B2 | 5/2006 | Bhinde |
| 7,048,853 B2 | 5/2006 | Witham et al. |
| 7,048,860 B2 | 5/2006 | Oishi |
| 7,049,382 B2 | 5/2006 | Haftka et al. |
| 7,056,454 B2 | 6/2006 | Fujino |
| 7,060,233 B1 | 6/2006 | Srinivas et al. |
| 7,067,294 B2 | 6/2006 | Singh et al. |
| 7,074,336 B1 | 7/2006 | Teter et al. |
| 7,078,071 B2 | 7/2006 | Taketomi et al. |
| 7,081,428 B1 | 7/2006 | Thampi |
| 7,083,730 B2 | 8/2006 | Davis |
| 7,094,383 B2 | 8/2006 | Wang et al. |
| 7,101,415 B2 | 9/2006 | Torres et al. |
| 7,101,493 B2 | 9/2006 | Colucci |
| 7,112,237 B2 | 9/2006 | Zeller et al. |
| 7,129,684 B2 | 10/2006 | Park |
| 7,141,227 B2 | 11/2006 | Chan |
| 7,156,888 B2 | 1/2007 | Mochizuki |
| 7,156,994 B1 | 1/2007 | Archer |
| 7,157,009 B2 | 1/2007 | Nichols |
| 7,160,465 B2 | 1/2007 | Kirts et al. |
| 7,160,505 B2 | 1/2007 | Belbachir et al. |
| 7,179,849 B2 | 2/2007 | Terry |
| 7,183,235 B2 | 2/2007 | Lovell et al. |
| 7,186,671 B2 | 3/2007 | Smith et al. |
| 7,192,602 B2 | 3/2007 | Fechner et al. |
| 7,211,320 B1 | 5/2007 | Cooper et al. |
| 7,214,836 B2 | 5/2007 | Brown et al. |
| 7,238,287 B2 | 7/2007 | Kulperger |
| 7,241,629 B2 | 7/2007 | Dejneka et al. |
| 7,250,174 B2 | 7/2007 | Lee et al. |
| 7,252,694 B2 | 8/2007 | Woo et al. |
| 7,252,769 B2 | 8/2007 | Dickinson |
| 7,256,049 B2 | 8/2007 | Bennett et al. |
| 7,264,670 B2 | 9/2007 | Ruger et al. |
| 7,276,640 B2 | 10/2007 | Mulukutla et al. |
| 7,279,129 B2 | 10/2007 | Lanz et al. |
| 7,282,153 B2 | 10/2007 | Barrett et al. |
| 7,291,217 B2 | 11/2007 | Phelps et al. |
| 7,291,272 B2 | 11/2007 | Bourke et al. |
| 7,291,315 B2 | 11/2007 | Obee et al. |
| 7,297,263 B2 | 11/2007 | Nelson et al. |
| 7,297,656 B2 | 11/2007 | Zhang et al. |
| 7,300,587 B2 | 11/2007 | Smith et al. |
| 7,300,589 B2 | 11/2007 | Witham et al. |
| 7,311,842 B2 | 12/2007 | Kim |
| 7,329,356 B2 | 2/2008 | Brady |
| 7,329,359 B2 | 2/2008 | Roark |
| 7,335,622 B2 | 2/2008 | Koyanaka et al. |
| 7,335,808 B2 | 2/2008 | Koper et al. |
| 7,338,603 B1 | 3/2008 | McNew et al. |
| 7,341,618 B2 | 3/2008 | Bayer et al. |
| 7,341,667 B2 | 3/2008 | Kennard et al. |
| 7,341,977 B2 | 3/2008 | Klabunde et al. |
| 7,361,279 B2 | 4/2008 | Hernandez |
| 7,368,388 B2 | 5/2008 | Small et al. |
| 7,368,412 B2 | 5/2008 | Tranter et al. |
| 7,374,690 B2 | 5/2008 | Reddy |
| 7,378,372 B2 | 5/2008 | Sylvester |
| 7,381,431 B2 | 6/2008 | Baker et al. |
| 7,384,573 B2 | 6/2008 | Brummett |
| 7,422,759 B2 | 9/2008 | Kepner et al. |
| 7,429,330 B2 | 9/2008 | Vo et al. |
| 7,431,758 B2 | 10/2008 | Ota et al. |
| 7,438,828 B2 | 10/2008 | Young |
| 7,445,718 B2 | 11/2008 | Misra et al. |
| 7,459,086 B2 | 12/2008 | Gaid |
| 7,468,413 B2 | 12/2008 | Yokota et al. |
| 7,473,474 B2 | 1/2009 | Toreki et al. |
| 7,476,311 B2 | 1/2009 | Litz et al. |
| 7,481,939 B2 | 1/2009 | Haley |
| 7,491,335 B2 | 2/2009 | Reddy et al. |
| 7,495,033 B1 | 2/2009 | Chane-ching |
| 7,498,005 B2 | 3/2009 | Yadav |
| 7,524,475 B2 | 4/2009 | Cho et al. |
| 7,524,808 B2 | 4/2009 | Fütterer et al. |
| 7,534,287 B2 | 5/2009 | Zeller et al. |
| 7,534,453 B1 | 5/2009 | Rzigalinski et al. |
| 7,557,072 B2 | 7/2009 | Fütterer et al. |
| 7,560,023 B2 | 7/2009 | Miyazawa et al. |
| 7,566,393 B2 | 7/2009 | Klabunde et al. |
| 7,572,416 B2 | 8/2009 | Alward et al. |
| 7,588,744 B1 | 9/2009 | Sylvester |
| 7,588,782 B2 | 9/2009 | Moerck et al. |
| 7,591,952 B2 | 9/2009 | Young |
| 7,611,620 B2 | 11/2009 | Carson et al. |
| 7,635,415 B2 | 12/2009 | Lestage et al. |
| 7,645,540 B2 | 1/2010 | Boone et al. |
| 7,655,594 B2 | 2/2010 | Okun et al. |
| 7,658,904 B2 | 2/2010 | Boen et al. |
| 7,661,483 B2 | 2/2010 | Mulukutla et al. |
| 7,682,443 B2 | 3/2010 | Sato et al. |
| 7,686,976 B2 | 3/2010 | Witham et al. |
| 7,691,289 B2 | 4/2010 | Okun et al. |
| 7,704,920 B2 | 4/2010 | Yang et al. |
| 7,713,399 B2 | 5/2010 | Martinie et al. |
| 7,723,279 B2 | 5/2010 | Lestage et al. |
| 7,728,132 B2 | 6/2010 | Harvey |
| 7,732,372 B2 | 6/2010 | Hampden-Smith et al. |
| 7,740,984 B2 | 6/2010 | Bushong et al. |
| 7,763,384 B2 | 7/2010 | Boone et al. |
| 7,790,042 B2 | 9/2010 | Nichols |

(56) References Cited

U.S. PATENT DOCUMENTS

| | | | |
|---|---|---|---|
| 7,807,296 B2 | 10/2010 | Vu et al. | |
| 7,820,100 B2 | 10/2010 | Garfield et al. | |
| 7,947,640 B2 | 5/2011 | Shah et al. | |
| 8,066,874 B2 | 11/2011 | Burba et al. | |
| 8,119,555 B2 | 2/2012 | Banerjee et al. | |
| 8,252,087 B2 | 8/2012 | Burba, III et al. | |
| 8,349,764 B2 | 1/2013 | Burba, III | |
| 8,475,658 B2 | 7/2013 | Witham et al. | |
| 8,557,730 B2 | 12/2013 | Burba, III | |
| 8,809,229 B2 | 8/2014 | Burba | |
| 8,883,519 B1 | 11/2014 | Perez et al. | |
| 9,233,863 B2 | 1/2016 | Cable et al. | |
| 9,975,787 B2* | 5/2018 | Psaras | B01J 20/28016 |
| 2001/0009831 A1 | 7/2001 | Schink et al. | |
| 2001/0012856 A1 | 8/2001 | Parks et al. | |
| 2002/0003116 A1 | 1/2002 | Golden | |
| 2002/0005383 A1 | 1/2002 | Voute et al. | |
| 2002/0044901 A1 | 4/2002 | Wilson et al. | |
| 2002/0066702 A1 | 6/2002 | Liu | |
| 2002/0074295 A1 | 6/2002 | Cohen | |
| 2002/0187990 A1 | 12/2002 | Parks et al. | |
| 2003/0024879 A1 | 2/2003 | Carson et al. | |
| 2003/0114083 A1 | 6/2003 | Jernakoff et al. | |
| 2003/0133990 A1 | 7/2003 | Hursey et al. | |
| 2003/0149406 A1 | 8/2003 | Martineau et al. | |
| 2003/0156981 A1 | 8/2003 | Mills | |
| 2003/0180213 A1 | 9/2003 | Carnes et al. | |
| 2003/0203977 A1 | 10/2003 | Klabunde et al. | |
| 2003/0207949 A1 | 11/2003 | Klabunde et al. | |
| 2004/0031764 A1 | 2/2004 | Heinig | |
| 2004/0043914 A1 | 3/2004 | Kaziska et al. | |
| 2004/0045906 A1 | 3/2004 | Wiseman | |
| 2004/0050795 A1 | 3/2004 | Park et al. | |
| 2004/0091417 A1 | 5/2004 | Yadav | |
| 2004/0109853 A1 | 6/2004 | McDaniel | |
| 2004/0202703 A1 | 10/2004 | Meyer-Ingold et al. | |
| 2004/0241424 A1 | 12/2004 | Barbera-Guillem | |
| 2005/0058689 A1 | 3/2005 | McDaniel | |
| 2005/0067347 A1 | 3/2005 | Vanhulle et al. | |
| 2005/0069464 A1 | 3/2005 | Obee et al. | |
| 2005/0084755 A1 | 4/2005 | Boone et al. | |
| 2005/0119497 A1 | 6/2005 | Hong et al. | |
| 2005/0126338 A1 | 6/2005 | Yadav | |
| 2005/0126430 A1 | 6/2005 | Lightner, Jr. et al. | |
| 2005/0129589 A1 | 6/2005 | Wei et al. | |
| 2005/0136486 A1 | 6/2005 | Haushalter | |
| 2005/0153171 A1 | 7/2005 | Beatty et al. | |
| 2005/0257724 A1 | 11/2005 | Guinther et al. | |
| 2005/0288181 A1 | 12/2005 | Tranter et al. | |
| 2006/0000763 A1 | 1/2006 | Rinker et al. | |
| 2006/0013752 A1 | 1/2006 | Lee | |
| 2006/0018954 A1 | 1/2006 | Kuttler | |
| 2006/0020795 A1 | 1/2006 | Gasparini | |
| 2006/0030622 A1 | 2/2006 | Mak et al. | |
| 2006/0049091 A1 | 3/2006 | Cheetham et al. | |
| 2006/0070947 A1 | 4/2006 | Conrad | |
| 2006/0120930 A1 | 6/2006 | Mizukami | |
| 2006/0173083 A1 | 8/2006 | Klipper | |
| 2006/0178609 A1 | 8/2006 | Horn et al. | |
| 2006/0198883 A1 | 9/2006 | Parks et al. | |
| 2006/0199301 A1 | 9/2006 | Basheer et al. | |
| 2006/0199733 A1 | 9/2006 | Grier et al. | |
| 2006/0224237 A1 | 10/2006 | Furst et al. | |
| 2006/0228275 A1 | 10/2006 | Rutman | |
| 2006/0246149 A1 | 11/2006 | Buchholz et al. | |
| 2006/0257728 A1 | 11/2006 | Mortensen et al. | |
| 2006/0275564 A1 | 12/2006 | Grah et al. | |
| 2007/0000836 A1 | 1/2007 | Elefritz et al. | |
| 2007/0012631 A1 | 1/2007 | Coffey et al. | |
| 2007/0039893 A1 | 2/2007 | Kemp et al. | |
| 2007/0062884 A1 | 3/2007 | Sun et al. | |
| 2007/0102672 A1 | 5/2007 | Hamilton | |
| 2007/0114179 A1 | 5/2007 | Badger | |
| 2007/0128424 A1 | 6/2007 | Omori et al. | |
| 2007/0128491 A1 | 6/2007 | Chisholm | |
| 2007/0134307 A1 | 6/2007 | Xiao et al. | |
| 2007/0142783 A1 | 6/2007 | Huey et al. | |
| 2007/0149405 A1 | 6/2007 | Spitler et al. | |
| 2007/0151851 A1 | 7/2007 | Tanaka | |
| 2007/0158251 A1 | 7/2007 | Chau | |
| 2007/0167971 A1 | 7/2007 | Huey et al. | |
| 2007/0169626 A1 | 7/2007 | Sullivan | |
| 2007/0170115 A1 | 7/2007 | Skillicorn | |
| 2007/0191217 A1 | 8/2007 | Twigg | |
| 2007/0254141 A1 | 11/2007 | Morse et al. | |
| 2007/0256982 A1 | 11/2007 | Kelley et al. | |
| 2007/0286796 A1 | 12/2007 | Koper et al. | |
| 2007/0298085 A1 | 12/2007 | Lestage et al. | |
| 2008/0023403 A1 | 1/2008 | Rawson et al. | |
| 2008/0050440 A1 | 2/2008 | Wakamura et al. | |
| 2008/0050471 A1 | 2/2008 | Omasa | |
| 2008/0058206 A1 | 3/2008 | Misra et al. | |
| 2008/0058689 A1 | 3/2008 | Holloway et al. | |
| 2008/0081120 A1 | 4/2008 | Van Ooij et al. | |
| 2008/0097271 A1 | 4/2008 | Lo et al. | |
| 2008/0102136 A1 | 5/2008 | Koper et al. | |
| 2008/0146860 A1 | 6/2008 | Doumbos | |
| 2008/0199539 A1 | 8/2008 | Baker et al. | |
| 2008/0213906 A1 | 9/2008 | Aurand et al. | |
| 2008/0254146 A1 | 10/2008 | Huey et al. | |
| 2008/0254147 A1 | 10/2008 | Huey et al. | |
| 2008/0262285 A1 | 10/2008 | Black et al. | |
| 2008/0302267 A1 | 12/2008 | Defalco | |
| 2008/0311311 A1 | 12/2008 | Khan et al. | |
| 2009/0001011 A1 | 1/2009 | Knipmeyer et al. | |
| 2009/0011240 A1 | 1/2009 | Lenz et al. | |
| 2009/0011930 A1 | 1/2009 | Hagemeyer | |
| 2009/0012204 A1 | 1/2009 | Drechsler et al. | |
| 2009/0069844 A1 | 3/2009 | Green et al. | |
| 2009/0071887 A1 | 3/2009 | Ruech | |
| 2009/0098016 A1 | 4/2009 | Koper et al. | |
| 2009/0101588 A1 | 4/2009 | Misra et al. | |
| 2009/0101837 A1 | 4/2009 | Kourtakis et al. | |
| 2009/0107919 A1 | 4/2009 | Burba, III et al. | |
| 2009/0107925 A1 | 4/2009 | Burba, III et al. | |
| 2009/0108777 A1 | 4/2009 | Hyde et al. | |
| 2009/0111289 A1 | 4/2009 | Vinther | |
| 2009/0120802 A1 | 5/2009 | Ciampi et al. | |
| 2009/0130169 A1 | 5/2009 | Bernstein | |
| 2009/0202434 A1 | 8/2009 | Da Cruz | |
| 2009/0206042 A1 | 8/2009 | Landau et al. | |
| 2009/0258781 A1 | 10/2009 | Maruki et al. | |
| 2009/0264574 A1 | 10/2009 | Van Ooij et al. | |
| 2009/0294381 A1 | 12/2009 | Coffey et al. | |
| 2009/0298738 A1 | 12/2009 | Kneipp et al. | |
| 2009/0299253 A1 | 12/2009 | Hursey | |
| 2010/0003203 A1 | 1/2010 | Karpov et al. | |
| 2010/0042206 A1 | 2/2010 | Yadav et al. | |
| 2010/0055456 A1 | 3/2010 | Perera et al. | |
| 2010/0155330 A1 | 6/2010 | Burba et al. | |
| 2010/0168498 A1 | 7/2010 | Burba et al. | |
| 2010/0187178 A1 | 7/2010 | Witham | |
| 2010/0230359 A1 | 9/2010 | Whitehead et al. | |
| 2010/0243542 A1 | 9/2010 | Burba, III et al. | |
| 2010/0255559 A1 | 10/2010 | Burba, III et al. | |
| 2010/0258448 A1 | 10/2010 | Whitehead et al. | |
| 2010/0264084 A1 | 10/2010 | Midorikawa et al. | |
| 2010/0307980 A1 | 12/2010 | Troy et al. | |
| 2011/0000854 A1 | 1/2011 | Nichols et al. | |
| 2011/0002971 A1 | 1/2011 | Hassler et al. | |
| 2011/0033337 A1 | 2/2011 | Burba, III et al. | |
| 2011/0067315 A1 | 3/2011 | Cho et al. | |
| 2011/0110817 A1 | 5/2011 | Lupo et al. | |
| 2011/0168567 A1 | 7/2011 | Smith et al. | |
| 2011/0297616 A1 | 12/2011 | Hughes et al. | |
| 2011/0303871 A1 | 12/2011 | Burba et al. | |
| 2011/0309017 A1 | 12/2011 | Hassler et al. | |
| 2012/0021025 A1 | 1/2012 | Bendejacq et al. | |
| 2012/0024794 A1 | 2/2012 | Fischmann | |
| 2012/0031827 A1* | 2/2012 | Burba | B01D 39/2079 210/198.2 |
| 2012/0074071 A1 | 3/2012 | Hassler et al. | |
| 2012/0103909 A1 | 5/2012 | Burba et al. | |
| 2012/0125855 A1 | 5/2012 | Hachiki et al. | |

(56) References Cited

U.S. PATENT DOCUMENTS

| | | | |
|---|---|---|---|
| 2012/0138528 A1 | 6/2012 | Burba et al. | |
| 2012/0138529 A1 | 6/2012 | Burba et al. | |
| 2012/0138530 A1 | 6/2012 | Burba et al. | |
| 2012/0187047 A1 | 7/2012 | Cable et al. | |
| 2012/0187337 A1 | 7/2012 | Hassler et al. | |
| 2012/0223022 A1 | 9/2012 | Hassler et al. | |
| 2012/0261347 A1 | 10/2012 | Hassler et al. | |
| 2012/0261611 A1* | 10/2012 | Hassler | C02F 1/5236 252/182.3 |
| 2012/0328681 A1 | 12/2012 | Hassler et al. | |
| 2013/0032529 A1 | 2/2013 | Hassler | |
| 2013/0212944 A1 | 8/2013 | Stephenson et al. | |
| 2014/0117273 A1 | 5/2014 | Nichols et al. | |
| 2014/0158629 A1 | 6/2014 | Nichols et al. | |
| 2015/0196510 A1 | 7/2015 | Reed et al. | |
| 2015/0251926 A1* | 9/2015 | Psaras | B01J 20/06 435/176 |
| 2018/0201519 A1* | 7/2018 | Psaras | B01J 20/06 |

FOREIGN PATENT DOCUMENTS

| | | |
|---|---|---|
| CA | 2494992 | 2/2004 |
| CA | 2530705 | 6/2006 |
| CN | 1248486 | 3/2000 |
| CN | 1962046 | 5/2007 |
| CN | 101015698 | 8/2007 |
| CN | 101500945 | 8/2009 |
| CN | 101804318 | 8/2010 |
| EP | 0049593 | 4/1982 |
| EP | 0191893 | 8/1986 |
| EP | 0541158 | 5/1993 |
| EP | 0597173 | 5/1994 |
| EP | 0812619 | 12/1997 |
| EP | 0939431 | 1/1999 |
| EP | 1201607 | 2/2002 |
| EP | 1080144 | 8/2002 |
| EP | 1369381 | 12/2003 |
| EP | 1452229 | 9/2004 |
| EP | 1071500 | 2/2005 |
| EP | 1695760 | 8/2006 |
| EP | 1870150 | 12/2007 |
| EP | 1992394 | 11/2008 |
| EP | 2161067 | 3/2010 |
| EP | 2177252 | 4/2010 |
| FR | 617870 | 2/1927 |
| GB | 1447264 | 8/1976 |
| GB | 2426469 | 11/2006 |
| JP | S50-83348 | 7/1975 |
| JP | S61-4529 | 1/1986 |
| JP | S61-187931 | 8/1986 |
| JP | S63-287547 | 11/1988 |
| JP | 11-51917 | 6/1989 |
| JP | H2-17220 | 4/1990 |
| JP | 6-207561 | 7/1994 |
| JP | 07-081932 | 3/1995 |
| JP | H07-241464 | 9/1995 |
| JP | 9-141274 | 6/1997 |
| JP | 10-165948 | 6/1998 |
| JP | H11-10170 | 1/1999 |
| JP | 11-090413 | 4/1999 |
| JP | 11-302684 | 11/1999 |
| JP | 2000-024647 | 1/2000 |
| JP | 2000-033387 | 2/2000 |
| JP | 2000-107596 | 4/2000 |
| JP | 2001-198584 | 7/2001 |
| JP | 2001-200236 | 7/2001 |
| JP | 2002-153864 | 5/2002 |
| JP | 2002-205062 | 7/2002 |
| JP | 2002-263641 | 9/2002 |
| JP | 2002-282686 | 10/2002 |
| JP | 2002-349234 | 12/2002 |
| JP | 2003-164708 | 6/2003 |
| JP | 2004-008950 | 1/2004 |
| JP | 2004-016214 | 1/2004 |
| JP | 2004-501198 | 1/2004 |
| JP | 2004-050069 | 2/2004 |
| JP | 2004-057870 | 2/2004 |
| JP | 2004-074146 | 3/2004 |
| JP | 2004-148289 | 5/2004 |
| JP | 2004-275839 | 10/2004 |
| JP | 2003-126379 | 11/2004 |
| JP | 2004-305915 | 11/2004 |
| JP | 2004-314058 | 11/2004 |
| JP | 2004-330012 | 11/2004 |
| JP | 2004-339911 | 12/2004 |
| JP | 2005-023373 | 1/2005 |
| JP | 2003-271850 | 2/2005 |
| JP | 2005-028312 | 2/2005 |
| JP | 2005-048181 | 2/2005 |
| JP | 2005-512804 | 5/2005 |
| JP | 2005-517511 | 6/2005 |
| JP | 2005-246197 | 9/2005 |
| JP | 2004-108704 | 10/2005 |
| JP | 2005-288363 | 10/2005 |
| JP | 2006-036995 | 2/2006 |
| JP | 2006-320847 | 11/2006 |
| JP | 2007-98362 | 4/2007 |
| JP | 2007-98364 | 4/2007 |
| JP | 2007-098366 | 4/2007 |
| JP | 2007-283168 | 11/2007 |
| JP | 2007-283230 | 11/2007 |
| JP | 2007-326077 | 12/2007 |
| JP | 2008-024912 | 2/2008 |
| JP | 2008-238734 | 10/2008 |
| JP | 2009-000638 | 1/2009 |
| JP | 2009-504779 | 2/2009 |
| JP | 2009-249554 | 10/2009 |
| JP | 2010-083741 | 4/2010 |
| KR | 960000309 | 1/1996 |
| RU | 2136607 | 9/1999 |
| RU | 2178599 | 1/2002 |
| SU | 663291 | 5/1979 |
| SU | 1766848 | 10/1992 |
| SU | 1838248 | 8/1993 |
| WO | WO 95/11195 | 4/1995 |
| WO | WO 97/12672 | 4/1997 |
| WO | WO 1997/025275 | 7/1997 |
| WO | WO 98/07493 | 2/1998 |
| WO | WO 99/28239 | 6/1999 |
| WO | WO 00/24680 | 5/2000 |
| WO | WO 01/32799 | 5/2001 |
| WO | WO 01/32820 | 5/2001 |
| WO | WO 01/36333 | 5/2001 |
| WO | WO 01/78506 | 10/2001 |
| WO | WO 03/092748 | 11/2003 |
| WO | WO 2004/016553 | 2/2004 |
| WO | WO 2004/032624 | 4/2004 |
| WO | WO 2004/076770 | 9/2004 |
| WO | WO 2004/096433 | 11/2004 |
| WO | WO 05/028707 | 3/2005 |
| WO | WO 05/042130 | 5/2005 |
| WO | WO 05/056175 | 6/2005 |
| WO | WO 05/075000 | 8/2005 |
| WO | WO 05/081722 | 9/2005 |
| WO | WO 2006/011764 | 2/2006 |
| WO | WO 2006/044784 | 4/2006 |
| WO | WO 2006/047613 | 5/2006 |
| WO | WO 2006/070153 | 7/2006 |
| WO | WO 2006/102008 | 9/2006 |
| WO | WO 2006/117424 | 11/2006 |
| WO | WO 2006/131473 | 12/2006 |
| WO | WO 2007/011877 | 1/2007 |
| WO | WO 2007/041553 | 4/2007 |
| WO | WO 2007/120910 | 10/2007 |
| WO | WO 2008/010844 | 1/2008 |
| WO | WO 2008/036072 | 3/2008 |
| WO | WO 2008/108085 | 9/2008 |
| WO | WO 2008/151173 | 12/2008 |
| WO | WO 2009/064845 | 5/2009 |
| WO | WO 2009/097672 | 8/2009 |
| WO | WO 2009/102854 | 8/2009 |
| WO | WO 2009/142823 | 11/2009 |
| WO | WO 2010/010569 | 1/2010 |

(56) References Cited

FOREIGN PATENT DOCUMENTS

| WO | WO 2010/010570 | 1/2010 |
|---|---|---|
| WO | WO 2010/010571 | 1/2010 |
| WO | WO 2010/010574 | 1/2010 |
| WO | WO 2010/019934 | 2/2010 |
| WO | WO 2011/156817 | 12/2011 |
| WO | WO 2012/141896 | 10/2012 |
| WO | WO 2015/134976 | 9/2015 |
| WO | WO 2015/134981 | 9/2015 |

OTHER PUBLICATIONS

Pang J. et al. Solvothermal Synthesis of Nano CeO2 Aggregates and its Application as a High Efficient Arsenic Adsorbent. Rare Metals 38(1)73-80, 2019. (Year: 2019).*
Examination Report for Australian Patent Application No. 2015226889, dated Nov. 19, 2018 2 pages.
Official Action (English translation) for Japanese Patent Application No. 2016-556760, dated Nov. 6, 2018 5 pages.
Final Action for U.S. Appl. No. 13/433,097, dated Dec. 20, 2018, 13 pages.
U.S. Appl. No. 15/923,719, filed Mar. 16, 2018, Psaras.
"Ammonia," Wikipedia, modified Aug. 6, 2013, 25 pages.
"APV Engineered Coatings Kynare®," Presentation by APV Engineered Coatings, http://www.apvcoatings.com/cms/resource_library/files/8537e627f567af63/kynar_presentation_weiss_inc_fiber_board_cement_pdf_.pdf, date unknown, 30 pages.
"Bastnasite," available at htt://webmineral.com/data/Bastnasite-(Ce).shtml, accessed Jul. 30, 2007, 6 pages.
"Benchtop Granulator™," LCI Corporation Technical Bulletin TB-GR-101, 2004, http://replay.waybackmachine.org/20040518160414/http://www.lcicorp.com/granulation/Docs/benchtop_tb.pdf, 1 page.
"Carbonates," available on the Molycorp website Dec. 13, 2005, pp. 22-30.
"Cerium: A Guide to its role in Chemical Technology," Molycorp, 1992, 48 pages.
"Clear Choices for Clean Drinking Water," Consumer Reports, Jan. 2003, pp. 33-37.
"Distinguishing Adsorption and Surface Precipitation of Phosphate and Arsenate on Hydrous Iron Oxides," http://www.eng.nus.edu.sg/EResnews/0206/rd/rd_1.html, accessed Jul. 25, 2010, 4 pages.
"Drinking Water Contaminants: National Primary Drinking Water Regulations." U.S. Environmental Protection Agency, updated Jan. 11, 2011, 8 pages.
"Drinking Water Treatment Units—Aesthetic Effects." NSF International Standard/American National Standard, prepared by The NSF Joint Committee on Drinking Water Treatment Units, last revised Oct. 2007, NSF/ANSI 42-2007a, 75 pages.
"Drinking Water System Components—Health Effects." NSF International Standard/American National Standard, prepared by The NSF Joint Committee on Drinking Water Additives, NSF/ANSI 61-2009, Last Revised Aug. 2009, 197 pages.
"Drinking Water Treatment Units—Health Effects." NSF International Standard/ American National Standard, prepared by The NSF Joint Committee on Drinking Water Treatment Units, last revised Aug. 2009, NSF/ANSI 53-2009e, 121 pages.
"Homogeneous Reactions of As and Se Oxoanions in Aqueous Solutions, and the Photooxidation of their Reduced Species in the X-ray Beam," available at http://geoweb.princeton.edu/research/geochemistry/research/aqueous-oxoanion.html, accessed May 6, 2009.
"Hydrometallurgy," Hazen Research, INC., available at http://www.hazenusa.com/hydrometallurgy-1.php, accessed Dec. 21, 2006, 7 pages.
"NanoActive Cerium Oxide," NanoScale Corporation, NA106.v.3 Apr. 1, 2008, 2 pages.
"NanoActive Granules," NanoScale Corporation, available at http://www.nanoscalecorp.com/content.php/chemicals/granules/, printed Apr. 2, 2010, 2 pages.
"NanoActive Metal Oxides," NanoScale Corporation, available at http://www.nanoscalecorp.com/content.php/chemicals/home/, printed Apr. 2, 2010, 2 pages.
"NanoActive Powders," NanoScale Corporation, available at http://www.nanoscalecorp.com/content.php/chemicals/powders/, printed Apr. 2, 2010, 2 pages.
"NanoActive Suspensions," NanoScale Corporation, available at http://www.nanoscalecorp.com/content.php/chemicals/suspensions/, printed Apr. 2, 2010, 2 pages.
"National Primary Drinking Water Regulations." U.S. Environmental Protection,Agency, May 2009, EPA 816-F-09-004, 6 pages.
"New Products. Kynar Aquatec from Arkema Inc.," metalmag Magazine, posted May 28, 2009, 2 pages.
"Poly GoneLines," Schaner's Waste Water Products, Inc., available at http://www.struvite.com/products.html#polygone_lines, date unknown, 3 pages.
"Point-of-Use/Entry Treatment of Drinking Water" U.S. Environmental Protection Agency, Jul. 1991, 154 pages.
"Potentiometry," date unknown, 14 pages.
"Radial Xtruder® Model EXDCS-60," LCI Corporation Technical Bulletin, 2006, http://replay.waybackmachine.org/20060511144227/http://www.lcicorp.com/granulation/Docs/xtruder60G_%20tb.pdf, 2 pages.
"Reactive Oxygen Species (ROS)," first printed in R&D Systems 1997 Catalog, retrieved Jul. 21, 2014 from www.rndsystems.com/mini_review_detail_objectname_MR97_ROS.aspx, 3 pages.
"Tributyltin," Extoxnet, Pesticide Information Project, publication date Sep. 1993, available at http://pmep.cce.cornell.edu/profiles/extoxnet/pyrethrins-ziram/tributyltin-ext.html, accessed Jul. 3, 2008, 6 pages.
"Twin Dome Extruder Model TDG-80G," LCI Corporation Technical Bulletin, 2006, http://replay.waybackmachine.org/20060511145629/http://www.lcicorp.com/granulation/Docs/tdg80_extruder_%20tb.pdf, 2 pages.
"UI Arsenic water treatment project shows promise," University of Idaho, Environmental News Network, Dec. 3, 2002, 2 pages.
"Virus," Wikipedia the free encyclopedia, http://wn.wikipedia.org/w/index.php?title=Virus&printable=yes, last modified Mar. 16, 2009, 28 pages.
Abanades et al., "Thermochemical hydrogen production from a two-step solar-driven water-splitting cycle based on cerium oxides," Solar Energy, 2006, vol. 80, pp. 1611-1623.
Adschiri et al., "Hydrothermal Synthesis of Metal Oxide Fine Particles at Supercritical Conditions," Ind. Eng. Chem. Res., 2000, vol. 39, pp. 4901-4907.
Ahmed et al., "Paper 3: Arsenic Mitigation Technologies in South and East Asia," Arsenic Contamination in Groundwater in South and East Asian Countries, vol. II Technical Report, No. 31303, Mar. 2005, pp. 166-207.
Ahmed et al., eds., "Arsenic Mitigation in Bangladesh," Outcome of the International Workshop on Arsenic Mitigation in Bangladesh, Dhaka, Jan. 14-16, 2002, published Oct. 2002, 67 pages.
Ahmed, "An Overview of Arsenic Removal Technologies in Bangladesh and India," Buet-Unu International Workshop on Technologies for Arsenic Removal from Drinking Water, May 5-7, 2001, pp. 251-269.
Ahmed, "Water Supply Options," available at http://www.physics.harvard.edu/~wilson/arsenic/conferences/Feroze_Ahmed/Sec_3 . . ., accessed May 8, 2009, 25 pages, Jan. 29, 2002.
Al-Abed et al., "Arsenic Release from Iron Rich Mineral Processing Waste; Influence of pH and Redox Potential," Chemosphere, 2007, vol. 66, pp. 775-782.
Alam et al., "Chemical Extraction of Arsenic from Contaminated Soil," J. Environ Sci Health A Tox Hazard Subst Environ Eng., 41 (4), pp. 631-643 (2006 ).
Alam et al., "Extraction of arsenic in a synthetic arsenic-contaminated soil using phosphate," Chemosphere, 2001, vol. 43, pp. 1035-1041.
Ali et al., "Fate of Arsenic in Wastes Generated from Arsenic Removal Units," In Proceedings of BUET-UNU Symposium on Fate of Arsenic in the Environment, Dhaka, Feb. 5-6, 2003, Bangladesh University of Engineering and Technology and United Nations University, Bangladesh, pp. 147-159.

(56) References Cited

OTHER PUBLICATIONS

Amimono, "Arsenic removal by inorganic ion-exchanger," available at http://www.apec-vc.or.jp/e/modules/tinyd00/index.php?id=63&kh_open_cid_00=7, accessed May 8, 2009, 3 pages.
Arsenate, Wikipedia, available at http://en.wikipedia.org/w/index.php?title=Arsenate&printable=yes, accessed May 6, 2009, 2 pages.
Australian Drinking Water Guidelines, H2O: Part V Facts Sheets, date unknown, 355 pages.
Baker et al., "Present General Status of Understanding of Heteropoly Electrolytes and a Tracing of Some Major Highlights in the History of Their Elucidation," Chem. Rev., 1998, vol. 98(1), pp. 3-50.
Banu et al., "Fabrication of Diffaction-encoded micro-particles using nano-imprint lithography," J. Micromech. Microeng., 2007, vol. 17, pp. S116-S121.
Bauer_et al. "Recovery of Cerium and Lanthanum by Ozonation of Lanthanide Solutions." U.S. Department of the Interior Bureau of Mines, May 1968, 15 pages.
Bommaraju et al. "Chlorine" Kirk-Othmer Encyclopedia of Chemical Technology, published online Nov. 2002, vol. 6, John Wiley & Sons, pp. 130-211.
Burkes et al., "The Bacteriostatic Activity of Cerium, Lanthanum, and Thallium," Journal of Bacteriology, 1947, vol. 54, pp. 417-424.
Candries, M. et al., "Foul Release System and Drag," Consolidation of Technical Advances in the Protective and Marine Coatings Industry, Proceedings of the PCE 2001 Conference, pp. 273-286, Antwerp, 12 pages.
Cartwright, P.S., "A Residential Drinking Water Treatment Primer: Part 1," Water Conditioning and Purification, Feb. 2008, 6 pages.
Casey, "Mystery Ceramic could lead to cheaper, stronger hydrogen fuel cells," gas2.0, Oct. 12, 2009, available at http://gas2.org/2009/10/12/mystery-ceramic-could-lead-to-cheaper-stronger-solid- . . . 3 pages.
Chambers et al., "Modern approaches to marine antifouling coatings," Surface & Coatings Technology, 2006, vol. 201, pp. 3642-3652.
Chang et al., "Wet air oxidation of a reactive dye solution using CoAlPO4-5 and CeO2 catalysts," Chemosphere, Aug. 2003, vol. 52, No. 6, pp. 943-949.
Chi et al., "Preparation of Enriched Cerium Oxide from Bastnasite with Hydrochloric Acid by Two-Step Leaching," Metallurgical and Materials Transactions B, Apr. 2006, vol. 37(2), pp. 155-160.
ClearWater Filtration Systems, Press Release, "New Filtration Patent to Revolutionize Home Water Filtration: Arsenic Levels Can Now be Controlled," date unknown, 1 page.
Clifford et al., "Oxidizing Arsenic III to Arsenic V for Better Removal," Water & Wastes Digest, Water Quality Products, Mar. 2001, vol. 6, No. 3, available at http://www.wwdmag.com/Oxidizing-Arsenic-III-to-Arsenic-V-for-Better-Removal- . . . , accessed May 6, 2009, 2 pages.
Coronado et al., "Polyoxometalate-based Molecular Materials," Chem. Rev., 1998, vol. 98, No. 1, pp. 273-296.
Corvini et al., "Mercury Removal from Natural Gas and Liquid Streams," UOP LLC, date unknown, 11 pages.
Cotton, "Modern Inorganic Chemistry," Part 2, Moscow, World, 1969, pp. 202-203.
Creaser et al., "X-ray photoelectron spectroscopic study of the oxidation and reduction of a cerium(III) oxide/cerium foil substrate," Catalysis Letters, 1994, vol. 23, pp. 13-24.
Dauber, "Anaerobtechnik. Handbuch der anaeroben Behandlung von Abwasser und Schlamm," 1993, pp. 340-341 (includes translation).
Dejneka et al., "Rare earth-doped glass microbarcodes," PNAS, Jan. 2003, vol. 100(2), pp. 389-393.
Devito et al. "Mercury" Kirk-Othmer Encyclopedia of Chemical Technology, published online Aug. 2005, vol. 15, John Wiley & Sons, pp. 1-22.
Doheny "Drugs in Our Drinking Water? Experts put potential risks in perspective after a report that drugs are in the water supply." WebMD, 2008, 4 pages [retrieved from: http://www.webmd.com/a-to-z-guides/features/drugs-in-our-drinking-water?print=true].

Dos Santos et al., "Review paper on current technologies for decolourisation of textile wastewaters: Perspectives for Anaerobic biotechnology," Bioresource Technology, 2007, vol. 98, pp. 2369-2385.
Eggeman "Sodium Hydroxide." Kirk-Othmer Encyclopedia of Chemical Technology, published online Apr. 2011, John Wiley & Sons, pp. 1-16.
Emsley, The Elements, Third Edition, 1998, pp. 22-23, 26-27, 54-55, 110-111.
Everett et al., "Study of the Uncatalyzed Oxidation of Arsenic(III) by Cerium(IV) in Perchloric Acid Medium," Anal. Chem., Oct. 1971, vol. 43(12), pp. 1541-1547.
Fattah, "Pilot Scale Struvite Recovery Potential from Centrate at Lulu Island Wastewater Treatment Plant," Masters Thesis, excerpts from Chapter 2, Univ. of British Columbia, 2004, 8 pages.
Feldman "Sodium Chloride." Kirk-Othmer Encyclopedia of Chemical Technology, published online Oct. 2011, John Wiley & Sons, pp. 1-27.
Fertonani et al., "Solid State Reactions of Mercury with Pure Noble Metals Part 2 Mercury iridium system," Journal of Thermal Analysis and Calorimetry, 2002, vol. 67, pp. 403-409.
Filtronics "NXT-2 Adsorptive media for arsenic removal," at http://www.filtronics.com/nxt2.htm, date unknown, copyright 1998, 2008, 2 pages.
Firsching et al., "Solubility Products of the Trivalent Rare-Earth Phosphates," J. Chem. Eng. Data, 1991, vol. 36, pp. 93-95.
Firsching, "Solubility Products of the Trivalent Rare-Earth Arsenates," J. Chem. Eng. Data, 1992, vol. 37, pp. 497-499.
Friend-Gray, "An Appetite for Apatite: A Study of Black Apatite Adsorption Effects on Organic and Non-Organic Environmental Contaminants," Inquiry Journal, Spring 2008, at http://www.unh.edu/inquiryjournal/08/articles/friendgray.html, 6 pages.
Fry "Electrochemical Processing, Organic." Kirk-Othmer Encyclopedia of Chemical Technology, published online Oct. 2004, vol. 9, John Wiley & Sons, pp. 652-685.
Fujikawa et al., "Simulteneous removal of arsenic, iron and manganese in biological treatment unit," available at http://www.apec-vc.or.jp/e/modules/tinyd00/index.php?id=65&kh_open_cid_00=7, accessed May 8, 2009, 3 pages.
Fujikawa et al., "The aim of this special edition," Kyoto University, available at http://www.apec-vc.or.jp/e/modules/tinyd00/index.php?id=61&kh_open_cid_00=7, accessed May 8, 2009.
Gaur et al., "Surface Modification of Activated Carbon for the Removal of Water Impurities," Water Conditioning & Purification, Jun. 2008, 5 pages.
Goldberg, "Competitive Adsorption of Arsenate and Arsenite on Oxides and Clay Minerals," Soil Sci. Soc. Am. J., 2002, vol. 66, pp. 413-421.
Gordon, "Network Progress: An Update from the Secretariat," World Health Organization: International Network to Promote Household Water Treatment and Safe Storage, Issue 2, May 2005, 10 pages.
Gouzerh et al., "Main-Group Element, Organic, and Organometallic Derivatives of Polyoxometalates," Chem. Re., 1998, vol. 98, No. 1, pp. 77-112.
Granite et al., "Novel Sorbents for Mercury Removal from Flue Gas," Ind. Eng. Chem. Res., 2000, vol. 39, pp. 1020-1029.
Granite et al., "Sorbents for Mercury Capture from Fuel Gas with Application to Gasification Systems," Ind. Eng. Chem. Res., 2006, vol. 45, pp. 4844-4848.
Granite et al., "Techniques for Mercury Control and Measurement in Gasification Systems," Presented at the 5th International Symposium on Gas Cleaning at High Temperature, Morgantown, WV, Sep. 2002, pp. 1-5.
Grotheer "Electrochemical Processing, Inorganic." Kirk-Othmer Encyclopedia of Chemical Technology, published online Dec. 2000, vol. 9, John Wiley & Sons, pp. 618-652.
Gupta et al., "Novel Fluoropolymer-Based Striving for," www.pcimag.com, Jul. 2007, pp. 70-80.
Hakuta et al., "Production of Ultra-fine Ceria Particles by Hydrothermal Synthesis Under Supercritical Conditions," Journal of Materials Science Letters, 1998, vol. 17, pp. 1211-1213.

(56) References Cited

OTHER PUBLICATIONS

Harck, "Arsenic in the US," Clean Water Filtration Systems, Jan. 2002, 42 pages.
Haron et al., "Sorption removal of arsenic by cerium-exchanged zeolite P," Materials Science and Engineering B, 2008, vol. 149, pp. 204-208.
Haron et al. "Sorption removal of arsenic by cerium-exchanged zeolite," Poster at E-MRS Fall Meeting 2007, Symposium F, Sep. 17-21, 2007, 2 pages (Abstract).
Harper et al., "Removal of arsenic from wastewater using chemical precipitation methods," Water Environment Research, 1992, vol. 64(3), pp. 200-203.
Hayes et al., "The Phase Stability of Cerium Species in Aqueous Systems," Journal of the Electrochemical Society, 2002, vol. 149(12), pp. C623-C630.
Heckert et al., "The role of cerium redox state in the SOD mimetic activity of nanoceria," Biomaterials, Jun. 2008, vol. 29, pp. 2705-2709.
Hemmila et al., "Progress in Lanthanides as Luminescent Probes," Journal of Fluorescence, vol. 15, No. 4, Jul. 2005, pp. 529-542.
Henderson et al., "Redox properties of water on the oxidized and reduced surfaces of $CeO_2(111)$," Surface Science, Feb. 20, 2003, vol. 526(1-2), pp. 1-18.
Higuchi et al., "Electronic structure of protonic conductor $SrCeO_3$ by soft-X-ray spectroscopy," Solid State Ionics, Nov. 2004, vol. 175, pp. 549-552.
Hill, "Introduction: Polyoxometalates—Multicomponent Molecular Vehicles to Probe Fundamental Issues and Practical Problems," Chem. Re., 1998, vol. 98, No. 1, pp. 1-2.
Hisham et al. "Hydrogen Chloride." Kirk-Othmer Encyclopedia of Chemical Technology, published online Dec. 2004, vol. 13, John Wiley & Sons, pp. 808-837.
Ho et al., "Removal of fluoride from water through ion exchange by mesoporous Ti oxohydroxide," Journal of Colloid and Interface Science, 2004, vol. 272, pp. 399-403.
Holder "In vitro inactivation of silver sulphadiazine by the addition of cerium salts." Burns, including thermal injury, Mar. 1982, vol. 8, No. 4, pp. 274-277, Medline Accession # 1982162046, Doc. # PUBMED ID: 7066726 (Abstract).
Housecroft et al., "Inorganic Chemistry," 2001, Pearson Prentice Hall, chapter 7, pp. 170-186; chapter 14, pp. 338-344; Appendix 11, pp. 752-754; chapter 24, pp. 622-640.
Ishihara et al., "Pore size control for mesoporous titanium hydroxide prepared with mixed template molecules and its fluoride ion-exchange property," Microporous and Mesoporous Materials, 2009, vol. 122, pp. 87-92.
Jadhav, "Development and Evaluation of Nanoscale Sorbents for Mercury Capture from Warm Fuel Gas," Aug. 25, 2006, 44 pages.
Jang et al., "Remediation of Arsenic-Contaminated Solids and Washing Effluents," Chemosphere, 2005, vol. 60, pp. 344-354.
Jeannin, "The Nomenclature of Polyoxometalates: How to Connect a Name and a Structure," Chem. Rev., 1998, vol. 98, No. 1, pp. 51-76.
Jiang et al., "Biological nano-mineralization of Ce phosphate by *Saccharomyces cerevisiae*," Article in Press, Chemical Geology, 2010, vol. xxx, pp. xxx-xxx, 9 pages.
Johannesson et al., "The solubility control of rare earth elements in natural terrestrial waters and the significance of $PO_4^{3-}$ and $CO_3^{2-}$ in limiting dissolved rare earth concentrations: A review of recent information," Aquatic Geochemistry, 1995, vol. 1, pp. 157-173.
Johnston et al., "Safe Water Technology for Arsenic Removal," Technologies for Arsenic Removal from Drinking Water, pp. 1-22, date unknown.
Jones et al., "Arsenic 2000: An Overview of the Arsenic Issue in Bangladesh," Water Aid Bangladesh, Dec. 2000, 70 pages.
Kaczur et al. "Chlorine Oxygen Acids and Salts, Chlorous Acid, Chlorites, and Chlorine Dioxide." Kirk-Othmer Encyclopedia of Chemical Technology, published online Dec. 2000, John Wiley & Sons, pp. 1-26.

Kahakachchi et al., "Extraction of arsenic species from spiked soils and standard reference materials," Analyst, 2004, vol. 129, pp. 714-718.
Katsoulis, "A Survey of Applications of Polyoxometalates," Chem. Rev., 1998, vol. 98, No. 1, pp. 359-388.
Kim "Ionomers" Kirk-Othmer Encyclopedia of Chemical Technology, published online Apr. 2005, vol. 14, John Wiley & Sons, pp. 1-32.
Kim et al., "Carbonate Effects in the Electrochemical Oxidation of Arsenite," Electrochemical Methods for Wastewater and Potable Water Treatment, Preprints of Extended Abstracts, vol. 42, No. 2, 2002.
Kirk et al., "Pigments," Kirk-Othmer Encyclopedia of Chemical Technology, Fourth Edition, vol. 19, 1996, John Wiley & Sons, pp. 1-77.
Kirk-Othmer, ed., "Colorants for Foods, Drugs, Cosmetics, and Medical Devices," Encyclopedia of Chemical Technology, Fourth Edition, vol. 6, 1998, John Wiley & Sons, pp. 892-941.
Kirk-Othmer, ed., "Dye Carriers," Encyclopedia of Chemical Technology, Fourth Edition, vol. 8, 1998, John Wiley & Sons, pp. 533-600.
Klabunde, K., "Overview of NanoScale: Its Technology and Capabilities," slideshow presentation by NanoScale, date unknown, 31 pages.
Klemperer et al., "Polyocoanion Chemistry Moves toward the Future: From Solids and Solutions to Surfaces," Chem. Rev., 1998, vol. 98, No. 1, pp. 297-306.
Kozhevnikov, "Catalysis by Heteropoly Acids and Multicomponent Polyoxometalates in Liquid-Phase Reactions," Chem. Rev., 1998, vol. 98, No. 1, pp. 171-198.
Kozlova et al., "Overall water splitting over $Pt/TiO2$ catalyst with $Ce3+/Ce4+$ shuttle charge transfer system," International Journal of Hydrogen Energy, 2009, vol. 34, pp. 138-146.
Kreh et al., "Selective Oxidations with Ceric Methanesulfonate and Ceric Trifluoromethanesulfonate," Tetrahedron Letters, 1987, vol. 28, No. 10, pp. 1067-1068.
Kreutzberger "Chloroformates and Carbonates." Kirk-Othmer Encyclopedia of Chemical Technology, published online Apr. 2001, vol. 6, John Wiley & Sons, pp. 290-323.
Kroschwitz et al., eds., "Lanthanides," Kirk-Othmer Encyclopedia of Chemical Technology, Fourth Edition, vol. 14, 1995, John Wiley & Sons, pp. 1091-1115.
Lambert, Human Health and Toxicology Information Sheet for Lanthanum Concentrate (5210/5212) and Lanthanum Lantanum Chloride (5240/5241), pp. 1-8, University of California, Irvine.
Lancaster et al., eds., "Tertiary Phosphorus Removal," WERF, last updated Nov. 4, 2008, pp. 1-19.
Lemke et al. "Sodium and Sodium Alloys." Kirk-Othmer Encyclopedia of Chemical Technology, published online Apr. 2001, John Wiley & Sons, pp. 1-34.
Lemont et al., "Promising optimization of the $CeO2/CeCl3$ cycle by reductive dissolution of cerium(IV) oxide," International Journal of Hydrogen Energy, 2008, vol. 33, pp. 7355-7360.
Li et al., "Exceptional Arsenic Adsorption Performance of Hydrous Cerium Oxide Nanoparticles," Chemical Engineering Journal, 2012, vol. 185-186, pp. 127-135.
Li et al., "Synergism between rare earth cerium(IV) ion and vanillin on the corrosion of steel in $H_2SO_4$ solution: Weight loss, electrochemical, UV-vis, FTIR, XPS, and AFM approaches," Applied Surface Science, Jun. 2008, vol. 254, pp. 5574-5586.
Liederbach "Metal Anodes" Kirk-Othmer Encyclopedia of Chemical Technology, published online Dec. 2000, vol. 15, John Wiley & Sons, pp. 1-17.
Lin et al."Catalytic wet air oxidation of phenol by various $CeO_2$ catalysts," Water Research, 2002, vol. 36, pp. 3009-3014.
Link et al., "Inorganic Nanoparticles for Transfection of Mammalian Cells and Removal of Viruses from Aqueous Solutions," Biotechnology and Bioengineering, vol. 98, No. 5, Dec. 1, 2007, pp. 1083-1093.
Lipps et al., "Arsenic Removal from Drinking Water by Adsorptive Media," U.S. EPA Demonstration Project at Spring Brook Mobile Home Park in Wales, ME, Six-Month Evaluation Report, Sep. 2006, 12 pages.

(56) References Cited

OTHER PUBLICATIONS

Liu et al. "Effect of CeO2 doping on catalytic activity of Fe2O3/gamma-Al2O(3) catalyst for catalytic wet peroxide oxidation of azo dyes," J. Hazard. Mater., May 8, 2007, vol. 143(1-2), pp. 448-454, School of Municipal & Environmental Engineering, Harbin Institute of Technology, China.
Lopez-Anton et al., "Retention of mercury in activated carbons in coal combustion and gasification flue gases," Fuel Processing Technology, Jun. 20, 2002, vol. 77-78, pp. 353-358.
Lowell et al., "Selection of Metal Oxides for Removing SO2 From Flue Gas," Ind. Eng. Chem. Proc. Des. Dev., 1971, vol. 10, No. 3, pp. 384-390.
Magalhães, "Arsenic. An environmental problem limited by solubility," Pure Appl. Chem., 2002, vol. 74(10), pp. 1843-1850.
Mancini "Pharmacology of the rare earths. Nlanthanum." Arch Fisiol, 1926, vol. 24, No. 2, pp. 162-175, Biosis accession # 1927:7297, Doc. # PREV1920100009524; BAO1; 9524 (Abstract).
Marshall "Chlorocarbons and Chlorohydrocarbons." Kirk-Othmer Encyclopedia of Chemical Technology, published online Apr. 2003, vol. 6, John Wiley & Sons, pp. 226-253.
Meloche et al., "Solubility product relations in the rare earth hydrous hydroxides," Analytica Chimica Acta, 1959, vol. 20, pp. 415-418.
Mendiratta et al. "Chloric Acid and Chlorates." Kirk-Othmer Encyclopedia of Chemical Technology, published online May 2005, vol. 6, John Wiley & Sons, pp. 103-120.
Miura et al., "Determination of sulfur anions at the ppb level by ion chromatography utilizing their catalytic effects on the postcolumn reaction of iodine with azide," J. Chromatography A, 1998, vol. 804, pp. 143-150.
Mizuno et al., "Heterogeneous Catalysis," Chem. Rev., 1998, vol. 98, No. 1, pp. 199-218.
Monafo et al. "Cerium nitrate: a new topical antiseptic for extensive burns." Surgery, Oct. 1976, vol. 80, No. 4, pp. 465-473, Medline Accession # 1977015843, Doc. # 135364 (Abstract).
Morton et al. "Reduced Phosphorus Compounds in the Environment," Critical Reviews in Environmental Science and Technology, 2005, vol. 35, No. 4, pp. 333-364.
Muller et al., "Polyoxometalates: Very Large Clusters—Nanoscale Magnets," Chem. Rev., 1998, vol. 98, No. 1, pp. 239-272.
Mullins et al., "Electron spectroscopy of single crystal and polycrystalline cerium oxide surfaces," Surface Science, Jul. 1998, vol. 409, pp. 307-319.
Municipal Wastewater Treatment Plant Energy Baseline Study, PG&E New Construction Energy management Program, prepared by M/J Industrial Solutions, San Francisco, CA, Jun. 2003, 43 pages.
Municipal Water Treatment—> Potable Water: Adding Fluoride, compiled Jul. 26, 2011, 5 pages.
Municipal Water Treatment, compiled Jul. 26, 2011, 7 pages.
Murcott et al., "Innovative and Sustainable Technologies to Address the Global Arsenic Crisis," Sandia National Laboratories 2005 Vendor's Forum, Albuquerque, New Mexico, Nov. 2, 2005, 85 pages.
Mushak, "Potential Impact of Acid Precipitation on Arsenic and Selenium," Environmental Health Perspectives, 1985, vol. 65, pp. 105-113.
Nilchi et al., "Adsorption of selected ions on hydrous cerium oxide," Journal of Radioanalytical and Nuclear Chemistry, 2009, vol. 279(1), pp. 65-74.
Ohashi, "Arsenic removal technology—Arsenic removal using manganese oxide," available at http://www.apec-vc.or.jp/e/modules/tinyd00/index.php?id=64&kh_open_cid_00=7, accessed May 8, 2009, 5 pages.
Oztekin, "Recovery of Acides from Salt Forms," Desalinatio, 2007, vol. 212, pp. 62-69.
Patil et al., "Protein adsorption and cellular uptake of cerium oxide nanoparticles as a function of zeta potential," Biomaterials, 2007, vol. 28(31), pp. 4600-4607.

Paulenova et al., "Redox potentials and kinetics of the Ce3+/Ce4+ redox reaction and solubility of cerium sulfates in sulfuric acid solutions," Journal of Power Sources, vol. 109, 2002, pp. 431-438.
Peng et al., "Ceria nanoparticles supported on carbon nanotubes for the removal of arsenate from water," Materials Letters, 2005, vol. 59, pp. 399-403.
PhosGuard Product Description, at http://www.seachem.com/Products/product_pages/PhosGuard.html, copyright 2007-2011, 2 pages.
Portzer et al., "Development of novel sorbents for mercury control at elevated temperatures in coal-derived syngas: Results of initial screening of candidate materials," Fuel Process. Technol., 2004, vol. 85, pp. 621-630.
Pradeep, T., "Affordable clean water using nanotechnology," Indian Institute of Technology Madras, Potential Environmental Benefits of Nanotechnology: Fostering safe innovation-led growth, OECD Jul. 15-17, 2009, 58 pages.
Press Release, "Arkema proudly announces a new water-based fluoropolymer platform: Kynar® Aquatec™," Arkema Inc., Jun. 26, 2006, available at http://www.arkemasalescorner.com/kynar.page.cfm?pag=985&PRR_ID=669, 1 page.
Press Release, "Kynar Aquatec® FMA Resins: Cool-Roof Coatings are Now Significantly Longer Lasting," Arkema Inc., Aug. 24, 2009, available at http://www.arkema-inc.com/index.cfm?pag=343&PRR, 1 page.
Primer for Municipal Wastewater Treatment Systems, U.S. Environmental Protection Agency, EP 832-R-04-001, Sep. 2004, pp. 1-29.
Product Sheet for FXPb1 Carbon Filters, Filtrex Technologies Pvt. Ltd, dated unknown, 2 pages.
Puraspec 1156 Mercury Removal, Johnson Matthey Catalysts 2003, 2 pages.
Puszynski et al., "Demonstration Project for Arsenic Removal from Drinking Water at Keystone, South Dakota," Mar. 15, 2005, 23 pages.
Qureshi et al., "Synthesis, Dehydration Studies, and Cation-Exchange Behavior of a New Phase of Niobium(V) Phosphate," Bull. Chem. Soc. Jpn., Oct. 1986, vol. 59, pp. 3247-3255.
Raichur et al., "Adsorption of fluoride onto mixed rare earth oxides," Separation and Purification Technology, 2001, vol. 24, pp. 121-127.
Reitzel et al., "Identification of Dissolved Nonreactive Phosphorus in Freshwater by Precipitation with Aluminum and Subsequent $^{31}$P NMR Analysis," Environ. Sci. Technol., 2009, vol. 43(14), pp. 5391-5397.
Rhule et al., "Polyoxometalates in Medicine," Chem. Re., 1998, vol. 98, No. 1, pp. 327-358.
Rodea-Palomares et al., "Physicochemical Characterization and Ecotoxicological Assessment of CeO2 Nanoparticles Using Two Aquatic Microorganisms," Toxicological Sciences, vol. 119, No. 1, 2011, pp. 135-145.
Romeo et al, "XPS Study of the Reduction of Cerium Dioxide," Surface and Interface Analysis, May 1993, vol. 20, pp. 508-512.
Romero et al., "Syntheses, Crystal Structures, and Characterization of Bismuth Phosphates," Inorg. Chem., 1994, 33, pp. 1869-1874.
Sadakane et al., "Electrochemical Properties of Polyoxometalates as Electrocatalysts," Chem. Re., 1998, vol. 98, No. 1, pp. 219-238.
Seida et al., "Synthesis of clay-cerium hydroxide conjugates for the adsorption of Arsenic," Adsorption Science and Technology, Dec. 2005, vol. 23, No. 8, pp. 607-618.
Shankar, P.A., "Coconut Shell Based Activated Carbon with No Green House Gas Emission," Water Conditioning & Purification, Mar. 2008, 4 pages.
Sharmin, "Arsenic Removal Processes on Trial in Bangladesh," Technologies for Arsenic Removal from Drinking Water, BUET-UNU International Workshop, Dhaka, Bangladesh, May 5-7, 2001, pp. 23-30.
Shimoto, "Arsenic Removal Technology—Cerium adsorbent," available at http://www.apec-vc.or.jp/e/modules/tinyd00/index.php?id=62&kh_open_cid_00=7, accessed May 8, 2009, 4 pages.
Singh et al., "Ce0.67Cr0.33O2.11: A New Low-Temperature O2 Evolution Material and H2 Generation Catalyst by Thermochemical Splitting of Water†" Chem. Matter. 2009, 7 pages.

(56) References Cited

OTHER PUBLICATIONS

Smith et al., "American Rare Earth Minerals: The Indispensable Resource for Clean Energy Technologies," Molycorp Minerals, LLC, Prepared for Congressional Leaders Jan. 29, 2009, 21 pages.
Song et al., "Mechanism of the Photocatalytic Degradation of C.I. Reactive Black 5 at pH 12.0 Using SrTiO3/CeO2 as the Catalyst," Environmental Science & Technology, 2007, vol. 41, No. 16, pp. 5846-5853, College of Biological and Environmental Engineering, China.
Song et al., "Photocatalytic degradation of C.I. Direct Red 23 in aqueous solutions under UV irradiation using SrTiO3/CeO2 composite as the catalyst," Journal of Hazardous Materials, Apr. 15, 2008, vol. 152(3), pp. 1301-1308.
Spiro et al., "Heterogeneous Catalysis in Solution. Part II. The Effect of Platinum on Oxidation-Reduction Reactions," J. Chem. Soc., 1965, pp. 78-96.
Spotnitz et al., "Mediated electrosynthesis with cerium (IV) in methanesulphonic acid," Journal of Applied Chemistry, Mar. 1990, vol. 20, No. 2, 209-215.
Standford et al., "Perchlorate, bromate, and chlorate in hypochlorite solutions: Guidelines for utilities," and Errata, J. American Water Works Association, vol. 103(6), 15 pages.
Stiltner, "Mercury Removal from Natural Gas and Liquid Streams," 2001, UOP LLC, 10 pages.
Sukharev, "Synthesis and use of specific oxyhydrate sorbents," Moscow, Energoatomizdat, 1987, pp. 75-102.
Surasitani et al., "Kinetics of the Ruthenium-Catalyzed Arsenic (111)-Cerium(IV) Reaction," J. Phys. Chem., 1959, vol. 63(6), pp. 890-892.
Tahir, Muhammad Aslam, "Project-3: Innovative Low Cost Arsenic Removal Technologies," Thesis entitled Assessment of Arsenic and other Health Significant Water Quality Parameters in Ground Water of Northern Punjab, Department of Chemistry/ Bahauddin Zakariya University Multan, 2004, pp. 92-134.
Tannehill, "Naturally Occurring Arsenic and Mercury" Proceedings from the Seventy-Fifth Gas Processors Association Conference, May 2007, pp. 54-55.
Thill et al., "Cytotoxicity of CeO2 Nanoparticles for *Escherichia coli*. Physico-Chemical Insight of the Cytotoxicity Mechanism," Environ. Sci. Technol., 2006, vol. 40(19), pp. 6151-6156.
Tokunaga et al., "Removal of fluoride ions from aqueous solutions by multivalent metal compounds," International Journal of Environmental Studies, 1995, vol. 48(1), pp. 17-28.
Trovarelli, "Cerium Dioxide : a key component in environmental catalysis," RICH MAC Magazine, La Chimica e L'Industria, Sep. 1996, vol. 78, pp. 823-829.
Tu, C., "A Study of Availability of Soil Arsenic (in Chinese)," Journal of Southwest Agricultural University, Dec. 1992, vol. 14 (6), pp. 447 (includes English translation).
Viricelle et al., "Transformation of cerium(III) hydroxycarbonate into ceria. Part 1—Nucleation and growth rates of ceria," J. Chem. Soc., Faraday Trans., 1995, 91(24), pp. 4431-4435.
Vu et al., "Review of Arsenic Removal Technologies for Contaminated Groundwaters," Argonne National Laboratory, Apr. 2003, 41 pages.
Wakita et al., "A Synthetic Study of the Solid Solutions in the Systems $La_2(CO_3)_3 \cdot 8H_2O$—$CE_2(CO_3)_3 \cdot H_2O$ and $La(OH)CO_3$—$CE(OH)CO_3$," Bulletin of the Chemical Society of Japan, 1979, vol. 52(2), pp. 428-432.
Wasay et al., "Adsorption of fluoride, phosphate, and arsenate ions on lanthanum-impregnated silica gel," Water Environment Research, vol. 68, No. 3 (May-Jun. 1996), pp. 295-300.
Weil et al. "Sulfur Compounds." Kirk-Othmer Encyclopedia of Chemical Technology, published online Dec. 2000, vol. 23, John Wiley & Sons, pp. 1-84.
Weinstock, "Homogeneous-Phase Electron-Transfer Reactions of Polyoxometalates," Chem. Re., 1998, vol. 98, No. 1, pp. 113-170.
Williams et al., "Drinking water: New disinfecting medium boosts water treatment," Filtration+Separation, Mar./Apr. 2010, pp. 16-19.
Worthington et al., "Kinetics and Analytical Applications of the Ruthenium Catalyzed Reaction between Cerium(IV) and Arsenic(II1) in Sulferic Acid Medium," Analytical Chemistry, Sep. 1970, vol. 42, No. 11, pp. 1157-1164.
Wu et al., "Effect of pH of Medium on Hydrothermal Synthesis of Nanocrystalline Cerium(IV) Oxide Powders," Journal of the American Ceramic Society, 2002, vol. 85(10), pp. 2462-2468.
Yamase, "Photo- and Electrochromism of Polyoxometalates and Related Materials," Chem. Re., 1998, vol. 98, No. 1, pp. 307-326.
Yang et al., "Decontamination of Chemical Warfare Agents," Chem Rev., 1992, vol. 92, pp. 1729-1743.
Yates et al., "Kinetics of the Iodide-catalyzed Reaction between Cerium(IV) and Arsenic(III)," J. Am. Chem. Soc., Aug. 1956, vol. 78(16), pp. 3950-3953.
Yon et al. "Adsorption, Gas Separation." Kirk-Othmer Encyclopedia of Chemical Technology, published online Apr. 2003, vol. 1, John Wiley & Sons, pp. 617-663.
Yong et al., "Nitrogen and Phosphorous Removal in Municipal Wastewater Treatment Plants in China: A Review," International Journal of Chemical Engineering, accepted Apr. 26, 2010, 10 pages.
Yotsumoto et al., "Latest functions and introduction cost of water treatment technique, Water treatment technique using cerium based adsorbent and examples," Plant and Process, 2005, vol. 47, No. 8, pp. 60-63, Japan (Abstract Only).
Youngran, J. et al., "Effect of competing solutes on arsenic (V) adsorption using iron and aluminum oxides," Journal of Environmental Sciences, vol. 19(8), 2007, pp. 910-919.
Yu et al., "The Phase Stability of Cerium Species in Aqueous Systems," Journal of the Electrochemical Society, 2006, vol. 153(1), pp. C74-C79.
Yuliati et al., "Ce L[sub]III-edge XANES Study on Valence of alumina-supported cerium oxide," Photon Factory Activity Report 2004 #22 Part B, User's Report, 2005, pp. 56.
Zhang et al., "Arsenate adsorption on an Fe—Ce bimetal oxide adsorbent: Role of surface properties," Environ. Sci. Technol., Aug. 2005, vol. 39, pp. 7246-7253.
Zhang Yu et al: "Arsenic(V) removal with a Ce(IV)-doped iron oxide adsorbent," Chemosphere, vol. 51(9), Jun. 2003, pp. 945-952.
Zhou et al., "Cryptography based on the absorption/emission features of multicolor semiconductor nanocrystal quantum dots," Optics Express, Jun. 2004, vol. 12(13), pp. 2925-2931.
Official Action (with English machine translation) for Brazillian Patent Application No. PI 06143202, dated Nov. 30, 2016, 10 pages.
Official Action (with English machine translation) for Brazillian Patent Application No. PI 0614320-2, dated Jul. 31, 2017, 7 pages.
Official Action for Canadian Patent Application No. 2703821, dated Dec. 22, 2015, 5 pages.
Official Action for Canadian Patent Application No. 2703821, dated Aug. 29, 2016, 4 pages.
Official Action for Canadian Patent Application No. 2703821, dated Apr. 18, 2017, 2 pages.
Official Action for Canadian Patent Application No. 2703858, dated Dec. 22, 2015, 2 pages.
Notice of Allowance for Canadian Patent Application No. 2703858, dated Jun. 19, 2017, 1 page.
Official Action for European Patent Application 08843686, dated Feb. 8, 2016, 3 pages.
International Search Report and Written Opinion for International (PCT) Patent Application No. PCT/US2015/019469, dated Jun. 4, 2015 10 pages.
International Search Report and Written Opinion for International (PCT) Patent Application No. PCT/US15/19485, dated Jun. 29, 2015 8 pages.
Extended European Search Report for European Patent Application No. EP15757881, dated Sep. 4, 2017, 7 pages.
International Search Report and Written Opinion for International (PCT) Patent Application No. PCT/US2015/019476, dated Jun. 1, 2015 11 pages.
International Preliminary Report on Patentability for International Patent Application No. PCT/US2015/019476, dated Sep. 22, 2016, 17 pages.
Extended Search Report for European Patent Application No. 15758481.4, dated Nov. 6, 2017, 9 pages.

(56) References Cited

OTHER PUBLICATIONS

Restriction Requirement for U.S. Appl. No. 14/642,446, dated Mar. 31, 2016, 7 pages.
Official Action for U.S. Appl. No. 14/642,446, dated Jun. 23, 2016, 11 pages.
Official Action for U.S. Appl. No. 14/642,446, dated Oct. 12, 2016, 11 pages.
Official Action for U.S. Appl. No. 14/642,446, dated Mar. 28, 2017, 10 pages.
Final Action for U.S. Appl. No. 14/642,446, dated Jul. 19, 2017, 9 pages.
Notice of Allowance for U.S. Appl. No. 14/642,446, dated Jan. 9, 2018, 7 pages.
Restriction Requirement for U.S. Appl. No. 14/642,324, dated Jan. 14, 2016, 9 pages.
Official Action for U.S. Appl. No. 14/642,324, dated Mar. 31, 2016, 10 pages.
Final Action for U.S. Appl. No. 14/642,324, dated Jul. 12, 2016, 9 pages.
Official Action for U.S. Appl. No. 14/642,324, dated Mar. 28, 2017, 11 pages.
Final Action for U.S. Appl. No. 14/642,324, dated Jul. 19, 2017, 9 pages.
Official Action (English translation) for Chinese Patent Application No. 201580023903.4, dated May 3, 2018, 3 pages.
Final Action for U.S. Appl. No. 14/642,324, dated Dec. 18, 2017, 7 pages.
U.S. Appl. No. 12/616,653, filed Nov. 11, 2009.
U.S. Appl. No. 12/831,054, filed Jul. 6, 2010.
U.S. Appl. No. 13/608,866, filed Sep. 10, 2012.
U.S. Appl. No. 12/942,847, filed Nov. 9, 2010.
U.S. Appl. No. 12/725,114, filed Mar. 16, 2010.
U.S. Appl. No. 10/353,705, filed Jan. 29, 2003 now U.S. Pat. No. 6,863,825.
U.S. Appl. No. 11/029,257, filed Jan. 5, 2005 now U.S. Pat. No. 7,048,853.
U.S. Appl. No. 11/435,697, filed May 16, 2006 now U.S. Pat. No. 7,300,589.
U.S. Appl. No. 11/925,247, filed Oct. 26, 2007 now U.S. Pat. No. 7,686,976.
U.S. Appl. No. 12/610,569, filed Nov. 2, 2009 now U.S. Pat. No. 8,475,658.
U.S. Appl. No. 12/632,523, filed Dec. 7, 2009.
U.S. Appl. No. 11/932,837, filed Oct. 31, 2007 now U.S. Pat. No. 8,066,874.
U.S. Appl. No. 11/932,702, filed Oct. 31, 2007 now U.S. Pat. No. 8,349,764.
U.S. Appl. No. 13/434,214, filed Mar. 29, 2012 now U.S. Pat. No. 8,557,730.
U.S. Appl. No. 14/021,952, filed Sep. 9, 2013 now U.S. Pat. No. 8,809,229.
U.S. Appl. No. 11/932,090, filed Oct. 31, 2007 now U.S. Pat. No. 8,252,087.
U.S. Appl. No. 11/931,616, filed Oct. 31, 2007.
U.S. Appl. No. 12/814,006, filed Jun. 11, 2010.
U.S. Appl. No. 12/814,032, filed Jun. 11, 2010.
U.S. Appl. No. 12/814,049, filed Jun. 11, 2010.
U.S. Appl. No. 11/932,543, filed Oct. 31, 2007.
U.S. Appl. No. 12/721,233, filed Mar. 10, 2010.
U.S. Appl. No. 11/958,602, filed Dec. 18, 2007.
U.S. Appl. No. 12/757,788, filed Apr. 9, 2010.
U.S. Appl. No. 13/086,247, filed Apr. 13, 2011.
U.S. Appl. No. 13/159,179, filed Jun. 13, 2011.
U.S. Appl. No. 13/205,543, filed Aug. 8, 2011.
U.S. Appl. No. 13/410,081, filed Mar. 1, 2012.
U.S. Appl. No. 13/433,097, filed Mar. 28, 2012.
U.S. Appl. No. 13/244,092, filed Sep. 23, 2011.
U.S. Appl. No. 13/244,117, filed Sep. 23, 2011.
U.S. Appl. No. 13/356,574, filed Jan. 23, 2012.
U.S. Appl. No. 13/432,895, filed Mar. 28, 2012.
U.S. Appl. No. 13/356,581, filed Jan. 23, 2012.
U.S. Appl. No. 13/432,987, filed Mar. 28, 2012.
U.S. Appl. No. 14/642,279, filed Mar. 9, 2015.
U.S. Appl. No. 14/642,446, filed Mar. 9, 2015.
U.S. Appl. No. 14/642,324, filed Mar. 9, 2015.
Official Action (English translation) for Chinese Patent Application No. 201580023903.4, dated Feb. 2, 2019 8 pages.
Notice of Allowance (English translation) for Japanese Patent Application No. 2016-556760, dated Feb, 19, 2019 2 pages.
Official Action (no translation) for Mexican Patent Application No. MX/a/2016/011492, dated Apr. 29, 2019 3 pages.
Official Action for Chinese Patent Application No. 201580023903.4, dated Aug. 15, 2019 8 pages.
U.S. Appl. No. 16/425,432, filed May 29, 2019, Burba et al.
Official Action for European Patent Application No. EP15757881.6, dated Jul. 13, 2018, 6 pages.
Notice of Allowance for European Patent Application No. 15758481.4, dated Aug. 17, 2018, 6 pages.
Notice of Acceptance for Australian Patent Application No. 2015226889, dated Sep. 5, 2019 4 pages.
Third Party Observation for European Patent Application No. 15757881.6, dated Aug. 30, 2019, 3 pages.
Official Action (no. translation) for Mexican Patent Application No. MX/a/2016/011492, dated Aug. 23, 2019 3 pages.
Notice of Grant (no. translation) for Mexican Patent Application No. MX/a/2016/011492, dated Oct. 14, 2019 2 pages.

\* cited by examiner

REMOVAL OF ARSENIC FROM AQUEOUS STREAMS WITH CERIUM (IV) OXIDE COMPOSITIONS

CROSS REFERENCE TO RELATED APPLICATIONS

The present application is a divisional of U.S. patent application Ser. No. 14/642,466 with a filing date of Mar. 9, 2015, entitled "Removal of Arsenic from Aqueous Streams with Cerium (IV) Oxide Compositions", which claims the benefits of U.S. Provisional Application Ser. No. 61/949,799 with a filing date of Mar. 7, 2014, entitled "Ceric Oxide with Exceptional Target Material Removal Properties", both of which are incorporated in their entireties herein by this reference.

BACKGROUND

Arsenic is a toxic element that naturally occurs in a variety of combined forms. Its presence in natural waters may originate, for example, from geochemical reactions, industrial waste discharges and past and present agricultural uses of arsenic-containing pesticides. Because the presence of arsenic may have carcinogenic and other deleterious effects on living organisms, the U.S. Environmental Protection Agency (EPA) and the World Health Organization (WHO) have set the maximum contaminant level (MCL) for arsenic in drinking water at 10 parts per billion (ppb). Arsenic concentrations in wastewaters, ground waters, surface waters and geothermal waters frequently exceed this level. Thus, the current MCL and any future decreases, which may be to as low as 2 ppb, create the need for new techniques to economically and effectively remove arsenic from drinking water, well water and industrial waters or any other waters.

Arsenic occurs in four oxidation or valence states, i.e., −3, 0, +3, and +5. Under normal conditions arsenic is found dissolved in aqueous or aquatic systems in the +3 and +5 oxidation states, usually in the form of arsenite ($AsO_3^{3-}$) and arsenate ($AsO_4^{3-}$). The effective removal of arsenic by coagulation techniques requires the arsenic to be in the arsenate form. Arsenite, in which the arsenic exists in the +3 oxidation state, is only partially removed by adsorption and coagulation techniques.

Various technologies have been used in the past to remove arsenic from aqueous systems. Examples of such techniques include adsorption on high surface area materials, such as alumina and activated carbon, ion exchange with anion exchange resins, co-precipitation and electro-dialysis. However, most technologies for arsenic removal are hindered by the difficulty of removing arsenic at very low levels and maintain an effective loading capacity. Additionally the amount of material necessary to remove arsenic at low levels can make the technology economically unfeasible. The more successful techniques that have been used in large municipal water supplies are not practical for residential applications because of space requirements and the need to use dangerous chemicals. The two most common techniques for residential water treatment have been reverse osmosis and solid filtration media such as activated alumina, iron oxide, and titanium oxide. The former method produces arsenic-containing waste streams that must be disposed of, and the latter requires the media to treat sufficiently large volumes of water in order to be economically viable.

The above facts coupled with the potential for the decrease in MCL to 10 ppb or less make it imperative that effective sorbents and/or reactants to remove arsenic from water and other aqueous systems be developed and used.

SUMMARY

This disclosure relates generally to cerium-containing compositions for removing arsenic contaminants from aqueous liquid streams. More specifically, this disclosure is particularly concerned with cerium-containing compositions for removing arsenic in the form of arsenite and arsenate from groundwater and drinking water. Typically, the cerium-containing composition is cerium oxide. More typically, the cerium-containing composition can be cerium (IV) oxide. The arsenite and arsenate can be present at parts per million or parts per billion or fractions of parts billion concentrations. The cerium-containing composition at high or very low treatment levels can remove the arsenite and arsenate from the aqueous liquid streams.

It has now been found that one or more of the arsenite and arsenate can be efficiently and effectively removed from water and other aqueous liquid feed stocks by treating the aqueous liquid stream containing one or more of the arsenite and arsenate with a cerium-containing composition. The cerium-containing composition generally comprises a cerium (IV) oxide composition ($CeO_2$). The cerium (IV) oxide composition can be in a crystalline form. Moreover, the cerium (IV) oxide composition can have a high surface area. Surprisingly, it has further been found that using cerium (IV) oxide composition ($CeO_2$) with particular characteristics as described below enables the sorption and removal of arsenic with higher removal capacities compared to traditional removal media, including cerium oxide lacking one or more of these particular characteristics. More specifically, it has further been found that using cerium (IV) oxide composition ($CeO_2$) with particular characteristics as described below enables the sorption and removal of one or more of arsenite and arsenate with higher removal capacities compared to traditional removal media, including cerium oxide lacking one or more of these particular characteristics.

The cerium (IV) oxide composition can be unsupported or supported. The supported cerium (IV) oxide composition can be deposited on a single support or deposited on multiple supports. The supports can be without limitation alumina, aluminosilicates, ion exchange resins, organic polymers, and clays. The cerium (IV) oxide composition can be deposited and/or mixed with a polymeric porous material. Moreover, it is believed that the cerium (IV) oxide composition surface exposure is enhanced when the cerium (IV) oxide composition is deposited and/or mixed with the polymeric porous material.

In accordance with some embodiments is a method of contacting a cerium (IV) oxide composition with an arsenic-containing aqueous stream. During the contacting of the cerium (IV) oxide with the arsenic-containing aqueous stream, one or more of the following is true: (i) the cerium (IV) oxide composition has a zeta potential at about pH 7 of no more than about 30 mV and of more than about 1 mV; (ii) the cerium (IV) oxide composition has a particle size $D_{10}$ of more than about 0.5 µm and no more than about 7 µm; (iii) the cerium (IV) oxide composition has a particle size $D_{50}$ of more than about 2 µm and no more than about 20 µm; (iv) the cerium (IV) oxide composition has a particle size $D_{90}$ of more than about 12 µm and no more than about 50 µm; (v) the cerium (IV) oxide composition has a crystallite size of more than about 1 nm and no more than about 22 nm; and (vi) the cerium (IV) oxide composition has an acidic site concentration of more than about 0.0001 acidic sites/kg and no more than about 0.020 acidic sites/kg. The contacting of the cerium (IV) oxide composition with the arsenic-containing aqueous stream can remove some of the arsenic from the arsenic-containing stream.

In accordance with some embodiments is a method of contacting a cerium (IV) oxide composition with an arsenic-containing aqueous stream to remove a first level of arsenic from the arsenic-containing stream. The first level of arsenic can be greater than that removed by an oxide of cerium (IV) lacking one or more of: (i) a zeta potential at about pH 7 of no more than about 30 mV and of more than about 1 mV; (ii) a particle size $D_{10}$ of more than about 0.5 μm and no more than about 7 μm; (iii) a particle size $D_{50}$ of more than about 2 μm and no more than about 20 μm; (iv) a particle size $D_{90}$ of more than about 12 μm and no more than about 50 μm; (v) a crystallite size of more than about 1 nm and no more than about 22 nm; and (vi) an acidic cite concentration of more than about 0.0001 acidic sites/kg and no more than about 0.020 acidic sites/kg.

In accordance with some embodiments is a method of contacting a cerium (IV) oxide composition with an arsenite-containing aqueous stream. During the contacting of the cerium (IV) oxide with the arsenic-containing aqueous stream, one or more of the following is true: (i) the cerium (IV) oxide composition has a zeta potential at about pH 7 of no more than about 30 mV and of more than about 1 mV; (ii) the cerium (IV) oxide composition has a particle size $D_{10}$ of more than about 0.5 μm and no more than about 7 μm; (iii) the cerium (IV) oxide composition has a particle size $D_{50}$ of more than about 2 μm and no more than about 20 μm; (iv) the cerium (IV) oxide composition has a particle size $D_{90}$ of more than about 12 μm and no more than about 50 μm; (v) the cerium (IV) oxide composition has a crystallite size of more than about 1 nm and no more than about 22 nm; and (vi) the cerium (IV) oxide composition has an acidic site concentration of more than about 0.0001 sites/kg and no more than about 0.020 acidic sites/kg. The contacting of the cerium (IV) oxide composition with the arsenite-containing aqueous stream can remove some of the arsenite from the arsenite-containing aqueous stream.

In accordance with some embodiments is a method of contacting a cerium (IV) oxide composition with an arsenate-containing aqueous stream. During the contacting of the cerium (IV) oxide with the arsenate-containing aqueous stream, one or more of the following is true: (i) the cerium (IV) oxide composition has a zeta potential at about pH 7 of no more than about 30 mV and of more than about 1 mV; (ii) the cerium (IV) oxide composition has a particle size $D_{10}$ of more than about 0.5 μm and no more than about 7 μm; (iii) the cerium (IV) oxide composition has a particle size $D_{50}$ of more than about 2 μm and no more than about 20 μm; (iv) the cerium (IV) oxide composition has a particle size $D_{90}$ of more than about 12 μm and no more than about 50 μm; (v) the cerium (IV) oxide composition has a crystallite size of more than about 1 nm and no more than about 22 nm; and (vi) the cerium (IV) oxide composition has an acidic site concentration of more than about 0.0001 sites/kg and no more than about 0.020 acidic sites/kg. The contacting of the cerium (IV) oxide composition with the arsenate-containing aqueous stream can remove some of the arsenate from the arsenate-containing aqueous stream.

In accordance with some embodiments is a method of introducing a cerium (IV) oxide composition into an aqueous stream having a first level of arsenic. During the introducing of the cerium (IV) oxide with the arsenate-containing aqueous stream, one or more of the following is true: (i) the cerium (IV) oxide composition has a zeta potential at about pH 7 of no more than about 30 mV and of more than about 1 mV; (ii) the cerium (IV) oxide composition has a particle size $D_{10}$ of more than about 0.5 μm and no more than about 7 μm; (iii) the cerium (IV) oxide composition has a particle size $D_{50}$ of more than about 2 μm and no more than about 20 μm; (iv) the cerium (IV) oxide composition has a particle size $D_{90}$ of more than about 12 μm and no more than about 50 μm; (v) the cerium (IV) oxide composition has a crystallite size of more than about 1 nm and no more than about 22 nm; and (vi) the cerium (IV) oxide composition has an acidic site concentration of more than about 0.0001 sites/kg and no more than about 0.020 acidic sites/kg. After the introducing of the cerium (IV) oxide composition into the aqueous stream, the aqueous stream has a second level of arsenic, the first level of arsenic being greater than the second level of arsenic.

In accordance with some embodiments is a method of contacting a cerium (IV) oxide composition having from an acidic site concentration of more than about 0.0001 acidic sites/kg and no more than about 0.020 acidic sites/kg with an arsenic-containing aqueous stream. The contacting of the cerium (IV) oxide composition with the arsenic-containing aqueous stream can remove some of the arsenic from the arsenic-containing stream.

In accordance with some embodiments is a device. The device can have an inlet to receive an aqueous stream having a first level of arsenic, a contacting chamber in fluid communication with the inlet and containing a cerium (IV) oxide composition to contact the aqueous stream. Moreover, the aqueous stream has the first level of arsenic prior to the aqueous stream contacting the cerium (IV) oxide composition and a second level of arsenic after the contacting of the aqueous stream with the cerium (IV) oxide, the first level of arsenic is greater than the second level of arsenic. Furthermore, the device can have an outlet in fluid communication with the contacting chamber to output the aqueous stream having the second level of arsenic. Moreover, one or more of the following is true: (i) the cerium (IV) oxide composition has a zeta potential at about pH 7 of no more than about 30 mV and of more than about 1 mV; (ii) the cerium (IV) oxide composition has a particle size $D_{10}$ of more than about 0.5 μm and no more than about 20 μm; (iii) the cerium (IV) oxide composition has a particle size $D_{50}$ of more than about 2 μm and no more than about 20 μm; (iv) the cerium (IV) oxide composition has a particle size $D_{90}$ of more than about 12 μm and no more than about 50 μm; (v) the cerium (IV) oxide composition has a crystallite size of more than about 1 nm and no more than about 22 nm; and (vi) the cerium (IV) oxide composition has an acidic site concentration of more than about 0.0001 acidic sites/kg and no more than about 0.020 acidic sites/kg.

In some embodiments, the arsenic-containing stream comprises one or more of arsenic (III) and arsenic (V). In some embodiments, the cerium (IV) oxide composition removes about 125% more arsenic (III) per gram of CeO2 per μg/L of arsenic (III) in the arsenic-containing stream than an oxide of cerium (IV) and one or more of steps (i)-(vi) are false for the oxide of cerium (IV).

In some embodiments, the cerium (IV) oxide composition removes about 150% more arsenic (III) per gram of CeO2 per μg/L of arsenic (III) in the arsenic-containing stream than an oxide of cerium (IV) and wherein on or more of steps (i)-(vi) are false for the oxide of cerium (IV).

In some embodiments, the cerium (IV) oxide composition removes about 200% more arsenic (V) per gram of CeO2 per μg/L of arsenic (V) in the arsenic-containing stream than an oxide of cerium (IV) and wherein on or more of steps (i)-(vi) are false for the oxide of cerium (IV).

In some embodiments, the cerium (IV) oxide composition removes about 400% more arsenic (V) per gram of CeO2 per µg/L of arsenic (V) in the arsenic-containing stream than an oxide of cerium (IV) and wherein on or more of steps (i)-(vi) are false for the oxide of cerium (IV).

In some embodiments, the cerium (IV) oxide composition removes about 125% more arsenic (III) per µg/L of arsenic (III) in the arsenic-containing stream than an oxide of cerium (IV), and one or more of steps (i)-(vi) are false for the oxide of cerium (IV).

In some embodiments, the cerium (IV) oxide composition removes about 150% more arsenic (III) per µg/L of arsenic (III) in the arsenic-containing stream than an oxide of cerium (IV), and one or more of steps (i)-(vi) are false for the oxide of cerium (IV).

The cerium (IV) oxide composition can have a loading capacity for arsenite of from 2.1 to about 6.0 mg/g for an equilibrium arsenite concentration of from about 0.5 to about 5 ppb. This is in contrast to a loading capacity for arsenite for an oxide of cerium (IV) of the prior art which has an arsenite load capacity of from about 0.6 to about 2.0 mg/g over the same equilibrium arsenite concentration of from about 0.5 to 5 ppb.

Moreover, the cerium (IV) oxide composition can have a loading capacity for arsenate of from 0.1 to about 0.2 mg/g for an equilibrium arsenate concentration of from about 0.5 to about 2.5 ppb. This is in contrast to a loading capacity for arsenate for an oxide of cerium (IV) of the prior art which has an arsenate load capacity of from about 0.03 to about 0.08 mg/g over the same equilibrium arsenate concentration of from about 0.5 to 2.5 ppb.

In some embodiments, the cerium (IV) oxide composition removes about 200% more arsenic (V) per µg/L of arsenic (V) in the arsenic-containing stream than an oxide of cerium (IV), and one or more of steps (i)-(vi) are false for the oxide of cerium (IV).

In some embodiments, the cerium (IV) oxide composition removes about 400% more arsenic (V) per µg/L of arsenic (V) in the arsenic-containing stream than an oxide of cerium (IV), and one or more of steps (i)-(vi) are false for the oxide of cerium (IV).

In some embodiments, the arsenic-containing aqueous stream has a pH from about pH 4.5 to about 9.5 during the contacting of the cerium (IV) oxide and the arsenic-containing stream, the cerium (IV) oxide composition removes more arsenic per gram of CeO2 per µg/L of arsenic than an oxide of cerium (IV), and one or more of steps (i)-(vi) are false for the oxide of cerium (IV).

In some embodiments, step (i) can be true. In some embodiments where step (i) is true, one of steps (ii)-(vi) can be false and one or more of the others of steps (ii)-(vi) can be true. In some embodiments where step (i) is true, two of steps (ii)-(vi) can be false and one or more of the others of steps (ii)-(vi) can be true. In some embodiments where step (i) is true, three of steps (ii)-(vi) can be false and one or more of the others of steps (ii)-(vi) can be true. In some embodiments where step (i) is true, four of steps (ii)-(vi) can be false and the other of steps (ii)-(vi) can be true.

In some embodiments, step (ii) can be true. In some embodiments where step (ii) is true, one of steps (i) and (iii)-(vi) can be false and one or more of the others of steps (i) and (iii)-(vi) can be true. In some embodiments where step (ii) is true, two of steps (i) and (iii)-(vi) can be false and one or more of the others of steps (i) and (iii)-(vi) can be true. In some embodiments where step (ii) is true, three of steps (i) and (iii)-(vi) can be false and one or more of the others of steps (i) and (iii)-(vi) can be true. In some embodiments where step (ii) is true, four of steps (i) and (iii)-(vi) can be false and the other of steps (i) and (iii)-(vi) can be true.

In some embodiments, step (iii) can be true. In some embodiments where step (iii) is true, one of steps (i)-(ii) and (iv)-(vi) can be false and one or more of the other steps (i)-(ii) and (iv)-(vi) can be true. In some embodiments where step (iii) is true, two of steps (i)-(ii) and (iv)-(vi) can be false and one or more of the other steps (i)-(ii) and (iv)-(vi) can be true. In some embodiments where step (iii) is true, three of steps (i)-(ii) and (iv)-(vi) can be false and one or more of the other steps (i)-(ii) and (iv)-(vi) can be true. In some embodiments where step (iii) is true, four of steps (i)-(ii) and (iv)-(vi) can be false and the other of steps (i)-(ii) and (iv)-(vi) can be true.

In some embodiments, step (iv) can be true. In some embodiments where step (iv) is true, one of steps (i)-(iii) and (v)-(vi) can be false and one or more of the other steps (i)-(iii) and (v)-(vi) can be true. In some embodiments where step (iv) is true, two of steps (i)-(iii) and (v)-(vi) can be false and one or more of the other steps (i)-(iii) and (v)-(vi) can be true. In some embodiments where step (iv) is true, three of steps (i)-(iii) and (v)-(vi) can be false and one or more of the other steps (i)-(iii) and (v)-(vi) can be true. In some embodiments where step (iv) is true, four of steps (i)-(iii) and (v)-(vi) can be false and the other of steps (i)-(iii) and (v)-(vi) can be true.

In some embodiments, step (v) can be true. In some embodiments where step (v) is true, one of steps (i)-(iv) and (vi) can be false and one or more of the other steps (i)-(iv) and (vi) can be true. In some embodiments where step (v) is true, two of steps (i)-(iv) and (vi) can be false and one or more of the other steps (i)-(iv) and (vi) can be true. In some embodiments where step (v) is true, three of steps (i)-(iv) and (vi) can be false and one or more of the other steps (i)-(iv) and (vi) can be true. In some embodiments where step (v) is true, four of steps (i)-(iv) and (vi) can be false the other of steps (i)-(iv) and (vi) can be true.

In some embodiments, step (vi) can be true. In some embodiments where step (vi) is true, one of steps (i)-(v) can be false and one or more of the other steps (i)-(v) can be true. In some embodiments where step (vi) is true, and two of steps (i)-(v) are false and one or more of the other steps (i)-(v) are true. In some embodiments where step (vi) is true, three of steps (i)-(v) can be false and one or more of the other steps (i)-(v) can be true. In some embodiments where step (vi) is true, four of steps (i)-(v) can false and the other of steps (i)-(v) can be true.

In some embodiments, the zeta potential at about pH 7 can be from about 7.5 to about 12.5 mV.

In some embodiments, the particle size $D_{10}$ can be from about 1 to about 3 µm.

In some embodiments, the particle size $D_{50}$ can be from about 7.5 to about 10.5 µm.

In some embodiments, the particle size $D_{90}$ can be from about 20 to about 30 µm.

In some embodiments, the crystallite size can be from about 7.5 to about 12.5 nm.

In some embodiments, the cerium (IV) oxide composition can have from about 7.5 to about 9.5 wt % Ce (IV)$O_2$.

In some embodiments, the cerium (IV) oxide composition can have rare earth oxides other than Ce (IV)$O_2$. The cerium (IV) oxide composition can have one of no more than about 40, no more than about 25 and no more than about 10 wt % of the rare earth oxides other than cerium (IV) oxide composition.

These and other advantages will be apparent from the disclosure of the aspects, embodiments, and configurations contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The accompanying drawings, which are incorporated in and constitute a part of the specification, illustrate embodiments of the disclosure and together with the general description of the disclosure given above and the detailed description given below, serve to explain the principles of the disclosure.

DETAILED DESCRIPTION

Figure 1:
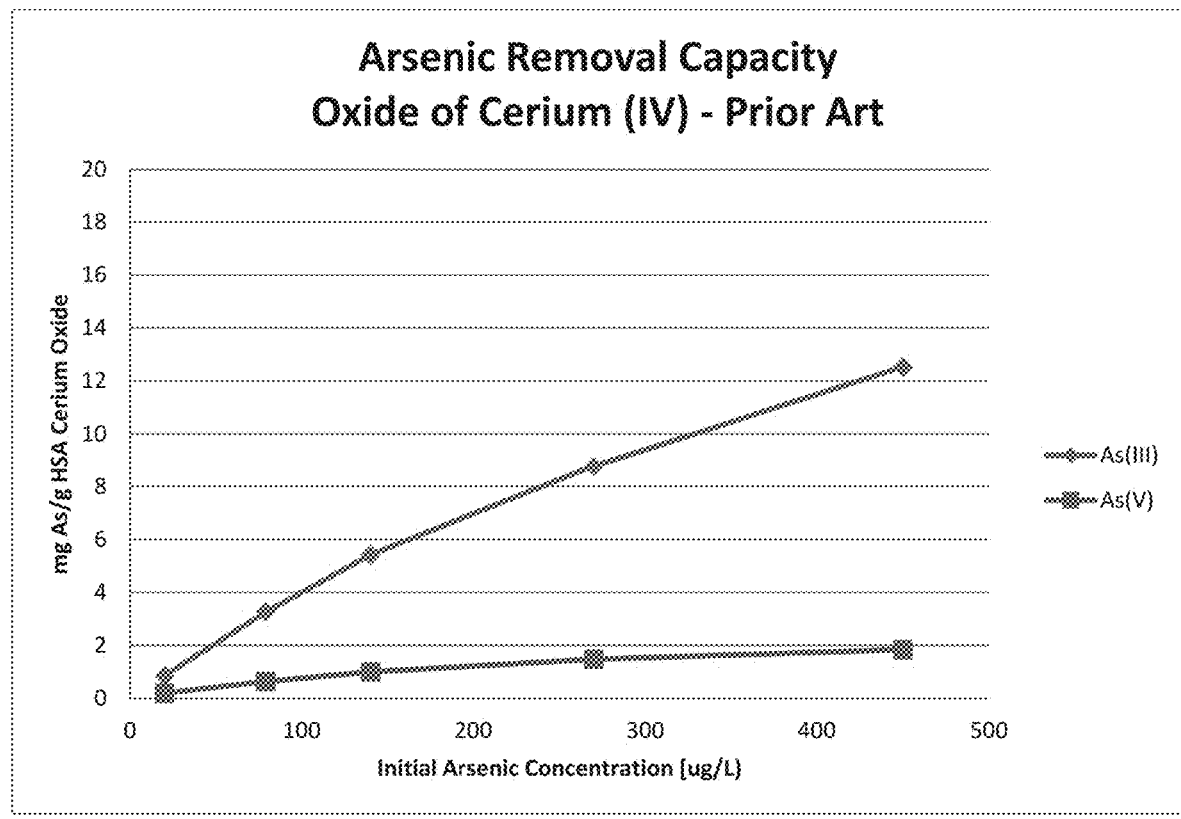
FIG. 1 is a plot of both arsenic (III) and (V) removal capacity against the initial arsenic concentration for a prior art oxide of cerium (IV)

The process of the disclosure is primarily envisioned for removing one or more of arsenite and arsenate from an aqueous liquid stream using a cerium (IV) oxide ($CeO_2$) having particular properties. The aqueous liquid stream can be one or more of drinking water and groundwater that contains undesirable amounts of arsenic. Furthermore, the aqueous liquid stream can include without limitation well waters, surface waters (such as water from lakes, ponds and wetlands), agricultural waters, wastewater from industrial processes, and geothermal waters.

Generally, the cerium (IV) oxide composition can be used to treat any aqueous liquid stream containing arsenic. The cerium (IV) oxide composition of the present disclosure has a number of properties that are particularly advantageous for arsenic removal. Contacting of the cerium (IV) oxide composition with the aqueous liquid stream containing the arsenic can effectively reduce the arsenic level in the aqueous liquid stream. The initial level of arsenic in the aqueous liquid stream can be in the parts per million level, in the parts per billion level, or even in the less than 1 parts per billion level. Typically, the aqueous liquid stream includes no more than about 5 ppm, more typically no more than about 2.5 ppm, more typically no more than about 1 ppm, more typically no more than about 500 ppb, more typically no more than about 400 ppb, more typically no more than about 350 ppb, more typically no more than about 300 ppb, more typically no more than about 250 ppb, more typically no more than about 200 ppb, more typically no more than about 150 ppb, more typically no more than about 100 ppb, more typically no more than about 50 ppb, more typically no more than about 25 ppb, and even more typically no more than about 20 ppb of arsenic. The final arsenic level is substantially less than the initial arsenic level.

Typically, the contacting of the cerium (IV) oxide composition with the aqueous liquid stream can reduce the arsenic level in the aqueous liquid stream by more than about 75%. More typically, the contacting of the cerium (IV) oxide composition with the aqueous liquid stream can reduce the arsenic level in the aqueous liquid stream by more than about 80%, more typically more than about 85%, more typically more than about 90%, more typically more than about 95%, more typically more than about 97.5%, and even more typically more than about 99.5%.

The cerium (IV) oxide composition can have a zeta-potential, at pH 7, of more than about 1 mV. While not wanting to be bound by any theory it is believed that the zeta of the cerium (IV) oxide composition can affect the removal of the arsenic from an aqueous liquid stream. Typically, the cerium (IV) oxide composition has a zeta-potential, at pH 7, of more than about 5 mV. More typically, the zeta-potential, at pH 7, of the cerium (IV) oxide composition is more than about 10 mV. Generally, the cerium (IV) oxide composition has a zeta-potential of no more than about 30 mV. More generally, the zeta-potential of the cerium (IV) oxide composition is no more than about 20 mV or even more typically no more than about 15 mV. Commonly, at a pH of about 7, the cerium (IV) oxide composition has zeta-potential of no more than one of about 30 mV, about 20 mV and about 15 mV and a zeta-potential of more than one of about 1 mV, about 5 mV, and 10 mV. The zeta-potential of the cerium (IV) oxide composition at pH 7 usually ranges from about 7.5 to about 12.5 mV. It can be appreciated that the cerium (IV) oxide composition can have any one of the described zeta-potentials in combination with any one or more of the below isoelectric points, surface areas, average pore volumes, average pore sizes, particle sizes, crystalline sizes, and number of acidic sites.

Generally, the cerium (IV) oxide composition typically has an isoelectric point of more than about pH 7, more generally of more than about pH 8, and even more generally of more than about pH 9 but generally no more than about pH 12, more generally no more than about pH 11, and even more generally no more than about pH 10. The isoelectric point typically ranges from about pH 8.5 to about pH 10. While not wanting to be bound by any theory it is believed that the isoelectric point of the cerium (IV) oxide composition can affect the removal of arsenic an aqueous liquid stream. It can be appreciated that the cerium (IV) oxide composition can have any one of the described isoelectric points in combination with any one or more of: the above zeta-potentials; and the below surface areas, average pore volumes, average pore sizes, particle sizes, crystalline sizes and number of acidic sites.

The cerium (IV) oxide composition can commonly have a surface area from about 30 to about 200 $m^2/g$, more commonly from about 60 to about 180 $m^2/g$, or even more typically from about 100 to about 150 $m^2/g$. Typically, the surface of the cerium (IV) oxide composition is from about 100 to about 150 $m^2/g$, more typically from about 110 to about 150 $m^2g$. While not wanting to be bound by any theory it is believed that the surface area of the cerium (IV) oxide composition can affect the removal of arsenic from an aqueous liquid stream. It can be appreciated that the cerium (IV) oxide composition can have any one of the described surface areas in combination with any one or more of: the above zeta-potentials and isoelectric points; and the below average pore volumes, average pore sizes, particle sizes, crystalline sizes and number of acidic sites.

The cerium (IV) oxide composition typically has an average (mean, median, and mode) pore volume (as determined by $N_2$ adsorption) of more than about 0.01 $cm^3/g$, more typically of more than about 0.1 $cm^3/g$, and more typically of more than about 0.2 $cm^3/g$ but typically no more than about 0.85 $cm^3/g$, more typically no more than about 0.8 $cm^3/g$, more typically no more than about 0.75 $cm^3/g$, more typically no more than about 0.65 $cm^3/g$, more typically no more than about 0.6 $cm^3/g$, more typically no more than about 0.55 $cm^3/g$, more typically no more than about 0.5 $cm^3/g$, and even more typically no more than about 0.45 $cm^3/g$. The pore volume can range from about 0.3 to about 0.4 $cm^3/g$, from more than about 0.4 to about 0.5 $cm^3/g$, or from more than about 0.5 to about 0.6 $cm^3/g$. While not wanting to be bound by any theory it is believed that the average pore volume of the cerium (IV) oxide composition can affect the removal of arsenic from an aqueous liquid stream. It can be appreciated that the cerium (IV) oxide composition can have any one of the described average pore volumes in combination with any one or more of: the above zeta-potentials, isoelectric points, and surface areas; and the below average pore sizes, particle sizes, crystalline sizes and number of acidic sites.

The cerium (IV) oxide composition generally has an average (mean, median, and mode) pore size (as determined by the BJH method) of more than about 0.5 nm, more generally of more than about 1 nm, and more generally of more than about 6 nm but generally no more than about 20 nm, more generally no more than about 15 nm, and even more generally no more than about 12 nm. The average pore size can range from about 0.5 to about 6.5 nm, from more than about 6.5 to about 13 nm, or from more than about 13 to about 20 nm. While not wanting to be bound by any theory it is believed that the average pore size of the cerium (IV) oxide composition can affect the removal of arsenic from an aqueous liquid stream. It can be appreciated that the cerium (IV) oxide composition can have any one of the described average pore sizes in combination with any one or more of: the above zeta-potentials, isoelectric points, surface areas and average pore volumes; and the below particle sizes, crystalline sizes and number of acidic sites.

The cerium (IV) oxide composition is usually in particulate form. Typically, the particulate cerium (IV) oxide composition has one or more of a particle size $D_{10}$, particle size $D_{50}$ and particle $D_{90}$. While not wanting to be bound by any theory it is believed that the one or more of a particle size $D_{10}$, particle size $D_{50}$ and particle $D_{90}$ surface area of the cerium (IV) oxide composition can affect the removal of arsenic from an aqueous liquid stream. It can be appreciated that the cerium (IV) oxide composition can have any one of the described particle sizes $D_{10}$, $D_{50}$ or $D_{90}$ in combination with any one or more of: the above zeta-potentials, isoelectric points, surface areas, average pore volumes and average pore sizes; and the below crystalline sizes and number of acidic sites.

The particulate cerium (IV) oxide composition commonly has a particle size $D_{10}$ from about 1 to about 3 µm. More commonly, the cerium (IV) oxide composition typically has a particle size $D_{10}$ of more than about 0.05 µm, even more commonly of more than about 0.5 µm, and yet even more commonly of more than about 1 µm but more commonly no more than about 7 µm, even more commonly no more than about 5 µm, and yet even more commonly no more than about 3 µm. The particle size $D_{10}$ typically ranges from about 1 to about 3 µm. While not wanting to be bound by any theory it is believed that the particle size $D_{10}$ of the cerium (IV) oxide composition can affect the removal of arsenic from an aqueous liquid stream. It can be appreciated that the cerium (IV) oxide composition can have any one of the described $D_{10}$ particle sizes in combination with any one or more of: the above zeta-potentials, isoelectric points, surface areas, average pore volumes and average pore sizes; and the below crystalline sizes and number of acidic sites.

Moreover, the cerium (IV) oxide composition generally has a particle size $D_{50}$ of more than about 2 µm, more generally of more than about 4 µm, and more generally of at least about 5 µm but generally no more than about 20 µm, more generally no more than about 15 µm, and even more generally no more than about 12 µm. The particle size $D_{50}$ usually ranges from about 7.5 to about 10.5 µm. While not wanting to be bound by any theory it is believed that the particle size $D_{50}$ of the cerium (IV) oxide composition can affect the removal of arsenic from an aqueous liquid stream. It can be appreciated that the cerium (IV) oxide composition can have any one of the described $D_{50}$ particle sizes in combination with any one or more of: the above zeta-potentials, isoelectric points, surface areas, average pore volumes and average pore sizes; and the below crystalline sizes and number of acidic sites.

The cerium (IV) oxide composition commonly has a particle size $D_{90}$ of more than about 12 µm, more commonly of more than about 15 µm, and even more commonly of more than about 20 µm but commonly no more than about 50 µm, more commonly no more than about 40 µm, and even more commonly no more than about 30 µm. The particle size $D_{90}$ generally ranges from about 20 to about 30 µm. While not wanting to be bound by any theory it is believed that the particle size $D_{90}$ of the cerium (IV) oxide composition can affect the removal of arsenic from an aqueous liquid stream. It can be appreciated that the cerium (IV) oxide composition can have any one of the described $D_{90}$ particle sizes in combination with any one or more of: the above zeta-potentials, isoelectric points, surface areas, average pore volumes and average pore sizes; and the below crystalline sizes and number of acidic sites.

The cerium (IV) oxide composition typically has a crystallite size of more than about 1 nm, more typically of more than about 4 nm, and even more typically of more than about 7.5 nm but typically no more than about 22 nm, more typically no more than about 17 nm, and even more typically no more than about 12.5 nm. The crystallite size commonly ranges from about 7.5 to about 12.5 nm. While not wanting to be bound by any theory it is believed that the crystallite size of the cerium (IV) oxide composition can affect the removal of arsenic from an aqueous liquid stream. It can be appreciated that the cerium (IV) oxide composition can have any one of the described crystalline sizes in combination with any one or more of the above zeta-potentials, isoelectric points, surface areas, average pore volumes, average pore sizes and particle sizes, and the below number of acidic sites.

Generally, the cerium (IV) oxide has no more than about 0.020 acidic sites/kg as measured by a zeta-potential titration. More generally, the cerium (IV) oxide has no more than about 0.015 acidic sites/kg, even more generally no more than about 0.010 acidic sites/kg, yet even more generally no more than about 0.005 acid sites/kg, and even yet more generally no more than about 0.001 acid sites/kg as measured by a zeta-potential titration. Even yet more generally, the cerium (IV) oxide has about 0 to about 0.001 acid sites/kg as measured by a zeta-potential titration. While not wanting to be bound by any theory it is believed that the number of acid sites/kg of the cerium (IV) oxide composition can affect the removal of arsenic from an aqueous liquid stream. It can be appreciated that the cerium (IV) oxide composition can have any one of the described number of acid sites in combination with any one or more of the above zeta-potentials, isoelectric points, surface areas, average pore volumes, average pore sizes and particle sizes.

The level of cerium (IV) oxide, $Ce(IV)O_2$ in the cerium (IV) oxide composition can vary. The cerium (IV) oxide composition typically comprises more than about 75 wt % $Ce(IV)O_2$, more typically more than about 85 wt % $Ce(IV)O_2$, even more typically more than about 90 wt % $Ce(IV)O_2$, or yet even more typically more than about 99.5 wt % $Ce(IV)O_2$.

The cerium (IV) oxide composition can contain rare earth oxides other than cerium (IV) oxide. Commonly, the rare earth oxides other than cerium (IV) oxide comprise no more than about 40 wt. %, more commonly no more than about 25 wt. %, and even more commonly no more than about 10 wt. % of the cerium (IV) oxide composition.

Usually, the cerium (IV) oxide composition can contain non-rare earth materials. Generally, the non-rare earth materials typically comprise no more than about 5 wt. %, more generally no more than about 2.5 wt. %, and even more generally no more than about 1 wt. % of the cerium (IV) oxide composition. In some embodiments, the cerium (IV) oxide composition can be free of any added non-rare materials. That is, the level of non-rare earth materials contained in the cerium (IV) oxide composition typically comprise naturally occurring "impurities" present in cerium oxide. Commonly, any one non-rare material contained in the cerium (IV) oxide composition is no more than about 4 wt %, more commonly no more than about 2.5 wt %, even more commonly no more than about 1 wt % and yet even more commonly no more than about 0.5 wt %.

It can be appreciated that the cerium (IV) oxide composition can have any one or more of the described wt % cerium(IV) oxide, wt % of rare earth oxides other than cerium (IV) oxide, and wt % of non-rare earth materials in combination with any one or more of the above zeta-potentials, isoelectric points, surface areas, average pore volumes, average pore sizes, particle sizes, crystalline sizes, and number of acid sites.

The capacity of the cerium (IV) oxide composition for arsenic can be high, even at low arsenic concentrations in the aqueous liquid stream. The contaminant arsenic removal capacity of the cerium (IV) oxide composition typically is more than about 2.5, more typically more than about 3, more typically more than about 3.5, more typically more than about 4, more typically more than about 4.5, more typically more than about 5, more typically more than about 5.5, more typically more than about 6, more typically more than about 6.5, more typically more than about 7, more typically more than about 7.5, more typically more than about 8, more typically more than about 8.5, more typically more than about 9, more typically more than about 9.5, more typically more than about 10, more typically more than about 10.5, more typically more than about 11, more typically more than about 11.5, more typically more than about 12, more typically more than about 12.5, and even more typically more than about 13 mg arsenic/g $CeO_2$, even when the arsenic concentration is no more than about 150 µg/L.

The cerium (IV) oxide composition typically has an arsenic adsorption capacity (mg/g)/final arsenic concentration in water (mg/g) ratio of more than about 100, more typically of more than about 250, more typically of more than about 500, more typically of more than about 750, more typically of more than about 1,000, more typically of more than about 1,250, more typically of more than about 1,500, more typically of more than about 1,750, more typically of more than about 2,000, more typically of more than about 2,250, more typically of more than about 2,500, more typically of more than about 2,750, more typically of more than about 3,000, more typically of more than about 3,250, more typically of more than about 3,500, more typically of more than about 3,750, and even more typically of more than about 4,000.

While not wishing to be bound by any theory, it is believed that the difference between one or more the zeta-potential, isoelectric point, surface area, an average (mean, median, and mode) pore volume (as determined by $N_2$ adsorption), an average (mean, median, and mode) pore size (as determined by the BJH method), $D_{10}$ particle size, $D_{50}$ particle size, $D_{90}$ particle size, crystallite size and number of acidic sites/kg of the cerium (IV) oxide of the present disclosure and oxides of cerium of the prior art enables arsenic to better contact and/or sorb on the cerium (IV) oxide composition than the oxides of cerium (IV) of the prior art.

It can be appreciated the arsenic in the aqueous liquid stream typically dissolved in the aqueous liquid stream and usually exists in both the +3 and +5 oxidation states which respectively correspond to arsenite and arsenate. Techniques for removing arsenate exist and are quite effective, but removing the arsenite is a more difficult proposition because the present technologies for doing so are not greatly effective. It has now been found that substantially all of the dissolved arsenic can be easily removed by treating the aqueous liquid feed with cerium (IV) oxide and resulting in an arsenic-depleted treated aqueous liquid product.

In some embodiments, the arsenic-containing aqueous liquid stream is passed through an inlet into a vessel at a temperature and pressure, usually at ambient temperature and pressure, such that the water in the arsenic-containing aqueous liquid stream remains in the liquid state. In this vessel the arsenic-containing aqueous liquid stream is contacted with the cerium (IV) oxide composition. During the contacting of the cerium (IV) oxide composition with the arsenic of the arsenic-containing aqueous liquid stream, the arsenic one or more of sorbs and reacts with the cerium (IV) oxide composition. The one or more of sorbing and reacting of the cerium (IV) oxide composition with the arsenic removes the arsenic from the arsenic-containing aqueous liquid stream.

In some embodiments, the cerium (IV) oxide composition can be deposited on a support material. Furthermore, the cerium (IV) oxide can be deposited on one or more external and/or internal surfaces of the support material. It can be appreciated that persons of ordinary skill in the art generally refer to the internal surfaces of the support material as pores. The cerium (IV) oxide composition can be supported on the support material with or without a binder. In some embodiments, the cerium (IV) oxide composition can be applied to the support material using any conventional techniques such as slurry deposition.

In some embodiments, the cerium (IV) oxide composition is slurried with the arsenic-containing aqueous liquid stream. It can be appreciated that the cerium (IV) oxide composition and the arsenic-containing aqueous liquid stream are slurried they contact one another. While not wanting to be bound by any theory, it is believed that some, if not most or all of the arsenic in the arsenic-containing aqueous liquid stream is removed from the arsenic-containing aqueous liquid stream by the slurring and/or contacting of the cerium (IV) oxide composition with the arsenic-containing aqueous stream. Following the slurring and/or contacting of the cerium (IV) oxide with the arsenic-containing aqueous liquid stream, the slurry is filtered by any known solid liquid separation method. The term "some" refers to removing no more than about 50% of the arsenic contained in the arsenic-containing aqueous liquid stream. More generally, the term "some" refers to one or more of removing no more than about 10%, no more than about 20%, no more than about 30%, and no more than about 40% of the arsenic contained in the arsenic-containing aqueous liquid stream. The term "most" refers to removing more than about 50% but no more than about 100% of the arsenic contained in the arsenic-containing aqueous liquid stream. More commonly, the term "most" refers to one or more of removing more than about 60%, more than about 70%, more than about 90%, and more than about 90% but no more than 100% of the arsenic contained in the arsenic-containing aqueous liquid stream. The term "all" refers to removing about 100% of the arsenic contained in the arsenic-containing aqueous liquid stream. More generally, the term "all" refers to removing more than 98%, 99%, 99.5%, and 99.9% of the arsenic contained in the arsenic-containing aqueous liquid stream.

In some embodiments, the cerium (IV) oxide composition is in the form of a fixed bed. Moreover, the fixed bed of cerium (IV) oxide is normally comprises cerium (IV) oxide in the form of cerium (IV) oxide particles. The cerium (IV) oxide particles can have a shape and/or form that exposes a maximum cerium (IV) oxide particle surface area to the aqueous liquid stream with minimal back-pressure and the flow of the aqueous liquid stream through the fixed bed. However, if desired, the cerium (IV) oxide particles may be in the form of a shaped body such as beads, extrudates, porous polymeric structures or monoliths. In some embodiments, the cerium (IV) oxide composition can be supported as a layer and/or coating on such beads, extrudates, porous polymeric structures or monolith supports.

The contacting of the cerium (IV) oxide composition with the arsenic-containing aqueous liquid stream normally takes place at a temperature from about 4 to about 100 degrees Celsius, more normally from about 5 to about 40 degrees Celsius. Furthermore, the contacting of cerium (IV) oxide with the arsenic-containing aqueous liquid stream commonly takes place at a pH from about pH 1 to about pH11, more commonly from about pH 3 to about pH 9. The contacting of the cerium (IV) oxide composition with the arsenic-containing aqueous liquid stream generally occurs over a period of time of more than about 1 minute and no more than about 24 hours.

Some embodiments of the present disclosure include a device. The device can contain a cartridge and/or filter for treating an arsenic-containing aqueous stream. It can be appreciated that the arsenic-containing aqueous liquid stream can be a residential drinking water stream and/or source. The device can comprise one or more of a filtering and a cartridge device. Moreover, the device can comprise a container. One or more of the filtering and cartridge devices can be positioned in the container. The filter and cartridge devices can comprise an inlet attached to the source of the drinking water, a filter or cartridge containing the cerium (IV) oxide composition. The cerium (IV) oxide composition can be in the form of a fixed bed or a layer deposited on a substrate such as a porous polymeric structure or monolith. The device can have an outlet. In some embodiments, the cartridge and/or filter device can be configured to fit onto the faucet so that water exiting the faucet passes through the cartridge or filter device for dispensing. After the fixed bed in one of the cartridge or filter devices becomes saturated with arsenic, the cartridge or filter can be replaced with a new cartridge or filter of the same or similar design. The spent cartridge or filter is then disposed of in a legally approved manner.

In another embodiment, the process of the disclosure is used in community water treatment facilities to remove arsenic from drinking water before the water is distributed to local homes and businesses. For such use, the cerium (IV) oxide composition is typically present in large tanks in either slurry form or in a fixed bed so that relatively large amounts of arsenic containing water can be treated either in a continuous or batch mode. The water exiting or treated by the process typically has an arsenic concentration less than about 10 ppb, usually less than 5.0 ppb, and preferably less than 2.0 ppb.

The nature and objects of the disclosure are further illustrated by the following example, which is provided for illustrative purposes only and not to limit the disclosure as defined by the claims.

The following examples are provided to illustrate certain aspects, embodiments, and configurations of the disclosure and are not to be construed as limitations on the disclosure, as set forth in the appended claims. All parts and percentages are by weight unless otherwise specified.

EXAMPLE

A cerium (IV) oxide composition was prepared by the following method. In a closed, stirred container a one liter of a 0.12 M cerium (IV) ammonium nitrate solution was prepared from cerium (IV) ammonium nitrate crystals dissolved in nitric acid and held at approximately 90° C. for about 24 hours. In a separate container 200 ml of a 3M ammonium hydroxide solution was prepared and held at room temperature. Subsequently the two solutions were combined and stirred for approximately one hour. The resultant precipitate was filtered using Buckner funnel equipped with filter paper. The solids were then thoroughly washed in the Buckner using deionized water. Following the washing/filtering step, the wet hydrate was calcined in a muffle furnace at approximately 450° C. for three hours to form the cerium (IV) oxide composition.

A cerium (IV) oxide composition used has a zeta-potential of approximately 9.5 mV at a pH of 7, an isoelectric point at about pH 9.1, a surface area between 110 and 150 $m^2/g$, a particle size $D_{10}$ of approximately 2 μm, a particle size $D_{50}$ of approximately 9 μm, a particle size $D_{90}$ of approximately 25 μm, and a crystallite size of approximately 10 nm. As will be appreciated, crystallite sizes are measured by XRD or TEM and are the size of the individual crystals. The $D_{xx}$ sizes are the size of the particles that are made-up of the individual crystallites and is measured by laser diffraction.

In order to test the arsenic adsorption characteristics of the cerium (IV) oxide composition the following equilibrium isotherm study was done. Test solutions containing arsenic in the form of arsenate or arsenite were prepared according to guidelines for NSF 53 Arsenic Removal water as specified in section 7.4.1.1.3 of NSF/ANSI 53 drinking water treatment units-health effects standards document. 20 milligrams of the cerium (IV) oxide composition, were placed in a sealed 500 milliliter polyethylene container and slurried with about 500 milliliters of the test solution containing arsenic at concentrations as described in Table 1. The resultant slurries were agitated by tumbling the containers for several hours. After agitation, the tap water was separated from the solids by filtration through a 0.45 micron syringe filter and sealed in 125 milliliter plastic sample bottles. The bottles were then sent to a certified drinking water analysis laboratory where the amount of arsenic in each liquid sample was determined by ICP mass spectroscopy. The results of these tests are set forth below in Tables 1 and 2.

TABLE 1

| Initial arsenic(V) concentration before treatment with cerium (IV) oxide composition (μg/L) | Final arsenic(V) concentration after treatment with cerium (IV) oxide composition (μg/L) | Arsenic removal capacity of cerium (IV) oxide composition (mg As/g $CeO_2$) |
|---|---|---|
| 20 | 2.6 | 0.88 |
| 75 | 19.3 | 2.83 |
| 140 | 52 | 4.46 |
| 290 | 156.7 | 6.76 |
| 470 | 310 | 7.92 |

TABLE 2

| Initial arsenic(III) concentration before treatment with cerium (IV) oxide composition (µg/L) | Final arsenic(III) concentration after treatment with cerium (IV) oxide composition (µg/L) | Arsenic removal capacity of cerium (IV) oxide composition (mg As/g $CeO_2$) |
|---|---|---|
| 19 | 2 | 0.86 |
| 77 | 2 | 3.81 |
| 140 | 3.1 | 6.94 |
| 270 | 23 | 12.52 |
| 440 | 85 | 17.57 |

In order to test the arsenic adsorption characteristics of the cerium (IV) oxide composition at different pH points the following study was done. Test solutions containing arsenic in the form of arsenate or arsenite were prepared at varying pH points according to guidelines for NSF 53 Arsenic Removal water as specified in section 7.4.1.1.3 of NSF/ANSI 53 drinking water treatment units-health effects standards document. 10 to 20 milligrams of the cerium (IV) oxide composition were placed in a sealed 500 milliliter polyethylene container and slurried with about 500 milliliters of the test solution at pH points as described in Tables 3 and 4. The resultant slurries were agitated by tumbling the containers for several hours. After agitation, the tap water was separated from the solids by filtration through a 0.2 micron syringe filter and sealed in 125 milliliter plastic sample bottles. The bottles were then sent to a certified drinking water analysis laboratory where the amount of arsenic in each liquid sample was determined by ICP mass spectroscopy. The results of these tests are set forth below in Tables 3 and 4.

TABLE 3

| pH of water | Initial arsenic(V) concentration before treatment with cerium (IV) oxide composition (µg/L) | Final arsenic(V) concentration after treatment with cerium (IV) oxide composition (µg/L) | Arsenic removal capacity of cerium (IV) oxide composition (mg As/g $CeO_2$) |
|---|---|---|---|
| 2.45 | 140 | 7.5 | 3.27 |
| 4.50 | 150 | 11 | 6.91 |
| 6.50 | 140 | 8 | 7.10 |
| 8.52 | 140 | 16 | 6.18 |
| 9.54 | 140 | 84 | 2.80 |
| 10.56 | 33 | 22 | 0.54 |

TABLE 4

| pH of water | Initial arsenic(III) concentration before treatment with cerium (IV) oxide composition (µg/L) | Final arsenic(III) concentration after treatment with cerium (IV) oxide composition (µg/L) | Arsenic removal capacity of cerium (IV) oxide composition (mg As/g $CeO_2$) |
|---|---|---|---|
| 2.43 | 130 | 45 | 4.27 |
| 4.42 | 130 | 8 | 6.02 |
| 6.43 | 130 | 7 | 6.21 |
| 8.38 | 130 | 8 | 6.17 |
| 9.54 | 130 | 9 | 6.06 |
| 10.71 | 69 | 11 | 2.92 |

In order to test the kinetics of arsenic adsorption of the said cerium (IV) oxide composition of the Example the following study was done. Test solutions containing arsenic (V) in the form of arsenate were prepared according to guidelines for NSF 53 Arsenic Removal water as specified in section 7.4.1.1.3 of NSF/ANSI 53 drinking water treatment units-health effects standards document. 10 milligrams of the cerium (IV) oxide composition of the Example, were placed in a sealed 500 milliliter polyethylene container and slurried with about 500 milliliters of the test solution at different pH points containing arsenic at concentrations as described in Tables 5 and 6. The resultant slurries were agitated by tumbling the containers for a set time given to each individual sample. After agitation, the tap water was separated from the solids by filtration through a 0.2 micron syringe filter and sealed in 125 milliliter plastic sample bottles. The bottles were then sent to a certified drinking water analysis laboratory where the amount of arsenic in each liquid sample was determined by ICP mass spectroscopy. The results of these tests are set forth below in Tables 5 and 6.

TABLE 5

| Equilibrium Time (min) | Initial arsenic(V) concentration before treatment with cerium (IV) oxide composition (µg/L) | Final arsenic(V) concentration after treatment with cerium (IV) oxide composition (µg/L) | Arsenic removal capacity of cerium (IV) oxide composition (mg As/g $CeO_2$) | Inverse of the arsenic removal capacity of cerium (IV) oxide composition (1/(mg As/g $CeO_2$)) |
|---|---|---|---|---|
| 18 | 100 | 38 | 3.13 | 26.32 |
| 34 | 100 | 27 | 3.76 | 37.04 |
| 77 | 100 | 18 | 4.18 | 55.56 |
| 139 | 100 | 11 | 4.54 | 90.91 |
| 228 | 100 | 6.9 | 4.66 | 144.93 |
| 475 | 100 | 4.1 | 4.99 | 243.90 |

TABLE 6

| Equilibrium Time (min) | Initial arsenic(III) concentration before treatment with cerium (IV) oxide composition (µg/L) | Final arsenic(III) concentration after treatment with cerium (IV) oxide composition (µg/L) | Arsenic removal capacity of cerium (IV) oxide composition (mg As/g $CeO_2$) | Inverse of the arsenic removal capacity of cerium (IV) oxide composition (1/(mg As/g $CeO_2$)) |
|---|---|---|---|---|
| 19 | 87 | 50 | 1.86 | 20 |
| 36 | 87 | 38 | 2.36 | 26.32 |
| 122 | 87 | 8 | 3.87 | 125 |
| 496 | 87 | 2 | 4.31 | 400.00 |

Test solutions containing Fluoride were prepared according to guidelines for NSF 53 Arsenic Removal water as specified in section 7.4.1.1.3 of NSF/ANSI 53 drinking water treatment units-health effects standards document. 500 milligrams of the cerium (IV) oxide composition of the Example were placed in a sealed 125 milliliter polyethylene container and slurried with about 50 milliliters of test solution with Fluoride concentrations as described in the Table. The resultant slurries were agitated by tumbling the containers for several hours. After agitation, the test solution was separated from the solids by filtration through a 0.45 micron syringe filter. The filtrate was sealed in 125 milliliter plastic sample bottles and sent to a certified drinking water analysis laboratory where the amount of arsenic in each filtrate was determined by ICP mass spectroscopy. The results of these tests are set forth below in Table 7.

TABLE 7

| Initial Fluoride concentration before treatment with cerium (IV) oxide composition (mg/L) | Final Fluoride concentration after treatment with cerium (IV) oxide composition (mg/L) | Fluoride removal capacity of with cerium (IV) oxide composition (mg F/g $CeO_2$) |
|---|---|---|
| 1.14 | 0.107 | 0.10 |
| 5.1 | 0.263 | 0.48 |
| 10.7 | 0.713 | 1.00 |
| 20.4 | 0.2533 | 1.80 |
| 48 | 15.600 | 3.21 |

Test solutions containing Fluoride were prepared according to guidelines for NSF 53 Arsenic Removal water as specified in section 7.4.1.1.3 of NSF/ANSI 53 drinking water treatment units-health effects standards document. 500 milligrams of the cerium (IV) oxide composition of the Example were placed in a sealed 125 milliliter polyethylene container and slurried with about 50 milliliters of test solution at different pH points as described in the Table. The resultant slurries were agitated by tumbling the containers for several hours. After agitation, the test solution was separated from the solids by filtration through a 0.45 micron syringe filter. The filtrate was sealed in 125 milliliter plastic sample bottles and sent to a certified drinking water analysis laboratory where the amount of arsenic in each filtrate was determined by ICP mass spectroscopy. The results of these tests are set forth below in Table 8.

TABLE 8

| pH of Water | Final Fluoride concentration after treatment with cerium (IV) oxide composition (µg/L) | Fluoride removal capacity of cerium (IV) oxide composition (mg As/g $CeO_2$) |
|---|---|---|
| 2.53 | 0.167 | 6.82 |
| 4.53 | 1.300 | 6.45 |
| 6.47 | 2.227 | 5.10 |
| 8.63 | 3.133 | 4.22 |
| 9.46 | 9.200 | 6.06 |
| 10.5 | 6.050 | 0.95 |

COMPARATIVE EXAMPLE

Test solutions containing arsenic(V) were prepared according to guidelines for NSF 53 Arsenic Removal water as specified in section 7.4.1.1.3 of NSF/ANSI 53 drinking water treatment units-health effects standards document. 20 milligrams of commercially available oxide of cerium (IV) ($CeO_2$ prepared by calcining $Ce_2(CO_3)_3 \cdot 6H_2O$ and having a Zeta potential of about 16 mV at pH 7, an iso-electric point of about pH 8.8, a particle size $D_{10}$ of about 4 um, particle size $D_{50}$ of about 30 um, a particle size $D_{90}$ of about 90 um, and a crystallite size of about 19 nm. in a muffle furnace for 2 hours), were placed in a sealed 500 milliliter polyethylene container and slurried with about 500 milliliters of an arsenic test solution at concentrations as described in Tables 1-8. The resultant slurries were agitated by tumbling the containers for several hours. After agitation, the test solution was separated from the solids by filtration through a 0.45 micron syringe filter. The filtrate was sealed in 125 milliliter plastic sample bottles and sent to a certified drinking water analysis laboratory where the amount of arsenic in each filtrate was determined by ICP mass spectroscopy. The results of these tests are set forth below in Tables 9-16.

TABLE 9

| Initial Arsenic(V) concentration before treatment with an oxide of cerium (IV) of the prior art (µg/L) | Final Arsenic(V) concentration after treatment with an oxide of cerium (IV) of the prior art (µg/L) | Arsenic removal capacity of an oxide of cerium (IV) of the prior art (mg As/g $CeO_2$) |
|---|---|---|
| 19 | 15 | 0.20 |
| 78 | 65 | 0.64 |
| 190 | 170 | 1.00 |
| 290 | 260 | 1.48 |
| 480 | 443 | 1.84 |

TABLE 10

| Initial arsenic(III) concentration before treatment with an oxide of cerium (IV) of the prior art (µg/L) | Final arsenic(III) concentration after treatment with oxide of cerium (IV) of the prior art (µg/L) | Arsenic removal capacity of an oxide of cerium (III) of the prior art (mg As/g $CeO_2$) |
|---|---|---|
| 20 | 2.9 | 0.85 |
| 79 | 13 | 3.25 |
| 140 | 32 | 5.42 |
| 270 | 92 | 8.78 |
| 450 | 200 | 12.54 |

TABLE 11

| pH of water | Initial arsenic(V) concentration before treatment with cerium (IV) oxide composition (µg/L) | Final arsenic(V) concentration after treatment with cerium (IV) oxide composition (µg/L) | Arsenic removal capacity of cerium (IV) oxide composition (mg As/g $CeO_2$) |
|---|---|---|---|
| 2.45 | 140 | 39 | 5.15 |
| 4.50 | 150 | 12 | 6.89 |
| 6.50 | 140 | 46 | 4.75 |
| 8.52 | 140 | 110 | 1.50 |
| 9.54 | 140 | 127 | 0.67 |
| 10.56 | 33 | 25 | 0.38 |

TABLE 12

| pH of water | Initial arsenic(III) concentration before treatment with cerium (IV) oxide composition (µg/L) | Final arsenic(III) concentration after treatment with cerium (IV) oxide composition (µg/L) | Arsenic removal capacity of cerium (IV) oxide composition (mg As/g $CeO_2$) |
|---|---|---|---|
| 2.43 | 130 | 22 | 5.23 |
| 4.42 | 130 | 5 | 6.29 |
| 6.43 | 130 | 14 | 5.73 |
| 8.38 | 130 | 35 | 4.61 |

TABLE 12-continued

| pH of water | Initial arsenic(III) concentration before treatment with cerium (IV) oxide composition (µg/L) | Final arsenic(III) concentration after treatment with cerium (IV) oxide composition (µg/L) | Arsenic removal capacity of cerium (IV) oxide composition (mg As/g $CeO_2$) |
|---|---|---|---|
| 9.54 | 130 | 61 | 3.50 |
| 10.71 | 69 | 36 | 1.66 |

TABLE 13

| Equilibrium Time (min) | Initial arsenic(V) concentration before treatment with cerium (IV) oxide composition (µg/L) | Final arsenic(V) concentration after treatment with cerium (IV) oxide composition (µg/L) | Arsenic removal capacity of cerium (IV) oxide composition (mg As/g $CeO_2$) | Inverse of the arsenic removal capacity of cerium (IV) oxide composition (1/(mg As/g $CeO_2$)) |
|---|---|---|---|---|
| 19 | 100 | 95 | 0.25 | 10.53 |
| 34 | 100 | 92 | 0.41 | 10.87 |
| 68 | 100 | 87 | 0.65 | 11.49 |
| 129 | 100 | 82 | 0.88 | 12.20 |
| 222 | 100 | 76 | 1.21 | 13.16 |
| 470 | 100 | 68 | 1.60 | 14.49 |

TABLE 14

| Equilibrium Time (min) | Initial arsenic(III) concentration before treatment with cerium (IV) oxide composition (µg/L) | Final arsenic(III) concentration after treatment with cerium (IV) oxide composition (µg/L) | Arsenic removal capacity of cerium (IV) oxide composition (mg As/g $CeO_2$) | Inverse of the arsenic removal capacity of cerium (IV) oxide composition (1/(mg As/g $CeO_2$)) |
|---|---|---|---|---|
| 19 | 87 | 78 | 0.45 | 12.82 |
| 35 | 87 | 80 | 0.36 | 12.50 |
| 68 | 87 | 66 | 1.00 | 15.15 |
| 122 | 87 | 59 | 1.47 | 16.95 |
| 257 | 87 | 52 | 1.68 | 19.23 |
| 485 | 87 | 49 | 1.88 | 20.41 |

TABLE 15

| Initial Fluoride concentration before treatment with cerium (IV) oxide composition (µg/L) | Final Fluoride concentration after treatment with cerium (IV) oxide composition (µg/L) | Fluoride removal capacity of cerium (IV) oxide composition (mg F/g $CeO_2$) |
|---|---|---|
| 1.14 | 0.107 | 0.10 |
| 5.1 | 0.263 | 0.48 |
| 10.7 | 0.713 | 1.00 |
| 20.4 | 0.2533 | 1.80 |
| 48 | 15.600 | 3.21 |

TABLE 16

| pH of Water | Final Fluoride concentration after treatment with with cerium (IV) oxide composition (µg/L) | Fluoride removal capacity of cerium (IV) oxide composition (mg F/g $CeO_2$) |
|---|---|---|
| 2.53 | 0.167 | 6.82 |
| 4.53 | 1.300 | 6.45 |
| 6.47 | 2.227 | 5.10 |
| 8.63 | 3.133 | 4.22 |
| 9.46 | 9.200 | 6.06 |
| 10.5 | 6.050 | 0.95 |

The advantages of using the novel cerium (IV) oxide composition of this disclosure to the oxide of cerium (IV) of prior are obvious in the above tables and graphs. Superior arsenic removal capacities are evident at all final concentrations in water can be seen FIGS. 1-10. Furthermore this exceptional arsenic adsorption capacity results in very low arsenic concentrations in the treated water as is demonstrated FIGS. 1-10.

FIGS. 1-10 uniquely points out the drastic differences in the performance of the cerium (IV) oxide composition and the oxide of cerium (IV) of prior art (comparative Example) On the y-axis the As capacity divided by the Final As concentration is plotted in units of (mg As/g material)/(mg As/L solution).

Referring to FIG. 1, this Fig. shows the Arsenic (III) and (V) removal capacities of an oxide of cerium (IV) of the prior art (Comparative Example). The oxide of cerium (IV) of the prior art removal capacity of arsenic (III) is greater than the removal for arsenic (V). Additionally, the removal capacity of the oxide of cerium (IV) of the prior art for arsenic (III) decreases much slower than it does for arsenic (V) as the initial arsenic concentration increases.

Figure 2:
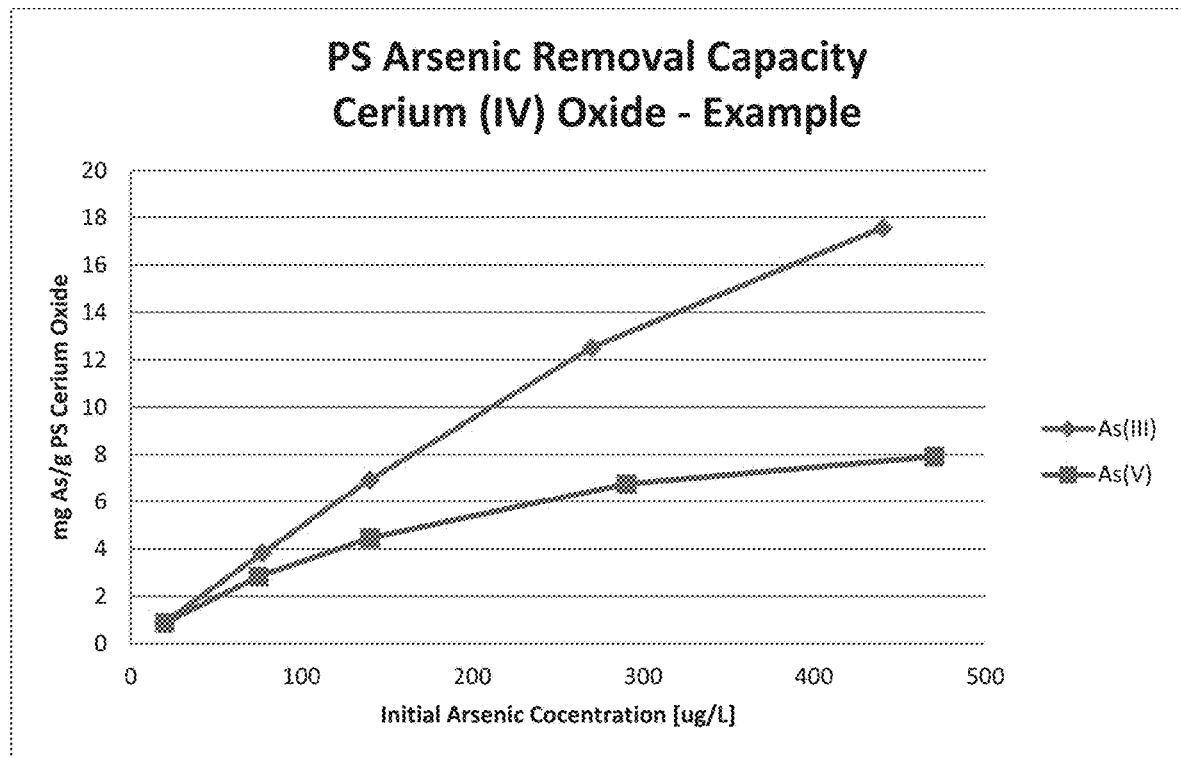
FIG. 2 is a plot of both arsenic (III) and (V) removal capacity against the initial arsenic concentration for the cerium (IV) oxide composition of the Example.

FIG. 2 shows Arsenic (III) and (V) removal capacities of the cerium (IV) oxide composition of the Example. Compared to the oxide of cerium (IV) of the prior art (Comparative Example), the cerium (IV) oxide composition of the Example not only removes more arsenic at every initial concentration level, the removal capacity also decreases more slowly, compared to oxide of cerium (IV) of the prior art as the initial arsenic concentration increases. This is represented by the slopes of each of the lines in FIGS. 1 and 2.

Figure 3:
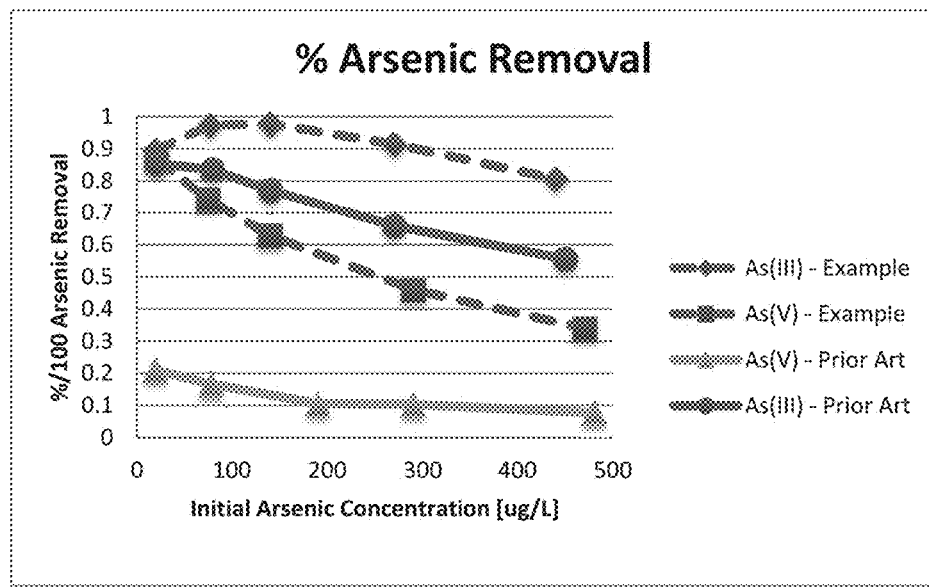
FIG. 3 is a comparison plot of the percentage of both arsenic (III) and (V) removal against the initial arsenic concentration for a prior art oxide of cerium (IV) and the cerium (IV) oxide composition of the Example.

Referring to FIG. 3, this Fig. shows the percentage of arsenic (III) and (V) removal for both the oxide of cerium (IV) of the prior art (Comparative Example) and the cerium (IV) oxide composition of Example. In regards to arsenic (III), the cerium (IV) oxide composition (of the Example) removes a greater percentage of arsenic at every initial arsenic (III) concentration level than the oxide of cerium (IV) of prior art (comparative example). Similarly, in regards to arsenic (V), the cerium (IV) oxide composition of the Example removes a substantially higher percentage of arsenic (V) at every initial arsenic (V) concentration level than the prior art oxide of cerium (IV). Additionally, for arsenic (III), the decrease in the percentage removed as initial arsenic concentration increases is less for the cerium (IV) oxide composition (of the Example) than the prior art oxide of cerium (IV) (Comparative Example).

Figure 4:
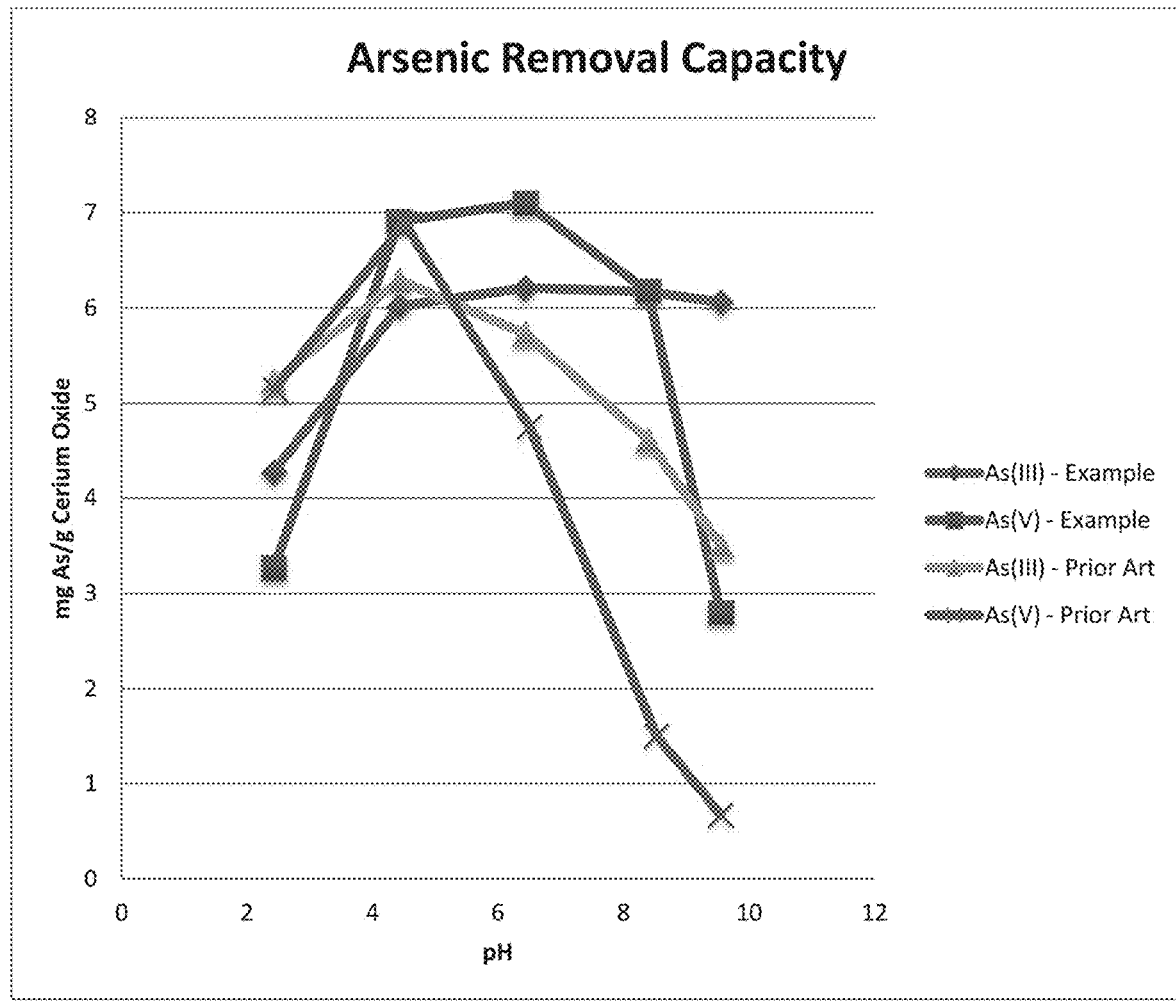
FIG. 4 is a comparison plot of both the arsenic (III) and (V) removal capacity against pH for a prior art oxide of cerium (IV) and the cerium (IV) oxide composition of the Example.

FIG. 4 shows the removal capacity for both the cerium (IV) oxide composition (of the Example) and the oxide of cerium (IV) of the prior art (comparative example) as a function of pH. First, note that for both arsenic (III) and arsenic (V) at a pH of about pH 4, of the oxide of cerium (IV) of the prior art (Comparative Example) and the cerium (IV) oxide composition (of the Example) show essentially equal capacity. For a pH of less than about pH 4, the oxide of cerium (IV) (Comparative Example) has a greater capacity in regards to both arsenic (III) and arsenic (V). However, once pH reaches levels greater than about pH 4, the cerium (IV) oxide composition (of the Example) has a greater capacity in regards to both arsenic (III) and arsenic (V) than the oxide of cerium (IV) of the prior art (comparative example).

Figure 5:
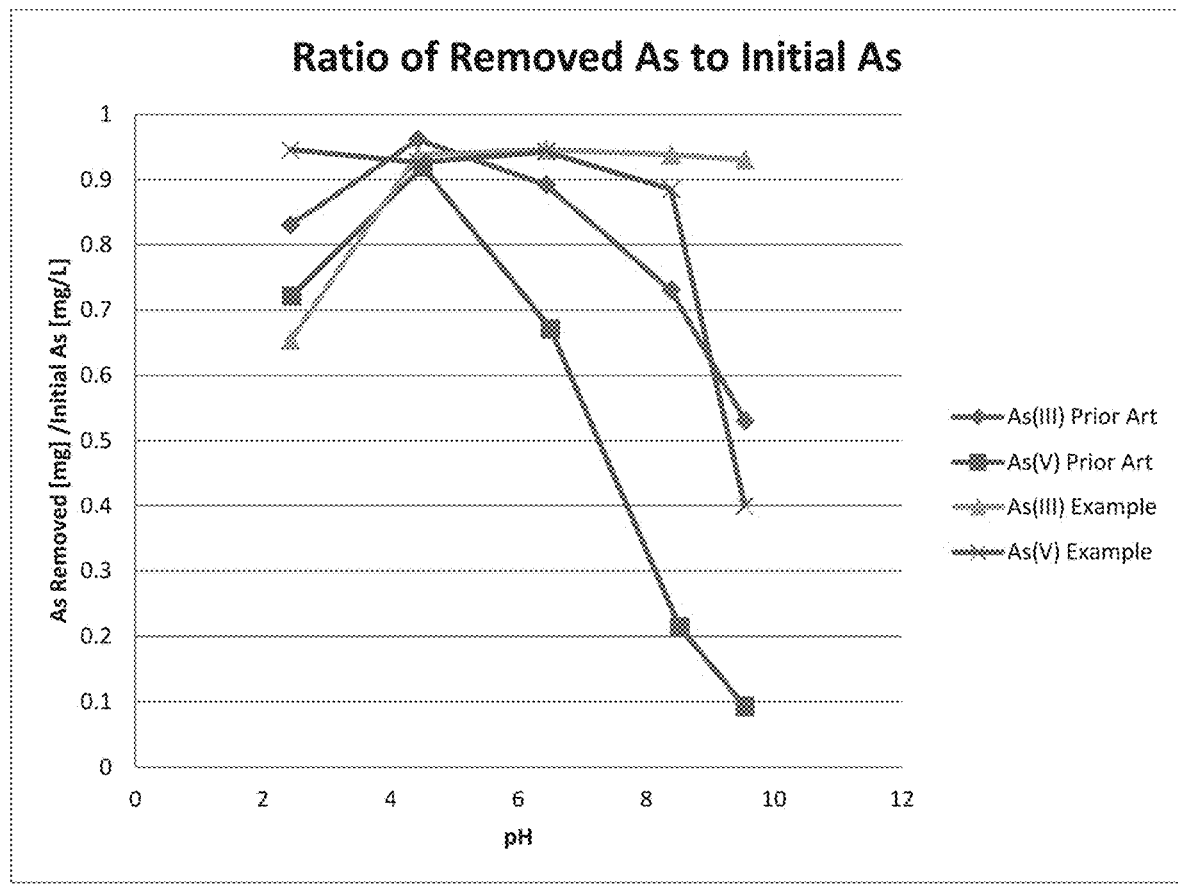
FIG. 5 is a comparison plot of the ratio of removed arsenic (III) and (V) against pH for a prior art oxide of cerium (IV) and the cerium (IV) oxide composition of the Example.

FIG. 5 shows the ratio of removed arsenic to the initial arsenic present as the pH level changes. First, note again that for both arsenic (III) and arsenic (V) at a pH of about 4, oxide of cerium (IV) (Comparative Example) and the cerium (IV) oxide composition (Example) show essentially equal capacity. For a pH of less than about pH 4, the cerium (IV) oxide composition (of the Example) has the highest ration as to arsenic (V), but the lowest as to arsenic (III). However, at a pH of greater than about 4, the cerium (IV) oxide composition (of the Example) has a ratio of removed arsenic (III) that remains consistently over 0.9. In regards to arsenic (V), the cerium (IV) oxide composition (of the Example) has a ratio of approximately 0.9 until a pH of about pH 9, when the ratio steeply declines to about 0.4. The oxide of cerium (IV) of the prior art (Comparative Example), on the other hand, shows the ratio of arsenic (V) declining sharply starting about pH of about pH 4, while the ratio of removed arsenic (III), while not declining as sharply, also declines starting at about pH of about pH 4.

Figure 6:
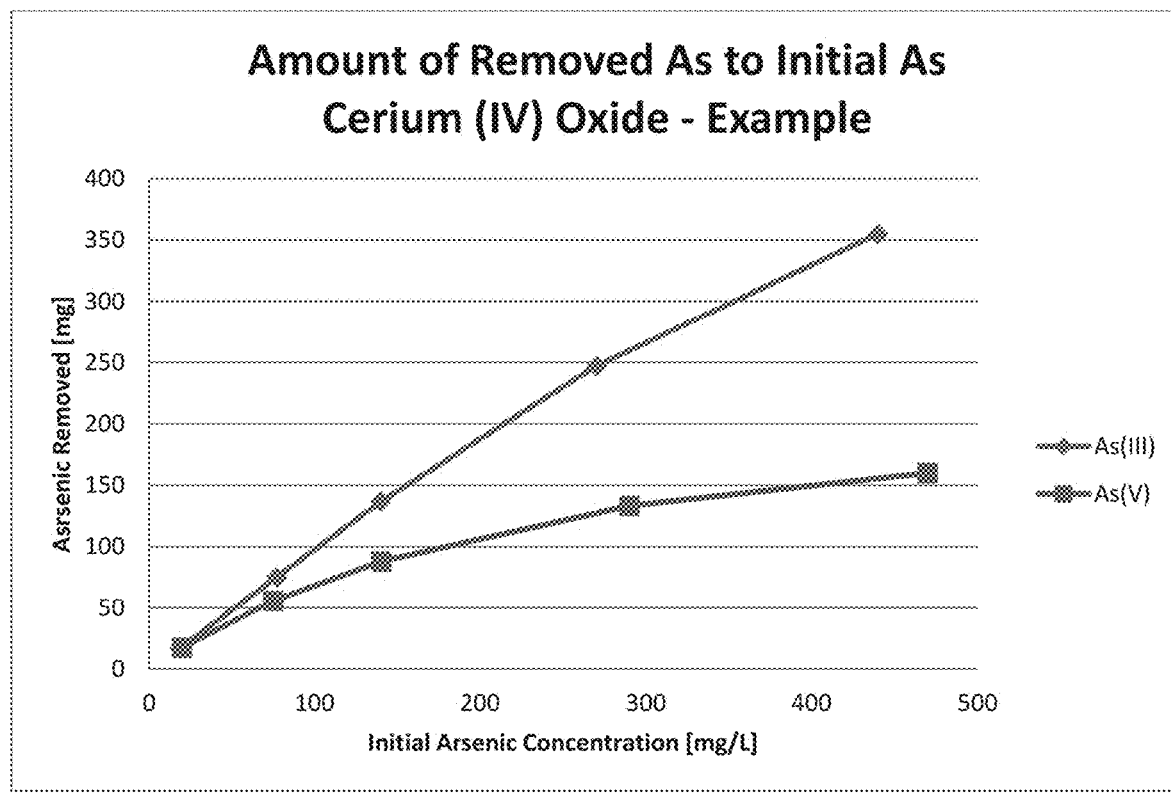
FIG. 6 is a plot of both the arsenic (III) and (V) removal against the initial arsenic concentration for the cerium (IV) oxide composition of the Example.

Referring to FIG. 6, this Fig. shows the amount of removed arsenic (III) and (V) for the cerium (IV) oxide composition of Example. The cerium (IV) oxide composition of the Example is able to remove arsenic (III) at much higher quantities at every initial arsenic concentration value, and also the ability to remove arsenic also declines at a slower rate with respect to both arsenic (III) and (V) as compared to the oxide of cerium (IV) of the prior art (Comparative Example).

Figure 7:
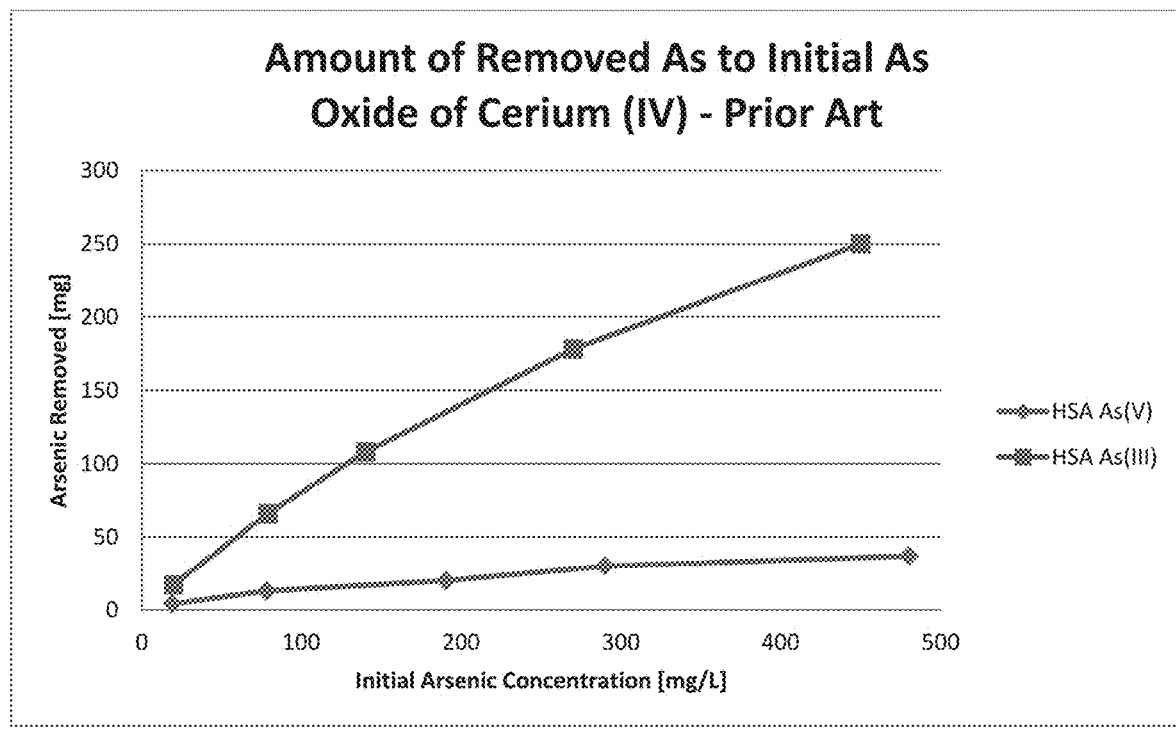
FIG. 7 is a plot of both the arsenic (III) and (V) removal against the initial arsenic concentration for a prior art oxide of cerium (IV)

FIG. 7 shows the amount of removed arsenic (III) and (V) for the oxide of cerium (IV) of the prior art (Comparative Example). While the oxide of cerium (IV) of the prior art (Comparative Example) still removes arsenic (III) much more effectively than arsenic (V), the oxide of cerium (IV) of the prior art is less effective at removing both arsenic (III) and (V) as compared to the cerium (IV) oxide composition (of the Example). Comparing FIG. 7 with FIG. 6, the cerium (IV) oxide composition (of the Example) removes a greater amount of each of arsenic (III) and (V) at every initial concentration level, and the capacity to remove arsenic (III) and (V) decreases at a slower rate as the initial arsenic concentration increases.

Figure 8:
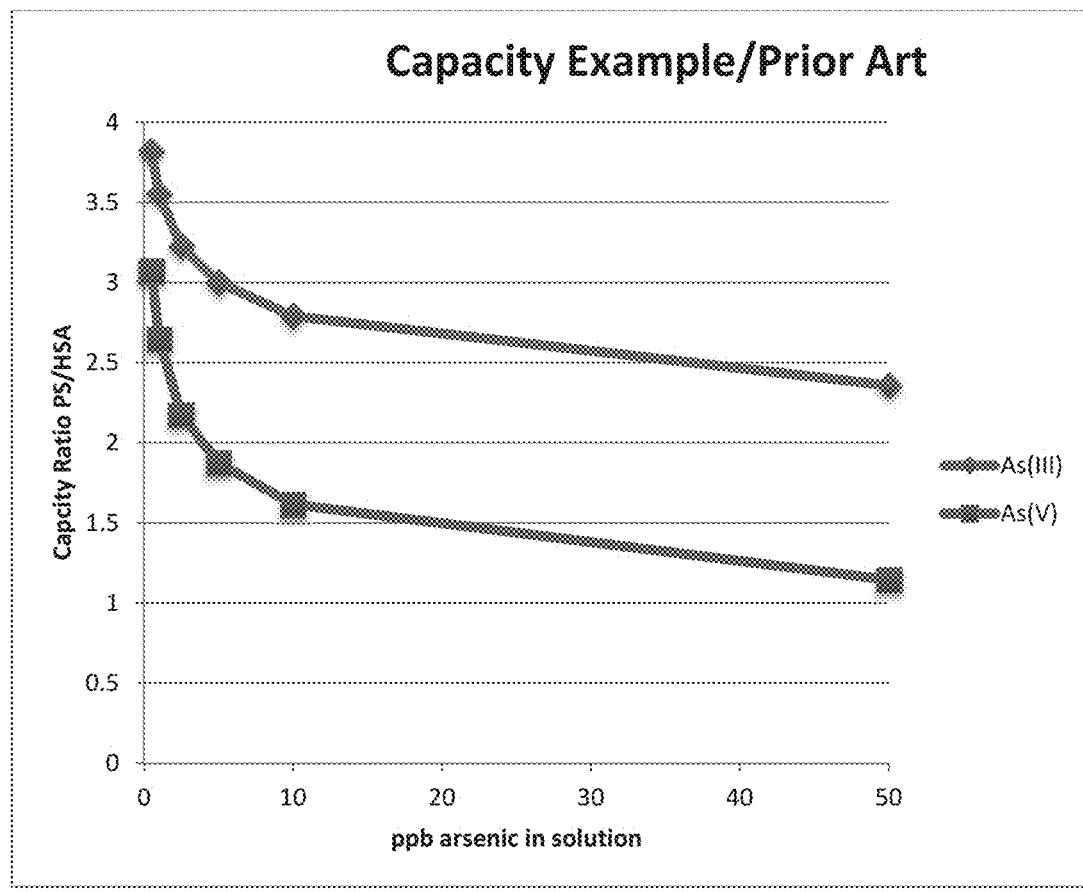
FIG. 8 is a plot of the capacity ratio between the cerium (IV) oxide of the Example and a prior art oxide of cerium (IV) against the amount of arsenic in solution.

FIG. 8 shows the capacity ratio of the cerium (IV) oxide (of the Example) to the oxide of cerium (IV) of the prior art (Comparative Example) for arsenic (III) and (V) removal capacity. For both arsenic (III) and (V), the removal capacity ratio declines steeply between 0 and about 5 ppb of arsenic in solution. For arsenic concentrations above 5 ppb, the decline is much slower, and is essentially linear between about 10 and about 50 ppb. For arsenic (III) concentrations below about 10 ppb, the ratio between the cerium (IV) oxide composition (of the Example) and the oxide of cerium (IV) of the prior art (the Comparative Example) is between approximately 2.8 and 3.8, and even at about 50 ppb the ratio is still approximately 2.4. For arsenic (V) concentrations below about 10 ppb, the ratio between the cerium (IV) oxide composition (of the Example) and the oxide of cerium (IV) of the prior art (Comparative Example) is between approximately 1.6 and 3.1, and even at about 50 ppb the ratio is still approximately 1.1. Thus, the cerium (IV) oxide (of the Example) has a higher capacity than the oxide of cerium (IV) of the prior art for both arsenic (III) and (V) at every arsenic concentration up to at least 50 ppb.

Figure 9:
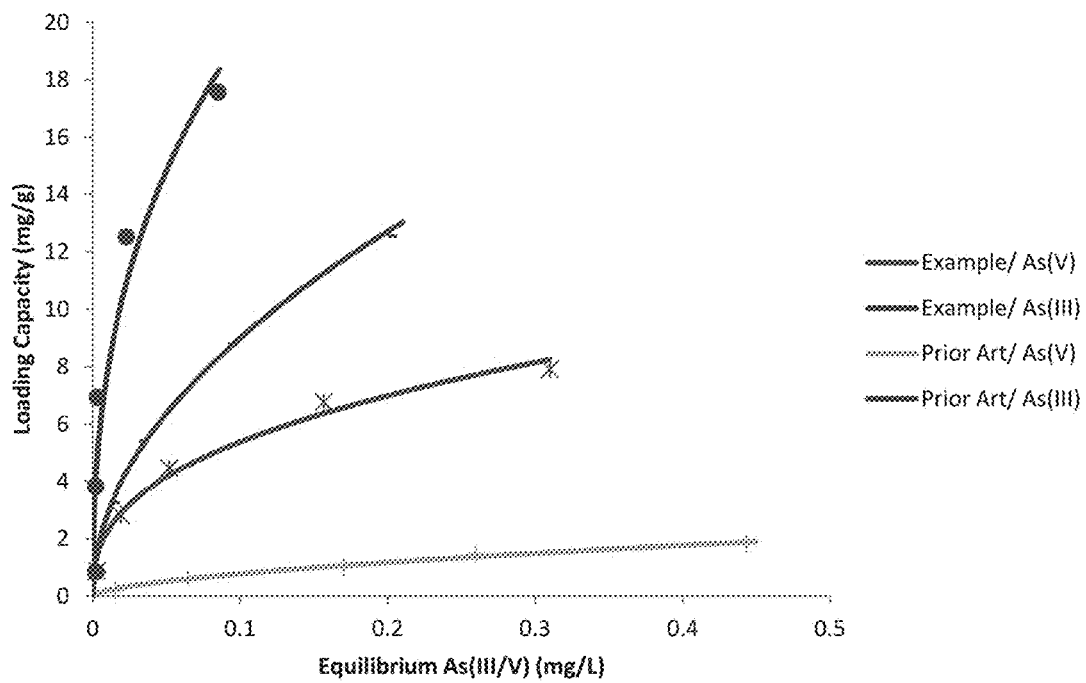
FIG. 9 is a comparison plot of the loading capacity of a prior art oxide of cerium (IV) and the cerium (IV) oxide composition of the Example for both arsenic (III) and (V) against the equilibrium arsenic (III/V) value.

Referring to FIG. 9, this Fig. shows the removal capacity of the cerium (IV) oxide of the composition (of the Example) and the oxide of cerium (IV) of the prior art (Comparative Example) for both arsenic (III) and (V) with respect to the equilibrium of arsenic (II/V). The cerium (IV) oxide composition outperforms the oxide of cerium (IV) of the prior art with respect to both arsenic (III) and (V). With respect to arsenic (III), the cerium (IV) oxide composition shows a steep increase, reaching a removal capacity of about 17 at an equilibrium value of about 0.9. In contrast, the oxide of cerium (IV) of the prior art shows a less steep increase, reaching a removal capacity of only about 13, which it does not reach until an equilibrium value of about 0.2. With respect to arsenic (V), the cerium (IV) oxide composition shows a less steep curve, reaching a removal capacity of about 8 at an equilibrium value of about 0.3. By contrast, the oxide of cerium (IV) of the prior art (Comparative Example) shows a relatively flat curve, only reaching a removal capacity of about 2 at an equilibrium value of about 0.45.

Figure 10:
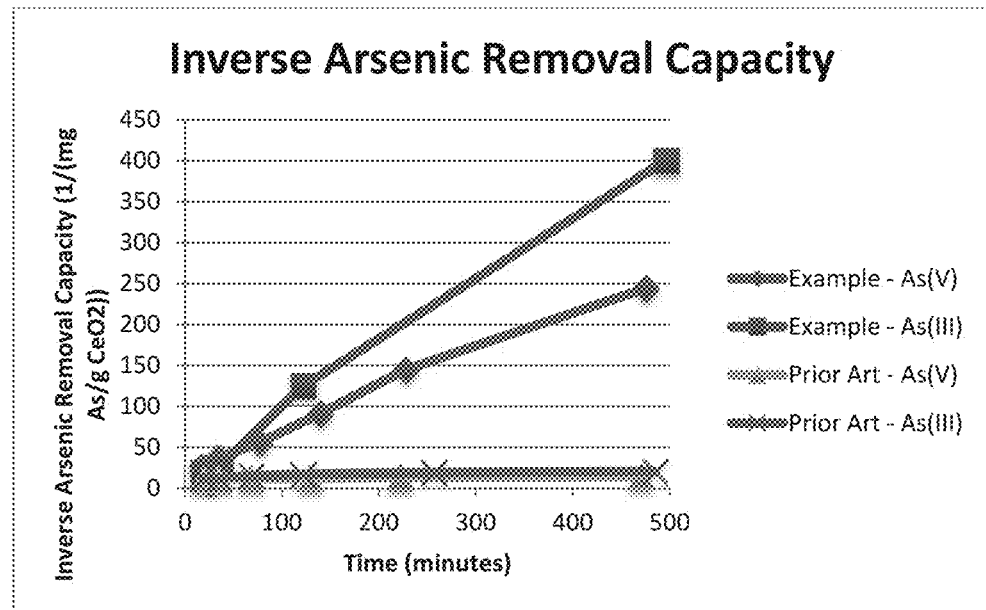
FIG. 10 is a comparison plot of the inverse arsenic removal capacity of the cerium (IV) oxide of the Example and a prior art oxide of cerium (IV) against the equilibrium time for both arsenic (III) and (V)

FIG. 10 shows the inverse of the removal capacity as a function of time for the cerium (IV) oxide composition of the Example and the Comparative Example. The cerium (IV) oxide composition of the Example shows an inverse arsenic removal capacity that is substantially higher for both arsenic (III) and (V) than that for the Comparative Example.

Figure 11:
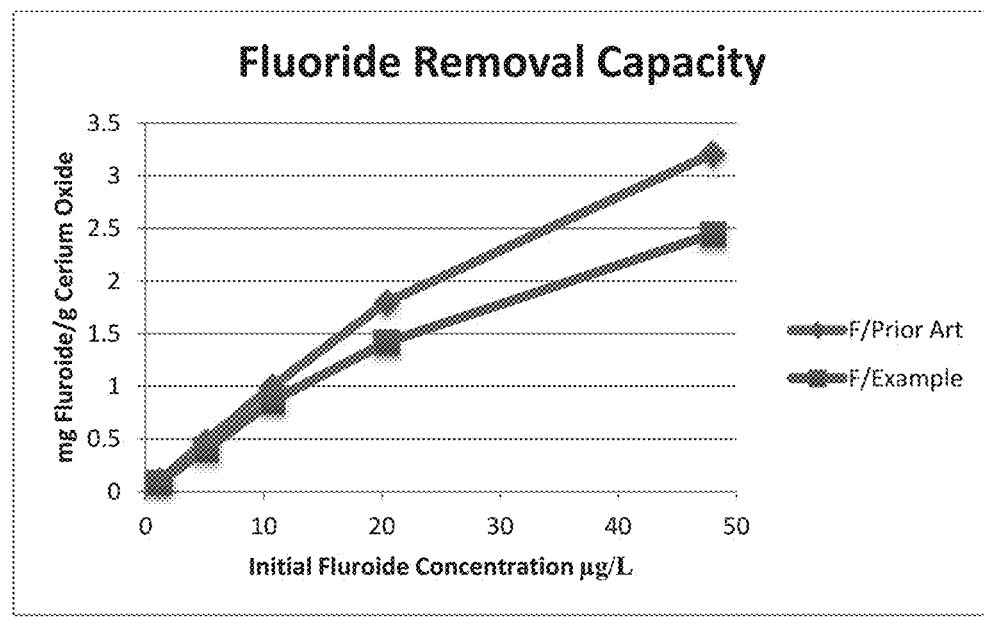
FIG. 11 is a comparison plot of the fluoride removal capacity against the initial fluoride concentration for a prior art oxide of cerium (IV) and the cerium (IV) oxide composition of the Example.

FIG. 11 shows the removal of fluoride as a function of initial fluoride concentration for the cerium (IV) oxide composition of the Example and the Comparative Example. The cerium (IV) oxide composition of the Example removes fluoride less effectively than the Comparative Example for every level of initial fluoride concentration, despite the fact that the cerium (IV) oxide of the Example displays substantially superior arsenic (III) and (V) removal.

Figure 12:
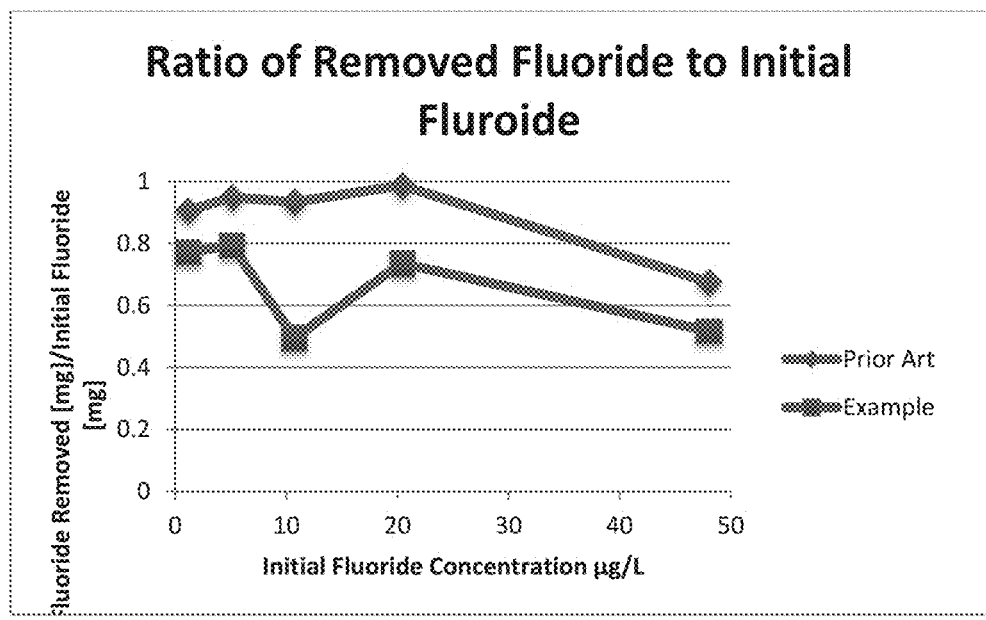
FIG. 12 is a comparison plot of the ratio of removed fluoride against the initial fluoride concentration for a prior art oxide of cerium (IV) and the cerium (IV) oxide composition of the Example.

FIG. 12 shows the ratio of fluoride removal as a function of initial fluoride concentration for both the cerium (IV) oxide composition of the Example and the Comparative Example. Again, despite showing a substantially superior ability to remove arsenic (III) and (V), the ratio of fluoride removed by the cerium (IV) oxide composition of the Example is lower than that removed by the Comparative Example.

Figure 13:
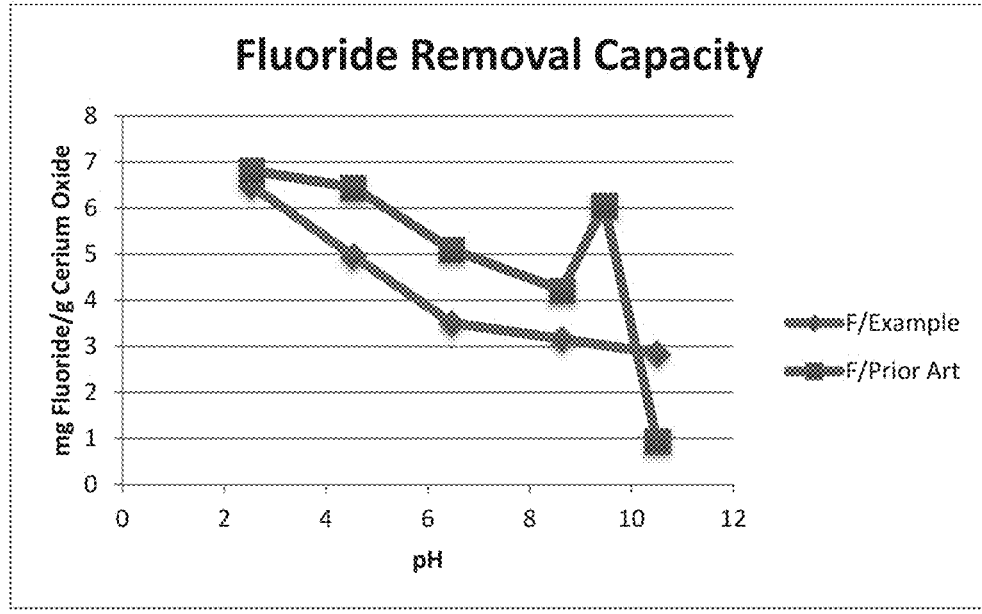
FIG. 13 is a comparison plot of the fluoride removal capacity against pH for a prior art oxide of cerium (IV) and the cerium (IV) oxide composition of the Example.

FIG. 13 shows the fluoride removal as a function of pH for both the cerium (IV) oxide composition of the Example and the Comparative Example. The removal ability as a function of pH is less effective for the cerium (IV) oxide composition of the Example than the Comparative Example at every pH level except for pH of about 10. Again, this is despite the fact that the cerium (IV) oxide composition of the Example shows improved results in arsenic (III) and (V) removal as a function of pH for most pH levels.

Figure 14:
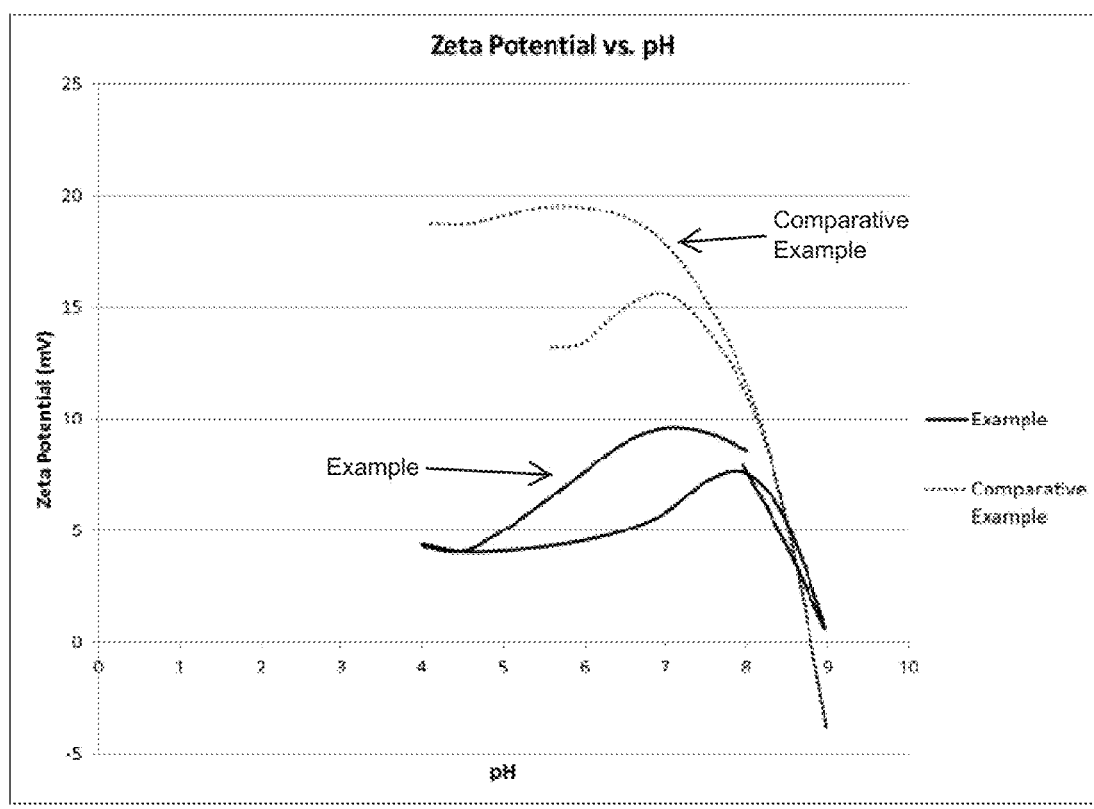
FIG. 14 is a comparison plot of the zeta potential of both the cerium (IV) oxide composition of the Example and a prior art oxide of cerium (IV) against pH.

FIG. 14 shows the zeta potential for both the Example and the Comparative Example as a function of pH. The zeta potential of the cerium (IV) oxide composition of the Example is higher from a pH of about 4 until a pH of about 8.5. For a pH of above about 8.5, the Comparative Example has a larger zeta potential.

Figure 15:
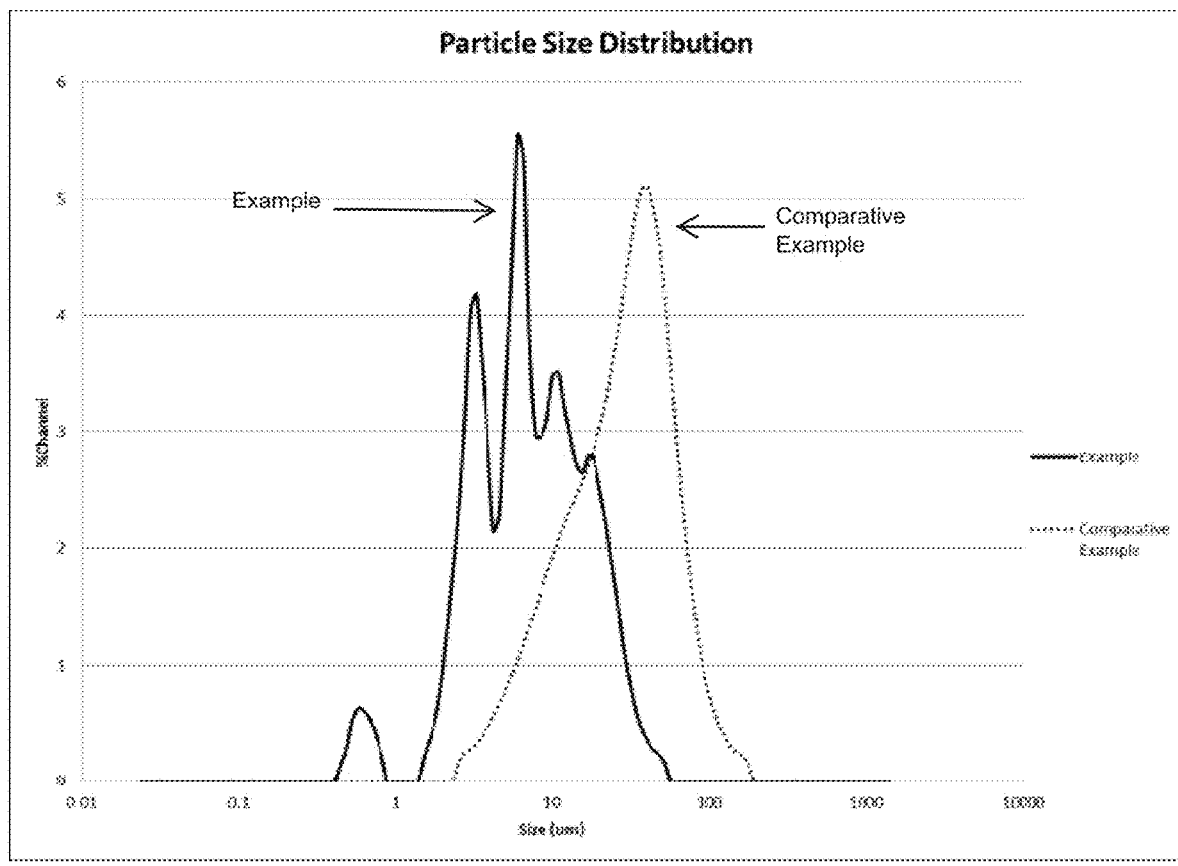
FIG. 15 is a comparison plot of the particle size distribution for both the cerium (IV) oxide composition of the Example and a prior art oxide of cerium (IV).

FIG. 15 shows the particle size distribution for both the Example and the Comparative Example. The particle size distribution of the Example is much less uniform than that of the Comparative Example, and the cerium (IV) oxide composition of the Example also has a smaller average particle size than the Comparative Example.

The arsenic (III) and arsenic (V) removal data as depicted in Tables 1-6 for the cerium (IV) oxide composition and Tables 9-14 and FIGS. 1-10 for the oxide of cerium (IV) of the prior art, the cerium (IV) oxide composition has expected properties towards arsenic (III) and arsenic (IV). In other words, a person of ordinary skill in the art of rare earths and/or water treatment chemistry would not expect the cerium (IV) oxide composition of the present disclosure to remove arsenic from an aqueous stream differently than the oxide of cerium (IV) of the prior art. Furthermore, the cerium (IV) oxide composition remove fluoride from an aqueous differently than the oxide of cerium (IV) of the prior art, as depicted in Tables 7, 8, 15 and 16 and FIGS. 11-13 The cerium (IV) oxide composition has surprising and unexpected removal capacities for arsenite and arsenate, particularly at low levels arsenite and arsenate in aqueous stream.

Another way to think of this is as the distribution coefficient (K). K=[As] in solid/[As] in solution. As can be seen from Tables 17 and 18, if the cerium (IV) oxide composition and the oxide of cerium (IV) have the same capacity, 1) the cerium (IV) oxide composition can treat a significantly lower concentration of As and 2) the final concentration obtained with the cerium (IV) oxide composition will be drastically lower than in that obtained with the oxide of cerium (IV) of the prior art, as shown in Tables 17 and 18.

At nearly the same initial concentration, the final concentration and capacity are strikingly different. Also when the data is normalized to capacity, the initial and final concentrations are strikingly different.

TABLE 17

| Removal Media | Removal Media Amount | Initial Concentration of Arsenic (ppb) | Final Concentration of Arsenic (ppb) | Removal Media Loading Capacity (mg/g) |
| --- | --- | --- | --- | --- |
| Cerium (IV) Oxide Composition | 20 mg | 100 | ~3 | ~5.2 |
| Oxide of Cerium (IV) of the Prior Art | 20 mg | 100 | ~70 | ~2.6 |

TABLE 18

| Removal Media | Removal Media Amount | Initial Concentration of Arsenic (ppb) | Final Concentration of Arsenic (ppb) | Removal Media Loading Capacity (mg/g) |
| --- | --- | --- | --- | --- |
| Cerium (IV) Oxide Composition | 20 mg | 45 | ~0.5 | ~2.2 |
| Oxide of Cerium (IV) of the Prior Art | 20 mg | 100 | ~70 | ~2.6 |

Therefore, by applying the cerium ((IV) oxide composition of this disclosure to arsenic removal, a) exceptional amounts of arsenic can be removed by a relatively low amount of cerium (IV) oxide composition due to its high arsenic capacity and b) very low arsenic content water can be produced due to its superior arsenic removal capacity at low final arsenic concentrations.

Not wishing to be bound by any theory, the aforementioned examples illustrate that the cerium (IV) oxide composition embodied in the present disclosure provides for much better arsenic removal performance owing to its unique material characteristics. Without the unique characteristics of the cerium (IV) oxide composition embodied in the present disclosure, it is believed that arsenate or arsenite may not easily be able to come into contact with maximum number of active sites on the surface of the cerium (IV) oxide composition.

A number of variations and modifications of the disclosure can be used. It would be possible to provide for some features of the disclosure without providing others.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:
1. A composition, comprising:
a cerium (IV) oxide composition having sorbed arsenic, wherein the following conditions (i) through (vi) are true:

(i) the cerium (IV) oxide composition has, prior to the arsenic being sorbed, a zeta potential at about pH 7 of no more than about 16 mV and of more than about 1 mV;

(ii) the cerium (IV) oxide composition has a crystallite size of more than about 1 nm and less than about 19 nm;

(iii) the cerium (IV) oxide composition has, prior to the arsenic being sorbed, an acidic site concentration of more than about 0.0001 acidic sites/kg and less than about 0.020 acidic sites/kg (iv) the cerium (IV) oxide composition has an isoelectric point of more than about pH 8.8; and (v) the cerium (IV) oxide composition has, prior to the arsenic being sorbed, an arsenic (III) removal capacity of more than about 17.1 mg As(III)/g CeO2 when exposed to an arsenic-containing aqueous stream having an arsenic (III) concentration of no more than about 440 ppb, wherein the cerium (IV) oxide composition has, after the arsenic being sorbed, an acidic site concentration of less than about 0.0001 acidic sites/kg.

2. The composition of claim 1, wherein the sorbed arsenic comprises one or more of arsenite and arsenate.

3. The composition of claim 1, wherein the sorbed arsenic comprises one or more of arsenite and arsenate and wherein one or more of the following is true:
(a) the zeta potential at about pH 7 is from about 7.5 to about 12.5 mV;
(b) the particle size D10 is from about 1 to about 3 μm;
(c) the particle size D50 is from about 7.5 to about 10.5 μm;
(d) the particle size D90 is from about 20 to about 30 μm;
(e) the crystallite size is from about 7.5 to about 12.5 nm.

4. The composition further of claim 1, where the cerium (IV) oxide composition further comprises rare earth oxides other than cerium (IV) oxide.

5. The composition of claim 4, where the cerium (IV) oxide composition can have one of no more than about 40 wt % of the rare earth oxides other than cerium (IV) oxide.

6. The composition of claim 4, where the cerium (IV) oxide composition can have no more than about 10 wt % of the rare earth oxides other than cerium (IV) oxide.

7. The composition of claim 1, where the cerium (IV) oxide composition comprises from about 2.1 mg to about 6.0 mg of arsenite per gram of cerium (IV) oxide and wherein the arsenite is sorbed from an aqueous stream comprising an equilibrium arsenite concentration of from about 0.5 to about 5 ppb.

8. The composition of claim 1, where the cerium (IV) oxide composition comprises from about 0.1 to about 0.2 mg or arsenate per gram of cerium (IV) oxide and wherein the arsenate is sorbed from an aqueous stream comprising an equilibrium arsenate concentration of from about 0.5 to about 2.5 ppb.

9. The composition further of claim 1, where the cerium (IV) oxide composition further comprises a support material comprising one or more of alumina, an aluminosilicate, an ion exchange resin, an organic polymer, and clay.

10. The composition of claim 1, where the cerium (IV) oxide composition is one or more deposited onto and mixed with a polymeric porous material.

11. The composition of claim 1, where the cerium (IV) oxide composition, prior to the arsenic being sorbed, has a surface area from about 30 $m^2/g$ to about 200 $m^2/g$.

12. The composition of claim 1, where the cerium (IV) oxide composition, prior to the arsenic being sorbed, has a surface area from about 100 $m^2/g$ to about 150 $m^2/g$.

13. The composition of claim 1, where the cerium (IV) oxide composition, prior to the arsenic being sorbed, has one of a mean, medium, and mode pore volume from about 0.2 $cm^3/g$ to about 0.85 $cm^3/g$.

14. The composition further of claim 1, where the cerium (IV) oxide composition further comprises less than about 5 wt of non-rare earth materials.

15. The composition of claim 1, where the cerium (IV) oxide composition lacks any added non-rare earth materials comprising one or more silicon, titanium and zirconium.

16. The composition of claim 1, wherein the arsenic is sorbed from an arsenic containing aqueous stream.

* * * * *